US010642564B2

(12) United States Patent
Takano et al.

(10) Patent No.: US 10,642,564 B2
(45) Date of Patent: May 5, 2020

(54) DISPLAY SYSTEM, DISPLAY DEVICE, INFORMATION DISPLAY METHOD, AND PROGRAM

(71) Applicant: SEIKO EPSON CORPORATION, Tokyo (JP)

(72) Inventors: Masahide Takano, Matusmoto (JP); Akio Yamazaki, Matusmoto (JP); Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/161,776

(22) Filed: Oct. 16, 2018

(65) Prior Publication Data
US 2019/0050191 A1 Feb. 14, 2019

Related U.S. Application Data

(63) Continuation of application No. 15/264,740, filed on Sep. 14, 2016, now Pat. No. 10,133,532.

(30) Foreign Application Priority Data

Sep. 25, 2015 (JP) ................................ 2015-187645
Jul. 28, 2016 (JP) ................................ 2016-148329

(51) Int. Cl.
*G06F 3/14* (2006.01)
*G06F 3/01* (2006.01)
(Continued)

(52) U.S. Cl.
CPC ....... *G06F 3/1454* (2013.01); *G02B 27/0101* (2013.01); *G02B 27/017* (2013.01); *G06F 1/1694* (2013.01); *G06F 3/013* (2013.01); *G06F 3/017* (2013.01); *G06F 3/0304* (2013.01); *G06F 3/1423* (2013.01); *G09G 3/002* (2013.01); *G09G 3/003* (2013.01); *G09G 5/14* (2013.01); *G02B 2027/014* (2013.01);
(Continued)

(58) Field of Classification Search
None
See application file for complete search history.

(56) References Cited

U.S. PATENT DOCUMENTS

2007/0002037 A1    1/2007  Kuroki et al.
2011/0205243 A1    8/2011  Matsuda
(Continued)

FOREIGN PATENT DOCUMENTS

JP    2007-042073 A    2/2007
JP    2007-320715 A    12/2007
(Continued)

OTHER PUBLICATIONS

Mar. 21, 2018 Office Action issued in U.S. Appl. No. 15/264,740.

*Primary Examiner* — Nicholas J Lee
(74) *Attorney, Agent, or Firm* — Oliff PLC

(57) ABSTRACT

In a display system, a projector detects an operation, generates guide information indicating the detected operation, and transmits the guide information to an HMD, and the HMD receives the guide information transmitted from the projector and displays an image corresponding to the operation of the projector and an image indicating a point of view or line-of-sight direction of an operator carrying out the operation, on the basis of the guide information.

29 Claims, 26 Drawing Sheets

(51) Int. Cl.
*G02B 27/01* (2006.01)
*G06F 1/16* (2006.01)
*G06F 3/03* (2006.01)
*G09G 3/00* (2006.01)
*G09G 5/14* (2006.01)

(52) U.S. Cl.
CPC ........ *G02B 2027/0138* (2013.01); *G02B 2027/0178* (2013.01); *G02B 2027/0187* (2013.01); *G06F 2200/1637* (2013.01); *G09G 2370/022* (2013.01); *G09G 2370/16* (2013.01)

(56) References Cited

U.S. PATENT DOCUMENTS

| | | | |
|---|---|---|---|
| 2012/0249741 A1* | 10/2012 | Maciocci | G06F 3/011 348/46 |
| 2012/0256950 A1 | 10/2012 | Masuda et al. | |
| 2014/0009394 A1* | 1/2014 | Lee | H04N 5/4403 345/157 |
| 2014/0139439 A1 | 5/2014 | Park | |
| 2015/0145887 A1 | 5/2015 | Forutanpour et al. | |
| 2016/0011421 A1* | 1/2016 | Kim | G02B 27/0172 345/8 |
| 2016/0026253 A1* | 1/2016 | Bradski | G02B 27/225 345/8 |
| 2016/0188277 A1 | 6/2016 | Miyasaka et al. | |
| 2016/0210783 A1* | 7/2016 | Tomlin | G06T 19/006 |
| 2016/0224300 A1 | 8/2016 | Kwon | |
| 2018/0068476 A1* | 3/2018 | Ono | G06F 3/0484 |
| 2019/0114134 A1 | 4/2019 | Miyasaka et al. | |

FOREIGN PATENT DOCUMENTS

| | | |
|---|---|---|
| JP | 2012-138005 A | 7/2012 |
| JP | 2016-126365 A | 7/2016 |
| WO | 2012/081194 A1 | 6/2012 |

\* cited by examiner

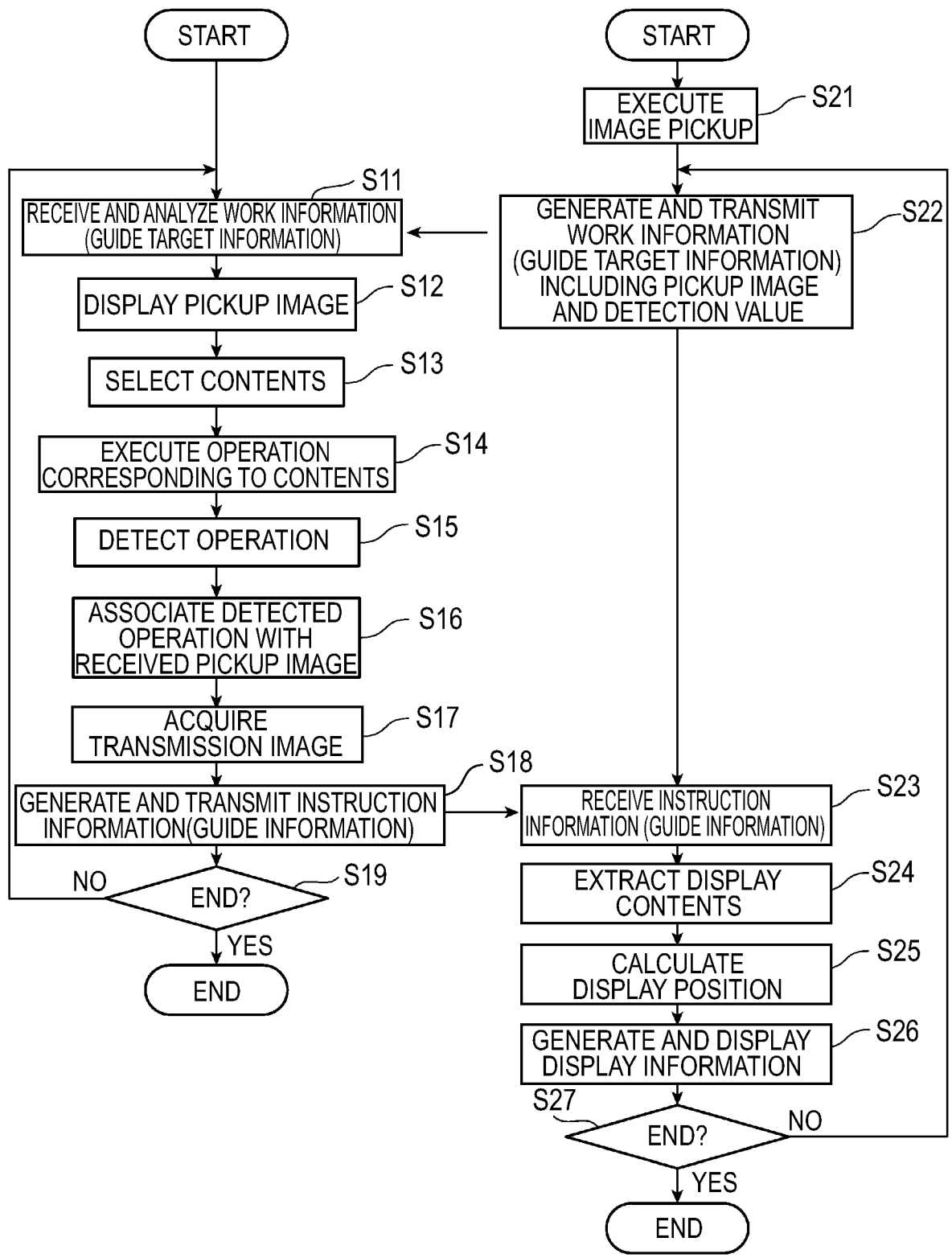

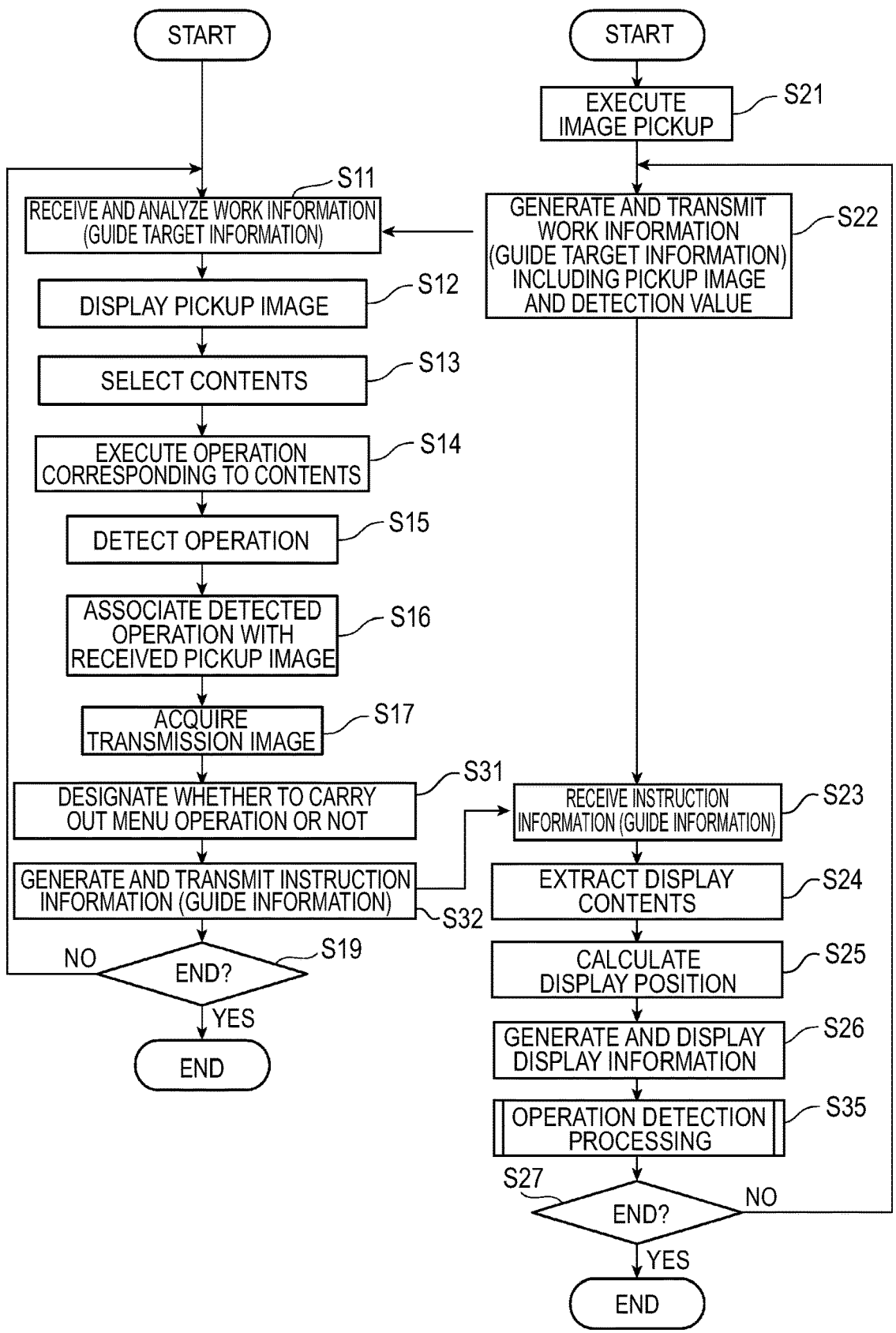

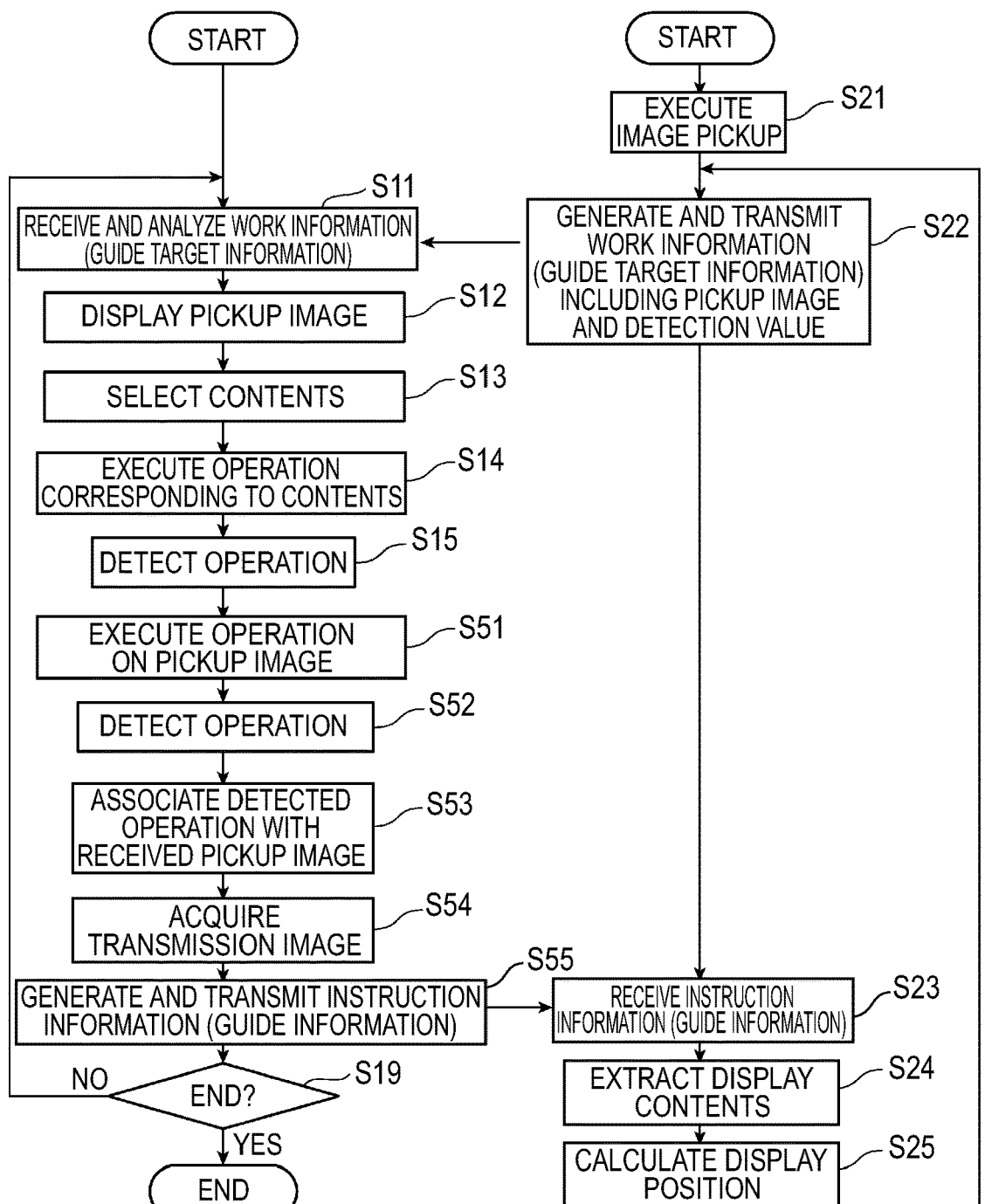
FIG.12A / FIG.12B

DISPLAY SYSTEM, DISPLAY DEVICE, INFORMATION DISPLAY METHOD, AND PROGRAM

This application is a continuation of U.S. application Ser. No. 15/264,740, filed Sep. 14, 2016, which is based on and claims the benefit of Japanese Patent Application No. 2015-187645, filed Sep. 25, 2015 and Japanese Patent Application No. 2016-148329, filed Jul. 28, 2016. The entire contents of the prior applications are hereby incorporated by reference in their entirety.

BACKGROUND

1. Technical Field

The present invention relates to a display system, a display device, an information display method, and a program.

2. Related Art

According to the related art, examples of supporting a support recipient with the use of a display device such as a head-mounted display (HMD) are known (see JP-A-2007-320715 and JP-A-2012-138005, for example). In the system disclosed in JP-A-2007-320715, a field-of-view image picked up by a camera device provided in a support recipient HMD unit is displayed in a manager HMD unit, thus enabling the manager to see the working state of the support recipient. Meanwhile, the server disclosed in JP-A-2012-138005 transmits information about a point of destination, goods, schedule and the like to the HMD worn by the pilot of a cargo aircraft.

Since the position and direction in which an HMD is mounted are fixed, it is very unlikely that the support recipient might misunderstand the direction of the image and information displayed by the HMD. However, if the relative positions of the display device and the support recipient's body with respect to each other are not fixed, the support recipient might misunderstand the direction of the image and information displayed by the display device.

SUMMARY

An advantage of some aspects of the invention is that, in the case of providing information to a support recipient by a display device, the direction of the image and information displayed on the display device can be accurately transmitted.

A display system according to an aspect of the invention includes a first display device and a second display device. The first display device includes: a first display unit which displays an image in a first display area; a first image pickup unit; a first communication unit which carries out communication with the second display device; and a first control unit which causes the first communication unit to receive guide information from the second display device and causes the first display unit to display an image based on the guide information. The second display device includes: a second display unit which displays an image in a second display area; a second communication unit which carries out communication with the first display device; an operation detection unit which detects an operation; and a second control unit which generates guide information indicating an operation detected by the operation detection unit and causes the second communication unit to transmit the guide information. The first control unit causes the first display unit to display an image corresponding to an operation detected by the operation detection unit of the second display device and an image indicating a point of view or line-of-sight direction of an operator carrying out the operation, on the basis of the guide information received from the second display device.

According to the aspect of the invention, as the first display device displays an image about an operation carried out in the second display device, operating the second display device enables information to be provided to the user of the first display device. Also, since the user can be guided on the appropriate direction of the image and information displayed by the first display device, appropriate information can be provided to the user of the first display device without the user misunderstanding the direction of the image and information.

In the display system, the second control unit may generate the guide information including information which indicates an operation detected by the operation detection unit, with reference to the point of view or line-of-sight direction of the operator.

According to this configuration, since information about an operation in the second display device with reference to the point of view or line-of-sight direction of the operator is transmitted to the first display device, the user of the first display device can be guided on the point of view or line-of-sight direction of the operator.

In the display system, the first display unit may display an image in the first display area including an object arrangement area where an object to be worked on is arranged, and the first control unit may cause an image to be displayed at a position corresponding to the object to be worked on arranged in the object arrangement area.

According to this configuration, an image is displayed at the position corresponding to an object to be worked on, and the user can thus be guided on the appropriate direction of this image. Therefore, information about the object to be worked on can be provided effectively.

In the display system, the first image pickup unit may pick up an image of an image pickup range including at least a part of the object arrangement area, and the first control unit may specify a display position of an image corresponding to the position of the object to be worked on, on the basis of a pickup image picked up by the first image pickup unit.

According to this configuration, an appropriate position can be decided as the display position of an image corresponding to an object to be worked on.

In the display system, the first control unit may cause the first display unit to display an image indicating the image pickup range of the first image pickup unit.

According to this configuration, indicating the image pickup range of the first display device enables effective use of the image pickup functions of the first image pickup unit.

In the display system, the first control unit may cause an image of an operating body to be displayed corresponding to an operation position of an operation detected by the operation detection unit of the second display device, on the basis of the guide information received from the second display device.

According to this configuration, the position and contents of an operation detected by the second display device can be displayed intelligibly by the first display device.

In the display system, the first control unit may cause an image indicating an operation position of an operation detected by the operation detection unit of the second display device and an image of an operating body to be displayed, on the basis of the guide information received from the second display device.

According to this configuration, the position and contents of an operation detected by the second display device can be displayed intelligibly by the first display device.

In the display system, the image of the operating body displayed by the first display device on the basis of the guide information may be an image of a tool or apparatus involved in work to be carried out using the first display device.

According to this configuration, the user of the first display device can be guided more intelligibly on the work to be carried out by the user, on the basis of the position and contents of the operation detected by the second display device.

In the display system, the second control unit may acquire an image of a tool or apparatus involved in work to be carried out using the first display device, as the image of the operating body corresponding to the operation detected by the operation detection unit, generate the guide information including the acquired image of the operating body, and cause the second communication unit to transmit the guide information.

According to this configuration, the user of the first display device can be guided intelligibly on the work to be carried out by the user, using the image corresponding to the position and contents of the operation detected by the second display device.

In the display system, the first control unit may generate guide target information on the basis of the pickup image picked up by the first image pickup unit and cause the first communication unit to transmit the guide target information to the second display device. The second control unit may cause the second communication unit to receive the guide target information from the first display device, cause the second display unit to display an image on the basis of the guide target information, and generate the guide information including information indicating an operation detected by the operation detection unit while the image based on the guide target information is displayed.

According to this configuration, information about the work or the like carried out in the first display device can be transmitted to the second display device, using the pickup image. Therefore, the user of the first display device can be supported in his/her work or the like, using a greater volume of information.

In the display system, the second display device may have a second image pickup unit which picks up an image of a range including at least a part of a detection area in which operation is detected by the operation detection unit. The second control unit may generate information indicating an operation detected by the operation detection unit on the basis of a pickup image picked up by the second image pickup unit and generate the guide information including the generated information.

According to this configuration, a pickup image or the like of an operation carried out in the second display device can be displayed by the first display device. Therefore, more detailed information can be provided about the work or the like of the user of the first display device.

In the display system, the second control unit may generate the guide information including an image of an operating body corresponding to an operation detected by the operation detection unit.

According to this configuration, since an image of the operating body carrying out an operation in the second display device can be displayed by the first display device, the contents and direction of the operation in the second display device can be displayed more intuitively and intelligibly.

In the display system, the first control unit may cause the first display unit to display an image which gives guidance on an operation to an operator operating the first display device, on the basis of the guide information received from the second display device.

According to this configuration, the user of the first display device can be guided appropriately on the operation.

In the display system, the first display device may have an external information detection unit which is formed as a separate unit from the first display unit and which detects information. The first control unit may cause the first communication unit to transmit processing information including the information detected by the external information detection unit to the second display device. The second control unit may cause the second communication unit to receive the processing information from the first display device, and cause the second display unit to display an image based on the processing information.

According to this configuration, the information detected by the first display device with the external information detection unit can be transmitted from the first display device to the second display device. Therefore, the user of the second display device can obtain detailed information about the contents of the work of the user of the first display device and peripheral conditions or the like of the first display device. Moreover, since the external information detection unit is formed as a separate unit from the first display unit, a high degree of freedom is provided with respect to the installation position, and various kinds of information can be obtained easily.

In the display system, the external information detection unit may include at least one of a reading unit which reads information formed as an image and a motion detection unit having a motion sensor.

According to this configuration, the first display device can read information formed as an image or detects a motion, with the external information detection unit formed as a separate unit from the first display unit, and can transmit the detected information to the second display device. Therefore, more detailed information can be provided to the user of the second display device.

In the display system, the external information detection unit may include a third image pickup unit formed as a separate unit from the first image pickup unit. The first control unit may cause the first communication unit to transmit, to the second display device, processing information including a pickup image picked up by the third image pickup unit. The second control unit may cause the second display unit to display the pickup image picked up by the third image pickup unit included in the processing information received by the second communication unit from the first display device.

According to this configuration, the first display device can transmit, to the second display device, a pickup image picked up by the third image pickup unit formed as a separate unit from the first display unit. Therefore, the user of the second display device can see a pickup image picked up by the first display device from a different position from the first display unit.

In the display system, the first control unit may cause the first communication unit to transmit, to the second display device, processing information including the pickup image picked up by the first image pickup unit and the pickup image picked up by the third image pickup unit. The second control unit may cause the second display unit to display the pickup image picked up by the first image pickup unit and the pickup image picked up by the third image pickup unit included in the processing information received by the second communication unit from the first display device.

According to this configuration, the pickup image picked up by the first image pickup unit and the pickup image picked up by the third image pickup unit can be seen on the second display device.

In the display system, the second control unit may cause the second display unit to display, next to each other, the pickup image picked up by the first image pickup unit and the pickup image picked up by the third image pickup unit included in the processing information received by the second communication unit from the first display device.

According to this configuration, the pickup image picked up by the first image pickup unit and the pickup image picked up by the third image pickup unit can be seen simultaneously on the second display device.

In the display system, the first control unit may adjust states of the pickup image picked up by the first image pickup unit and the pickup image picked up by the third image pickup unit included in the processing information, according to a communication state between the first communication unit and the second communication unit.

According to this configuration, the processing information can be properly transmitted from the first display device to the second display device even when the transmission is susceptible to the influence of the communication state due to the inclusion of a plurality of images in the processing information transmitted from the first display device to the second display device. Therefore, the pickup images can be properly displayed in the second display device.

A display device according to another aspect of the invention includes: a display unit which displays an image; a communication unit which carries out communication with an external display device; and a control unit which causes the communication unit to receive guide information including information indicating an operation carried out in the external display device and causes the display unit to display an image corresponding to an operation in the external display device and an image indicating a point of view or line-of-sight direction of an operator carrying out the operation, on the basis of the guide information.

According to the aspect of the invention, operating the external display device enables information to be provided to the user of the display device. Also, the user can be guided on the appropriate direction of the image and information displayed by the display device corresponding to an operation in the external display device. Therefore, appropriate information can be provided to the user of the display device without the user misunderstanding the direction of the image and information.

A display device according to another aspect of the invention includes: a display unit which displays an image in a display area; a communication unit which carries out communication with an external display device; an operation detection unit which detects an operation; and a control unit which generates guide information indicating an operation detected by the operation detection unit and causes the communication unit to transmit the guide information to the external display device. The guide information is information for the external display device to display an image corresponding to an operation detected by the operation detection unit and an image indicating a point of view or line-of-sight direction of an operator carrying out the operation.

According to the aspect of the invention, operating the display device enables provision of the point of view or line-of-sight direction of the operator and information about the contents of the operation to the user of the external display device. Thus, for example, the external display device can display images or the like of the point of view or line-of-sight direction of the operator and the contents of the operation, and various kinds of information about the operation can be communicated between the display device and the external display device.

An information display method according to another aspect of the invention uses a first display device having a first display unit and a second display device having a second display unit. The method includes: causing the second display device to detect an operation, generate guide information indicating the detected operation, and transmit the guide information to the first display device; and causing the first display device to receive the guide information transmitted from the second display device, and cause the first display unit to display an image corresponding to an operation in the second display device and an image indicating a point of view or line-of-sight direction of an operator carrying out the operation, on the basis of the guide information.

According to the aspect of the invention, operating the second display device enables information to be provided to the user of the first display device. Also, since the user can be guided on the appropriate direction of the image and information displayed by the first display device, appropriate information can be provided to the user of the first display device without the user misunderstanding the direction of the image and information.

A program according to another aspect of the invention can be executed by a computer controlling a first display device having a first display unit which displays an image. The program causes the computer to receive, from an external second display device, guide information including information indicating an operation carried out in the second display device, and to cause the first display unit to display an image corresponding to an operation in the second display device and an image indicating a point of view or line-of-sight direction of an operator carrying out the operation, on the basis of the guide information.

According to the aspect of the invention, operating the second display device enables information to be provided to the user of the first display device. Also, since the user can be guided on the appropriate direction of the image and information displayed by the first display device, appropriate information can be provided to the user of the first display device without the user misunderstanding the direction of the image and information.

This invention can also be configured as a storage medium with this program stored therein.

BRIEF DESCRIPTION OF THE DRAWINGS

The invention will be described with reference to the accompanying drawings, wherein like numbers reference like elements.

FIGS. 7A and 7B are flowcharts showing operations in the display system.

FIGS. 9A and 9B are flowcharts showing operations in a display system according to a second embodiment.

FIGS. 12A and 12B are flowcharts showing operations in a display system according to a third embodiment.

FIG. 19A shows the appearance on the back side of the tablet computer. FIG. 19B shows the appearance and display example of the front side of the tablet computer.

DESCRIPTION OF EXEMPLARY EMBODIMENTS

First Embodiment

Figure 1:
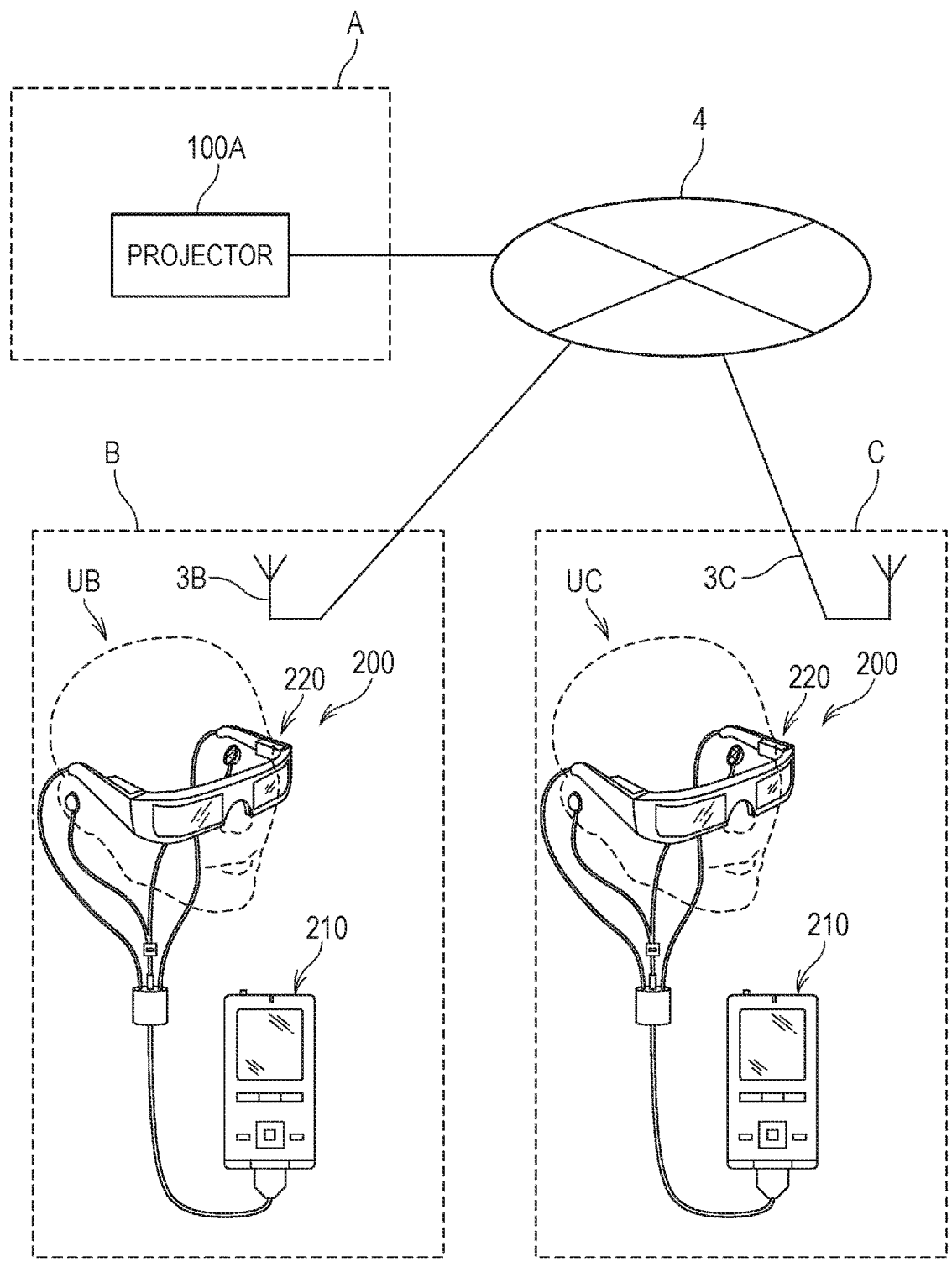
FIG. 1 is a schematic view of the configuration of a display system according to a first embodiment.

FIG. 1 is a schematic view of the configuration of a display system 1 according to an embodiment to which the invention is applied.

As shown in FIG. 1, the display system 1 is a system in which a projector 100A and an HMD 200 are connected in such a way as to be able to communicate with each other via a communication network 4. While FIG. 1 shows an example in which one projector 100A and two HMDs 200 are connected to the communication network 4, the numbers of the projectors 100A and HMDs 200 provided in the display system 1 are not limited.

The HMD 200 is a display device which a user wears on his/her head, as shown in FIG. 1, and is also referred to as a head-mounted display device. The HMD 200 is an optical transmission-type HMD with which the user visually recognizes a virtual image and directly visually recognizes the exterior at the same time. In the description below, a virtual image which the user visually recognizes with the HMD 200 is also referred to as a "display image", as a matter of convenience. Emitting image light generated on the basis of image data is also referred to as "displaying an image".

In the display system 1, a support recipient UB who carries out work uses the HMD 200, and a support provider UA (FIG. 2) who gives instructions and management to the support recipient UB uses the projector 100A, and information for instructions and management is transmitted and received between the support provider UA and the support recipient UB. Thus, the support provider UA provides information about the procedures and contents of the work to the support recipient UB and thus can support the support recipient UB. The support provider UA can be defines as a party providing certain information to the support recipients UB, UC. In the case where the support provider UA gives commands, the support provider UA may be called a commander. The support provider UA may also be called an assistant or helper in terms of assisting the work. Meanwhile, the support recipients UB, UC can be defined as parties receiving the support of the support provider UA in the form of certain information. In the case where the support recipients UB, UC carry out work, the support recipients UB, UC may be called workers.

In each embodiment below, an application in which the support provider UA supports the support recipients UB, UC with their work will be described as an example. However, the application of the display system 1 is not limited to this.

The location of the support provider UA is defined as a support site A. The place where the support recipient UB carries out work is defined as a support recipient site B. Also, in FIG. 1, a support recipient site C is shown and the support recipient UC carrying out work at the support recipient site C wears the HMD 200 similarly to the support recipient UB. In this configuration, the support provider UA using the projector 100A can support the support recipient UB at the support recipient site B and the support recipient UC at the support recipient site C with their work. The support site A and the support recipient sites B, C are not geographically limited as long as these sites can be connected to the communication network 4, and therefore these sites may be places distant from each other or may be places close to each other. The support site A can also be called a command site A where the support provider UA gives commands. The support recipient sites B,C can also be called work sites where the support recipients UB, UC carry out work.

The support provider UA is the operator of the projector 100A. The support recipients UB, UC are equivalent to the users of the HMDs 200, or by a different expression, users.

Figure 2:
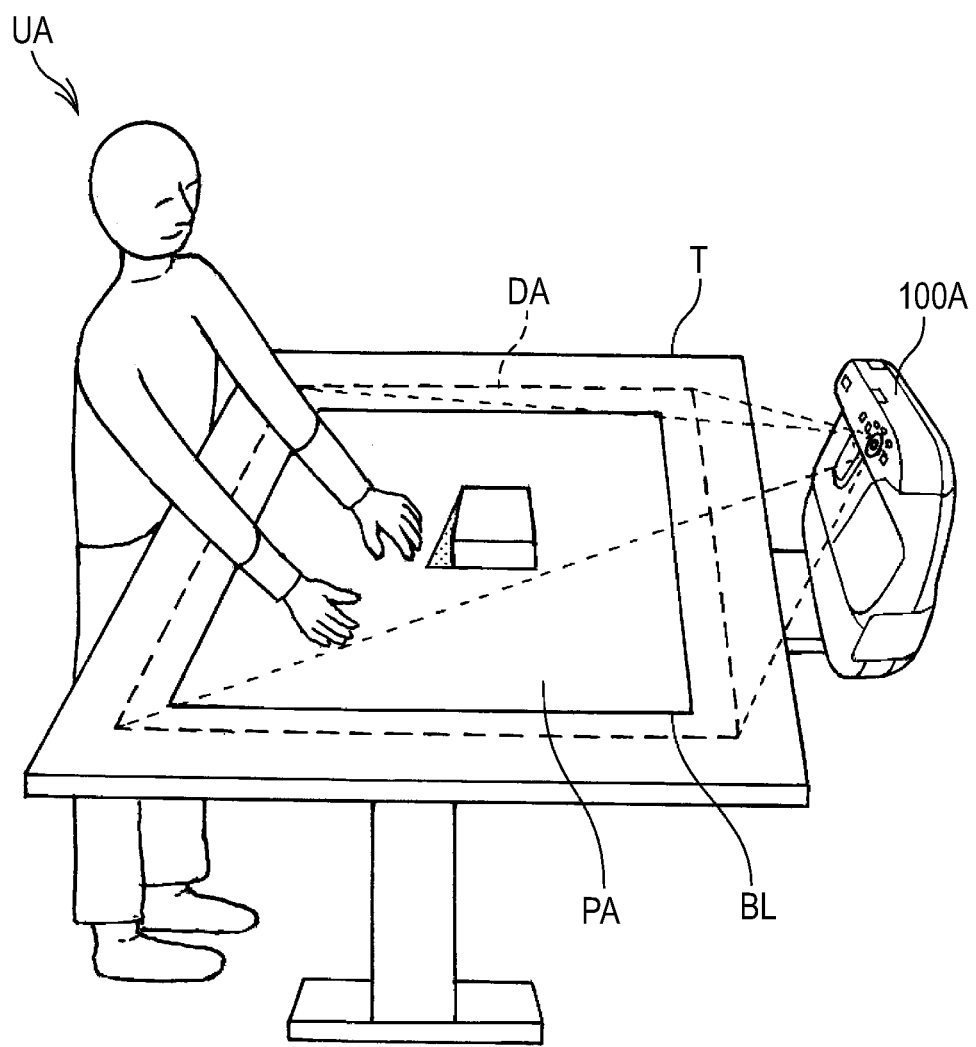
FIG. 2 is an explanatory view showing the external configuration of a projector.

FIG. 2 shows an example of the installation state of the projector 100A.

The projector 100A is fixed to a work table and projects (displays) an image onto a worktop T, which is the top surface of the table. The projector 100A displays an image in a display area on the worktop T. The area where the projector 100A displays an image is defined as a display area DA.

The worktop T is set to a height such that a person can use as a work space when standing and carrying out work. Preferably, the worktop T is a flat surface, and a pedestal (not illustrated) or the like for work may be installed. An object to be work on OB can be placed on the worktop T, and the support provider UA at the support site A can put his/her hands on the worktop T and work on the object to be work on OB, as shown in FIG. 2. The object to be work on OB can be placed on the worktop T as shown in FIG. 2, and the projector 100A projects image light in such a way as to be superimposed on the object to be work on OB, and thus can display an image. The support provider UA can carry out work on the worktop T while viewing the display image by the projector 100A.

The projector 100A has the function of picking up an image of the worktop T. The range of image pickup by the projector 100A includes at least a part of the display area DA, and in the example of FIG. 2, includes a part of the worktop T. The range of image pickup by the projector 100A is defined as an image pickup range PA.

The projector 100A displays an image pickup boundary line BL indicating the image pickup range on the worktop T. The image pickup boundary line BL is a boundary line indicating the outer edge of the image pickup range PA and is displayed in a display color visible to humans.

With the image pickup function of the projector 100A, an image of how the support provider UA carries out work can be picked up within the image pickup range PA. In the display system 1, the HMD 200 worn by the support recipient UB, UC has the function of picking up an image of the field of view of the support recipient UB, UC and transmitting work information (guide target information) including the pickup image to the projector 100A. The projector 100A receives the work information and displays an image including the pickup image picked up by the HMD 200. That is, the projector 100A receives the work information and displays a pickup image of the field of view of the support recipient. The support provider UA operates the projector 100A and carries out selection of contents for explanation, an operation to move an indicator (for example, an arm, hand or finger), or the like. Thus, instruction information (guide information) including data showing the selected contents and the movement of the indicator is transmitted from the projector 100A to the HMD 200. Here, the support provider UA carries out operations while viewing the image showing the work of the support recipient UB, UC displayed by the projector 100A.

The HMD 200 receives the instruction information transmitted from the projector 100A and displays an image based on the instruction information, on an image display unit 220. Since the HMD 200 is a see-through display device, the support recipient can carry out work, looking at his/her own hands while viewing the image displayed by the image display unit 220 as well. Thus, in the display system 1, the support provider UA can visually recognize the field of view of the support recipient UB, UC working at the support recipient site B, C. The projector 100A transmits an image including operations and instruction contents by the support provider UA picked up by the projector 100A to the HMD 200 of the support recipient UB, UC, and the HMD 200 displays the image. Thus, using the indicator and contents, the support provider UA can visually shows guidance, explanation or the like about the work to the support recipient UB, UC and gives instructions and advice on the work of the support recipient UB, UC. Meanwhile, the support recipient UB, UC can carry out work while viewing the image of contents and the movement of the indicator. The operation of the HMD 200 is the same with the support recipient UC. Via the HMD 200 worn by the support recipient UC, the support provider UA operating the projector 100A can give instructions and advance on the work. The indicator can also be called an operating body which the support provider UA as the operator uses for operations.

The communication network 4 is implemented by various communication networks such as wireless communication networks including public switched telephone network, leased line and mobile telephone line, and backbone communication lines of these lines, or a combination thereof, and their specific configurations are not particularly limited. The communication network 4 may be a wide area communication network capable of connecting distant places or a LAN (local area network) laid in a specified facility or building. Also, network apparatuses such as a server device, a gateway device and a router device for connecting the communication network 4 and the various communication lines may be included as well. Moreover, the communication network 4 may be formed by a plurality of communication lines.

The projector 100A is connected to the communication network 4 via a wired or wireless communication network. A wireless access point 3B for connecting to the communication network 4 is installed at the support recipient site B. A wireless access point 3C for connecting to the communication network 4 is installed at the support recipient site C. The wireless access points 3B, 3C are communication devices such as access point and router, and relay data communication between the HMDs 200 and the communication network 4. The HMDs 200 carry out data communication with other HMDs 200 and the projector 100A via the wireless access points 3B, 3C. Each HMD 200 may carry out wireless communication directly with other HMDs 200 in an ad-hoc mode, for example. Also, the HMDs 200 may be connected via a wired communication line. That is, the configuration of the display system 1 is not particularly limited as long as the projector 100A and the HMDs 200 can communicate.

Also, the projector 100A and the HMDs 200 may directly carry out data communication without using the communication network 4. For example, by carrying out wireless data communication in conformity with standards such as wireless LAN (including WiFi (trademark registered), Direct Wi-Fi or the like), and Bluetooth (trademark registered), communication may be carried out without using the communication network 4 or the wireless access point 3B. This method is effective, for example, in the case where the support site A and the support recipient site B or the support recipient site C are not distant from each other but spaced apart from each other by several meters or so.

Figure 3:
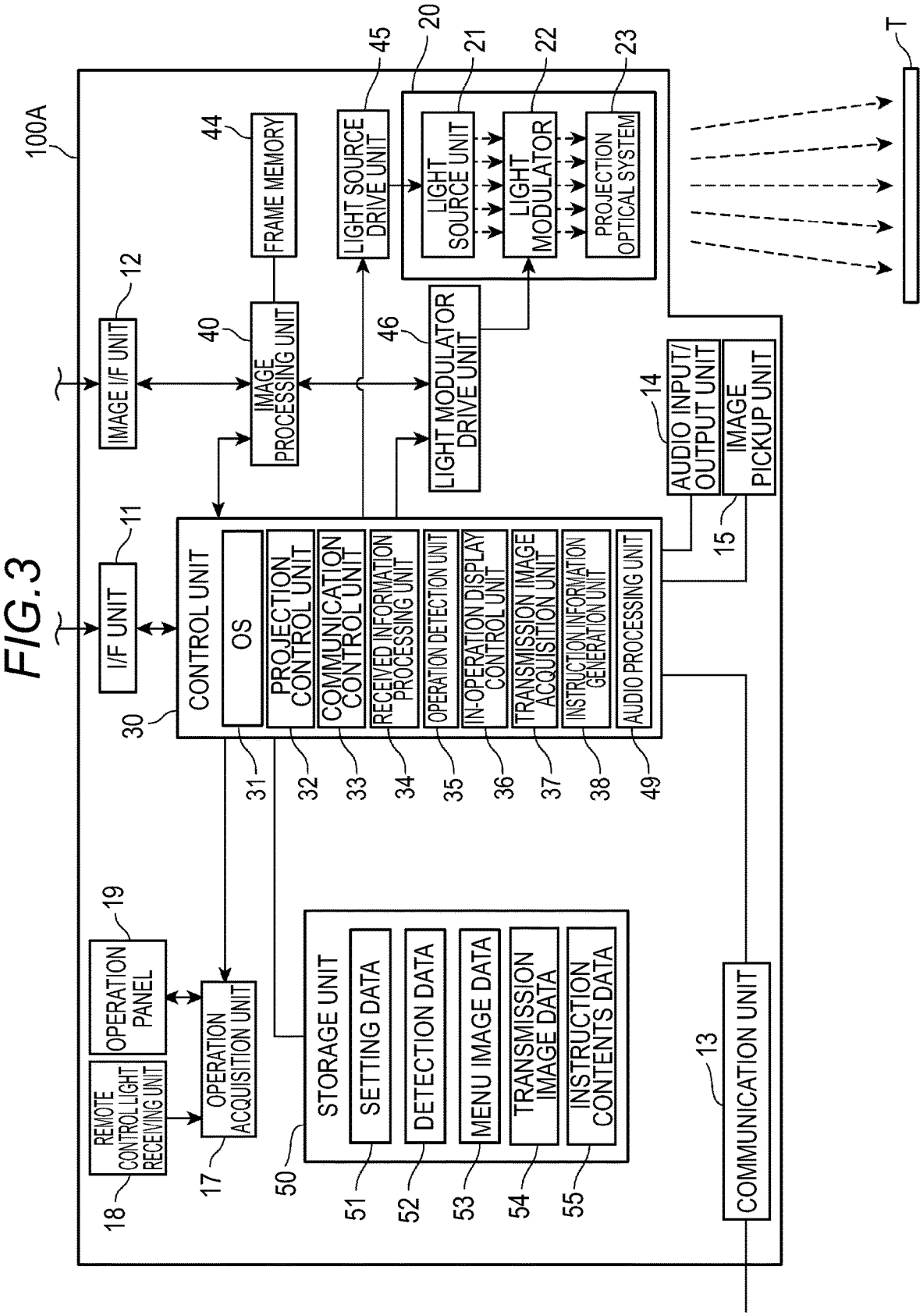
FIG. 3 is a functional block diagram of the projector.

FIG. 3 is a functional block diagram showing the configuration of the projector 100A.

The projector 100A has an I/F (interface) unit 11 and an image I/F (interface) unit 12, as interfaces connected to an external device. The I/F unit 11 and the image I/F unit 12 have a wireless connection connector and may have an interface circuit corresponding to the connector.

The interface unit 11 is a communication interface which transmits and receives digital data such as control data. The image interface unit 12 is an input interface capable of inputting image data and/or analog image signals. The interface unit 11 has an interface of wireless LAN, IEEE 1394 or USB, and may have a wireless communication interface. The image I/F unit 12 can use an HDMI (trademark registered) interface or the like, and may have an interface through which audio data and audio signals are inputted.

An external image supply device (not illustrated) such as PC (personal computer), video playback device or DVD playback device can be connected to the interface unit 11 and the image interface unit 12. The projector 100A can also project an image on the worktop T on the basis of the analog image signal or digital image data supplied from the image supply device connected to the interface unit 11 or the image interface unit 12.

The projector 100A has a projection unit 20 which forms an optical image. The projection unit 20 has a light source unit 21, a light modulator 22, and a projection optical system 23. The light source unit 21 has a light source made up of a xenon lamp, ultra-high-pressure mercury lamp, LED (light emitting diode) or laser light source. The light source unit 21 may also has a reflector and an auxiliary reflector for guiding the light emitted from the light source, to the light modulator 22. Moreover, the light source unit 21 may have a lens set (not illustrated) for enhancing optical characteristics of projection light, a polarizer, or a dimmer element or the like which reduces the amount of light of the light emitted from the light source, on the path to the light modulator 22.

The light modulator 22 has three transmission-type liquid crystal panels corresponding to the primary colors of RGB, for example, and modulates the light transmitted through these liquid crystal panels and thus generates image light. The light from the light source unit 21 is separated into color light beams of the three colors of RGB. Each color light beam becomes incident on the corresponding liquid crystal panel. The color light beams transmitted through and modulated by the respective liquid crystal panels are combined by a light combining system such as cross dichroic prism and then emitted to the projection optical system 23.

The projection optical system 23 has a lens set which guides the image light modulated by the light modulator 22 toward the worktop T and forms an image on the worktop T. The projection optical system 23 may also have a zooming mechanism which enlarges and reduces the projection image and adjusts the focal point, and a focus adjustment mechanism which adjusts the focus. In the case where the projector 100A is a short focus type, the projection optical system 23 may provided with a concave mirror which reflects the image light toward the worktop T.

A light source drive unit 45 which turns on the light source unit 21 under the control of a control unit 30, and a light modulator drive unit 46 which causes the light modulator 22 to operate under the control of the control unit 30 are connected to the projection unit 20. The light source drive unit 45 may have the function of switches on and off the light source unit 21 and adjusting the amount of light of the light source unit 21.

The projector 100A has an image processing system which processes the image projected by the projection unit 20. This image processing system includes the control unit 30 controlling the projector 100A, a storage unit 50, an operation acquisition unit 17, an image processing unit 40, the light source drive unit 45, and the light modulator drive unit 46. The image processing system may also include a frame memory 44 connected to the image processing unit 40.

The control unit 30 has a CPU (not illustrated) which executes programs, a RAM (not illustrated) which temporarily stores programs and data executed by the CPU, and a ROM (not illustrated) which stores a basic control program and data executed by the CPU, in a non-volatile manner. The control unit 30 reads out and executes computer programs stored in the ROM or the storage unit 50 and thus controls each part of the projector 100A. The control unit 30 executes the programs and thus functions as an operating system (OS) 31, a projection control unit 32, and a communication control unit 33. Also, the control unit 30 executes the programs and thus functions as a received information processing unit 34, an operation detection unit 35, an in-operation display control unit 36, a transmission image acquisition unit 37, an instruction information generation unit 38, and an audio processing unit 49.

The storage unit 50 stores various programs including the operating system executed by the control unit 30 and data processed by the control unit 30, in a non-volatile manner. The storage unit 50 stores setting data 51. The setting data 51 includes various setting values used by the control unit 30. The setting values included in the setting data 51 may be values inputted in advance by operations detected by the operation acquisition unit 17. Alternatively, the setting values may be received and stored from an external device (not illustrated) via a communication unit 13 or the interface unit 11.

The storage unit 50 also stores detection data 52, menu image data 53, transmission image data 54, and instruction contents data 55.

The detection data 52 is data used for detecting an image of an object to be work on OB from image data. The object to be work on OB is an object which the support recipient UB, UC using the HMD 200 is to work on, and can be considered to be arranged at a position visible to the support recipient UB, UC, that is, within the field of view of the support recipient UB, UC.

The detection data 52 includes data used for processing to extract an image of the object to be work on OB from image data, for example, and more specifically, includes data of a feature quantity of the image of the object to be work on OB. The feature quantity may be the feature quantity of color or the feature quantity of shape, and may include a plurality of feature quantities corresponding to the number of colors and resolution of the image data of the processing target. In the display system 1, if the object to be work on OB which the support recipient UB is to work on is known in advance, the detection data 52 for this object to be work on OB is stored in the storage unit 50.

The menu image data 53 is image data for displaying a menu image by the projection unit 20. For example, the menu image is a menu bar where operation icons are arranged in lines, or a dial menu where icons are arranged in a circular frame, or the like.

The transmission image data 54 is image data used for instruction information transmitted from the projector 100A to the HMD 200. For example, the transmission image data 54 is image data of an image of an indicator such as an arm, hand, finger or indicator stick. As will be described in detail later, though the instruction information may include a pickup image picked up by an image pickup unit 15, an image of the indicator prepared in advance may be used instead of the pickup image. The transmission image data 54 is image data that can be included in the instruction information, instead of the pickup image. The transmission image data 54 is, for example, image data of an image simulating an arm or hand/finger of the support provider UA or the support recipient UB. However, the transmission image data 54 may be image data of an image of a pointer formed by a symbol such as arrow, and its type and contents are not limited.

The instruction contents data 55 is data of contents transmitted from the projector 100A to the HMD 200 and can include text data, still image data, dynamic image data, and audio data or the like.

The image processing unit 40 processes the image data under the control of the control unit 30 and outputs an image signal to the light modulator drive unit 46. The processing executed by the image processing unit 40 is discrimination processing between a 3D (stereoscopic) image and a 2D (planar) image, resolution conversion processing, frame rate conversion processing, distortion correction processing, digital zooming processing, color tone correction processing, and luminance correction processing or the like. The image processing unit 40 executes processing designated by the control unit 30, and carries out processing using a parameter inputted from the control unit 30 according to need. Of course, it is also possible to execute a combination of a plurality of kinds of processing from the above.

The image processing unit 40 is connected to the frame memory 44. The image processing unit 40 unfolds image data of an image to be displayed, in the frame memory 44, and executes the various kinds of processing on the unfolded image data. The image processing unit 40 reads out the processed image data from the frame memory 44, generates R, G, B image signals corresponding to the image data, and outputs the image signal to the light modulator drive unit 46.

The light modulator drive unit 46 is connected to the liquid crystal panels of the light modulator 22. The light modulator drive unit 46 drives the liquid crystal panels on the basis of the image signals inputted from the image processing unit 40 and causes an image to be drawn on each liquid crystal panel.

The operation acquisition unit 17 is connected to a remote control light receiving unit 18 and an operation panel 19, which function as input devices. The operation acquisition unit 17 detects an operation by acquiring an operation signal outputted from the remote control light receiving unit 18 and the operation panel 19.

The remote control light receiving unit 18 receives an infrared signal transmitted in response to a button operation from a remote controller (not illustrated) used by the user of the projector 100A. The remote control light receiving unit 18 decodes the infrared signal received from the remote controller and outputs an operation signal corresponding to an operation content, indicating an operation content on the remote controller, to the operation acquisition unit 17.

The operation panel 19 is provided on the outer casing of the projector 100A and has various switches and an indicator lamps or the like. The operation acquisition unit 17, under the control of the control unit 30, properly turns on and off the indicator lamp on the operation panel 19 according to the operating state and setting state of the projector 100A. When a switch on the operation panel 19 is operated, the operation panel 19 outputs an operation signal corresponding to the operated switch to the operation acquisition unit 17.

The operation acquisition unit 17 generates operation data indicating the contents of the operation on the basis of the operation signal inputted from the remote control light receiving unit 18 or the operation panel 19, and outputs the operation data to the control unit 30.

The image pickup unit 15 has an image pickup optical system, an image pickup element such as CCD or CMOS, and an interface circuit or the like. The image pickup unit 15 executes image pickup and outputs pickup image data to the control unit 30. The direction of image pickup by the image pickup unit 15 is set to be roughly the same direction as the direction of projection by the projection optical system 23. The image pickup unit 15 picks up an image of the image pickup range PA including at least a part of the display area DA of the projection optical system 23, as described above.

The communication unit 13 carries out wireless data communication in conformity with standards such as wireless LAN (including WiFi), Miracast (trademark registered) or Bluetooth. Here, an example in which the communication unit 13 is connected to the communication network 4 will be described. The projector 100A carries out communication by the communication unit 13 via the communication network 4 and transmits and receives data to and from the HMD 200, for example. The projector 100A may also be connected to an external device by the communication unit 13 and acquire contents data or the like from the external device.

An audio input/output unit 14 is connected to the control unit 30. The audio input/output unit 14 has a microphone (not illustrated) for collecting a sound, and a speaker (not illustrated) for outputting a sound. The audio input/output unit 14 drives the speaker on the basis of an audio signal inputted from the control unit 30 and thus outputs a sound, and also outputs an audio signal of a sound collected by the microphone to the control unit 30. The audio input/output unit 14 may also have an A/D converter and a D/A converter (not illustrated) for conversion between analog audio signals and digital audio data. In this case, the audio input/output unit 14 outputs a sound based on digital audio data inputted from the control unit 30 and outputs digital audio data of a sound collected by the microphone to the control unit 30.

The projection control unit 32 controls the image processing unit 40, the light source drive unit 45 and the light modulator drive unit 46 according to the operation detected by the operation acquisition unit 17 and the program executed by the control unit 30, and causes the projection unit 20 to project (display) an image. Here, the projection control unit 32 may control the image processing unit 40 to execute the discrimination processing between a 3D (stereoscopic) image and a 2D (planar image), the resolution conversion processing, the frame rate conversion processing, the distortion correction processing, the digital zooming processing, the color correction processing, the luminance correction processing or the like. The projection control unit 32 may also control the light source drive unit 45 to control the amount of light of the light source unit 21, along with the processing by the image processing unit 40.

The communication control unit 33 controls the communication unit 13 to control the communication with the HMD 200. The communication control unit 33 receives work information from the HMD 200 and outputs the received work information to the received information processing unit 34. The communication control unit 33 also transmits instruction information generated by the instruction information generation unit 38, to the HMD 200.

The received information processing unit 34 analyzes the work information received by the communication control unit 33 and extracts image data included in the work information. The received information processing unit 34 uses the detection data 52 stored in the storage unit 50 and detects an image of the object to be work on OB from the image data included in the work information, for example.

The operation detection unit 35 detects an operation by the support provider UA. The operation detection unit 35 detects an operation on the remote control light receiving unit 18 or the operation panel 19 on the basis of operation data inputted from the operation acquisition unit 17. The operation detection unit 35 also detects an operation by the support provider UA on the worktop T, using the image pickup unit 15. In this case, the operation detection unit 35 detects an image of the indicator used by the support provider UA, from pickup image data from the image pickup unit 15. The indicator (operating body) used by the support provider UA includes an arm, hand or finger of the support provider UA, an indicator stick or the like. The operation detection unit 35 specifies the indication position of the indicator on the basis of the position of the image of the indicator in the pickup image. The operation detection unit 35 has data in which the position in the pickup image from the image pickup unit 15, the position in the image pickup range PA (see FIG. 2) of the image pickup unit 15 and the position in the display area DA correspond to each other. This data is set by calibration in advance, for example, and is included in the setting data 51 and thus stored in the storage unit 50. Thus, when the support provider UA carries out work or an operation using the indicator in the image pickup range PA on the worktop T, the operation detection unit 35 can detect the position of the indicator as coordinates in the image pickup range PA. The operation detection unit 35 can also convert the position of the indicator into coordinates in the display area DA or relative coordinates in a display image displayed in the display area DA by the projection unit 20.

The operation detection unit 35 may also detect an operation when the indication position of the indicator forms a trajectory that matches a preset pattern. This operation is a so-called gesture operation in which the support provider UA moves the indicator to give different indications depending on the types of movements.

The in-operation display control unit 36 controls the display by the projection unit 20 during the detection of an operation by the operation detection unit 35. The in-operation display control unit 36 reads out the menu image data 53 and the like from the storage unit 50 and controls the projection control unit 32 to display a menu image or the like. Thus, for example, when the support provider UA carries out an operation with the indicator or an operation on the remote control light receiving unit 18 or the operation panel 19, a character or image which serves as an index or reference of the movement of the indicator, or an image of a menu bar that enables position input, can be displayed in the display area DA.

Thus, the support provider UA can operate the projector 100A by operating an arm, hand, finger, indicator stick or the like as the indicator on the worktop T. In this case, a GUI (graphical user interface) operation may be carried out using the menu image displayed under the control of the in-operation display control unit 36.

In the projector 100A, the range in which an operation with the indicator such as an arm, hand, finger or indicator stick can be carried out is the range in which the image pickup unit 15 can pick up an image of the indicator, and specifically, the image pickup range PA. The projector 100A can display the image pickup boundary line BL indicating the outer edge of the image pickup range PA, on the worktop T. Therefore, the support provider UA can easily learn the operable range on the basis of the image pickup boundary line BL.

The transmission image acquisition unit 37 acquires an image of an indicator included in the instruction information to be transmitted to the HMD 200. In the case where the image pickup unit 15 picks up an image of the indicator, the transmission image acquisition unit 37 extracts and acquires an image of the indicator from the pickup image picked up by the image pickup unit 15. Meanwhile, in the case where an image of the indicator is set to be acquired from the storage unit 50 according to an operation or presetting by the support provider UA, the transmission image acquisition unit 37 acquires the transmission image data 54.

The instruction information generation unit 38 generates the instruction information to be transmitted to the HMD 200. The instruction information is data to be transmitted from the projector 100A to the HMD 200. In this embodiment, the instruction information includes image data and/or audio data of contents, image data of the indicator, audio data of the support provider UA generated by the audio processing unit 49, and data indicating the position or movement of the indicator.

The audio processing unit 49 acquires an audio signal included in the contents, amplifies the acquired audio signal, and outputs the amplified audio signal to the audio input/output unit 14. The audio processing unit 49 also acquires a sound collected by the microphone (not illustrated) of the audio input/output unit 14 and converts the sound into digital audio data. The audio processing unit 49 may perform preset processing on the digital audio data.

Figure 4:
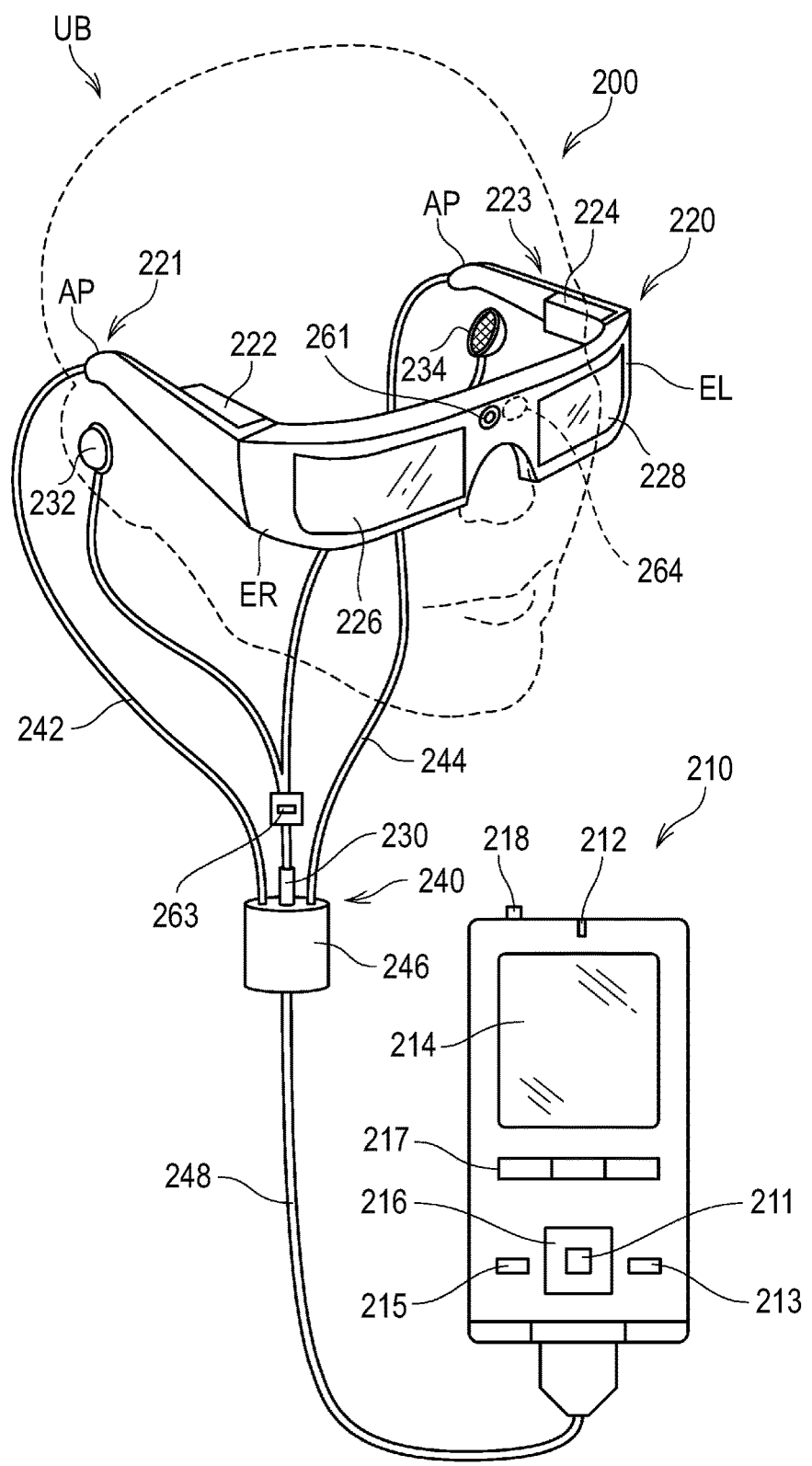
FIG. 4 is an explanatory view showing the external configuration of a head-mounted display device.

FIG. 4 shows the external configuration of the HMD 200. In the embodiment, it is assumed that the support recipient UB and the support recipient UC use HMDs 200 of the same configuration.

The image display unit 220 is a wearable unit mounted on the head of the user. In this embodiment, the image display unit 220 is in the shape of eyeglasses. The image display unit 220 has a right holding unit 221, a right display drive unit 222, a left holding unit 223, a left display drive unit 224, a right optical image display unit 226, a left optical image display unit 228, a camera 261, and a microphone 263. The right optical image display unit 226 and the left optical image display unit 228 are arranged in such a way as to be situated in front of the right and left eyes of the user, respectively, when the user wears the image display unit 220. One end of the right optical image display unit 226 and one end of the left optical image display unit 228 are connected to each other at a position corresponding to the glabella of the user when the user wears the image display unit 220.

The right holding unit 221 is a member extending from an end part ER, which is the other end of the right optical image display unit 226, to a position corresponding to a temporal region of the user when the user wears the image display unit 220. Similarly, the left holding unit 223 is a member extending from an end part EL, which is the other end of the left optical image display unit 228, to a temporal region of the user when the user wears the image display unit 220. The right holding unit 221 and the left holding unit 223 hold the image display unit 220 on the head of the user, like the temples of eyeglasses.

The right display drive unit 222 and the left display drive unit 224 are arranged on the sides facing the head of the user (support recipient UB, UC) when the user wears the image display unit 220. The right display drive unit 222 and the left display drive unit 224 may be collectively referred to simply as a "display drive unit". The right optical image display unit 226 and the left optical image display unit 228 may be collectively referred to simply as an "optical image display unit".

The display drive unit 222, 224 includes a liquid crystal display 284, 294 (hereinafter also referred to as "LCD 284, 294") and a projection optical system 285, 295 or the like (see FIG. 5). The configuration of the display drive unit 222, 224 will be described in detail later. The optical image display unit 226, 228 as an optical member has a light guiding panel 286, 296 (see FIG. 5) and a dimmer panel 227. The light guiding panel 286, 296 is formed of a light-transmissive resin or the like and guides image light outputted from the display drive unit 222, 224 to the corresponding eye of the user. The dimmer panel 227 is a thin plate-like optical element and is arranged in such a way as to cover the front side of the image display unit 220, which is the side opposite to the eyes of the user. As the dimmer panel 227, various types of dimmer panels can be used, such as a dimmer panel with almost zero light transmittance, a substantially transparent dimmer panel, a dimmer panel which transmits light while reducing the amount of light, and a dimmer panel which reduces or reflects light with a specified wavelength. Properly selecting optical characteristics (light transmittance or the like) of the dimmer panel 227 enables adjustment of the amount of external light incident on the right optical image display unit 226 and the left optical image display unit 228 from outside, and thus enables adjustment of visibility of a virtual image. In the embodiment, the case of using the dimmer panel 227 with enough light transmittance to make at least the external landscape visible to the user wearing the HMD 200 will be described. The dimmer panels 227 protect the right light guiding panel 286 and the left light guiding panel 296 and restrain damage and stains on the right light guiding panel 286 and the left light guiding panel 296.

The dimmer panels 227 may be attachable to/detachable from the right optical image display unit 226 and the left optical image display unit 228. Also, a plurality of types of dimmer panels 227 may be able to be mounted in place of one another. Alternatively, the dimmer panels 227 may be omitted.

The camera 261 is arranged at a boundary part between the right optical image display unit 226 and the left optical image display unit 228. In the state where the user wears the image display unit 220, the position of the camera 261 is substantially in the middle between the eyes of the user in terms of horizontal direction, and above the eyes of the user in terms of vertical direction. The camera 261 is a digital camera having an image pickup element such as CCD or CMOS, and an image pickup lens or the like. The camera 261 may be a monocular camera or stereo camera.

The camera 261 picks up an image of a part of the external landscape in the direction of the front side of the image display unit 220, in other words, in the direction of the field of view of the user wearing the HMD 200. The angle of view of the camera 261 can be properly set according to need. However, it is preferable that the image pickup range of the camera 261 includes the outside visually recognized by the user through the right optical image display unit 226 and the left optical image display unit 228. Moreover, it is preferable that the image pickup range of the camera 261 is set in such a way that an image over the entirety of the field of view of the user through the dimmer panels 227 can be picked up. The camera 261 carries out image pickup under the control of a control unit 300 and outputs pickup image data to the control unit 300.

Figure 5:
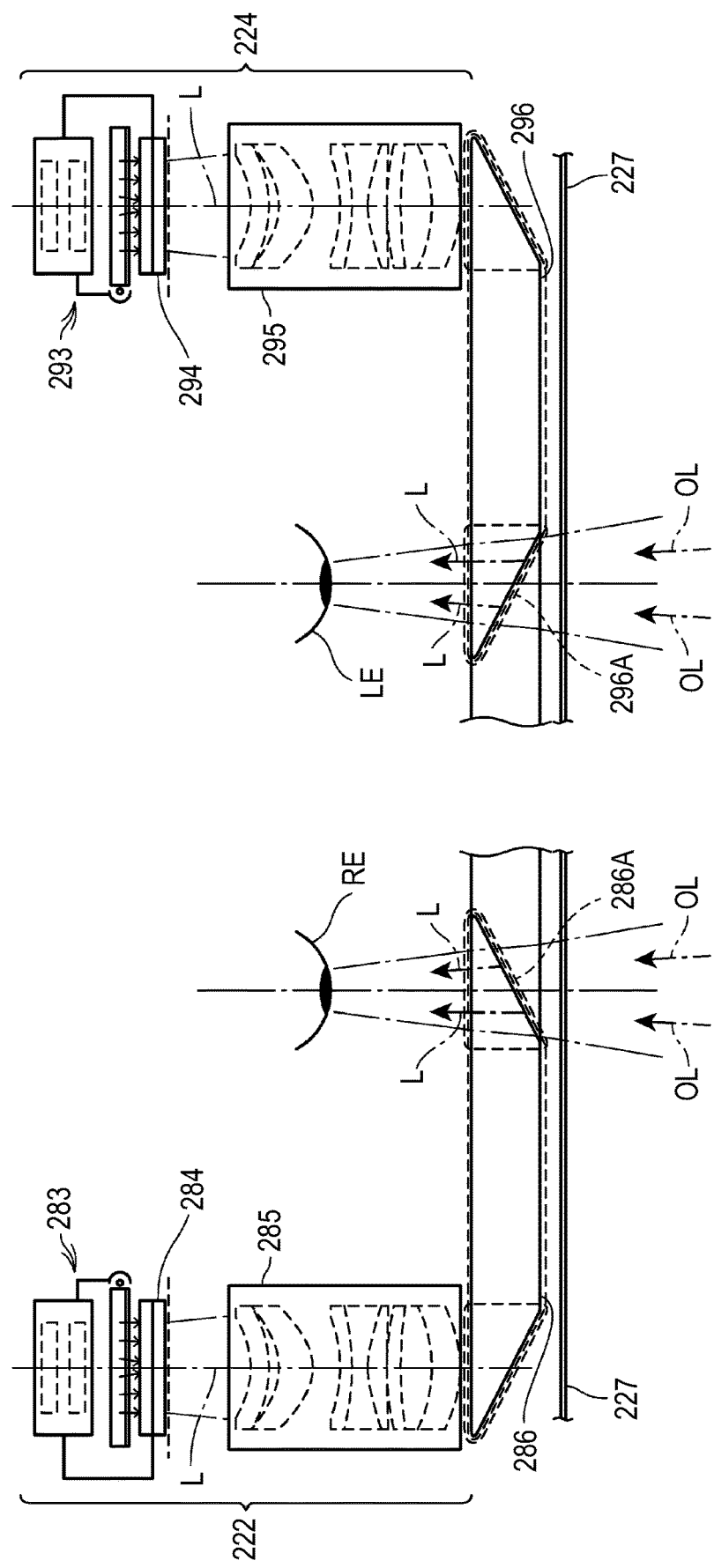
FIG. 5 shows the configuration of an optical system of an image display unit.

FIG. 5 is a plan view of essential parts showing the configuration of the optical system provided in the image display unit 220. In FIG. 5, a left eye LE and a right eye RE of the user are illustrated for the purpose of explanation.

The left display drive unit 224 has a left backlight 293, the left LCD 294, and the left projection optical system 295. The left backlight 293 has a light source such as LED, and a diffuser. The left LCD 294 is a transmission-type liquid crystal panel in which a plurality of pixels is arranged in the form of a matrix. The left LCD 294 is arranged on the optical path of the light emitted from the diffuser of the left backlight 293. The left projection optical system 295 has a lens set or the like which guides image light L transmitted through the left LCD 294.

The left projection optical system 295 has a collimating lens which turns the image light L emitted from the left LCD 294 into a parallel luminous flux. The image light L turned into a parallel luminous flux by the collimating lens becomes incident on the left light guiding panel 296. The left light guiding panel 296 is a prism on which a plurality of reflection surfaces for reflecting the image light L are formed. The image light L is reflected a plurality of times inside the left light guiding panel 296 and thus guided toward the left eye LE. A half mirror 296A (reflection surface) situated in front of the left eye LE is formed on the left light guiding panel 296.

The image light L reflected by the half mirror 296A is emitted from the left optical image display unit 228 toward the left eye LE. This image light L forms an image on the retina of the left eye LE and thus causes the user to visually recognize an image.

The right display drive unit 222 is formed, having bilateral symmetry with the left display drive unit 224. The right display drive unit 222 has a right backlight 283, the right LCD 284, and the right projection optical system 285. The right backlight 283 has a light source such as LED, and a diffuser. The right LCD 284 is a transmission-type liquid crystal panel in which a plurality of pixels is arranged in the form of a matrix. The right LCD 284 is arranged on the optical path of the light emitted from the diffuser of the right backlight 283. The right projection optical system 285 has a lens set or the like which guides image light L transmitted through the right LCD 284.

The right projection optical system 285 has a collimating lens which turns the image light L emitted from the right LCD 284 into a parallel luminous flux. The image light L turned into a parallel luminous flux by the collimating lens becomes incident on the right light guiding panel 286. The right light guiding panel 286 is a prism on which a plurality of reflection surfaces for reflecting the image light L are formed. The image light L is reflected a plurality of times inside the right light guiding panel 286 and thus guided toward the right eye RE. A half mirror 286A (reflection surface) situated in front of the right eye RE is formed on the right light guiding panel 286.

The image light L reflected by the half mirror 286A is emitted from the right optical image display unit 226 toward the right eye RE. This image light L forms an image on the retina of the right eye RE and thus causes the user to visually recognize an image.

On the right eye RE of the user, the image light L reflected by the half mirror 286A and external light OL transmitted through the dimmer panel 227 become incident. On the left eye LE, the image light L reflected by the half mirror 296A and external light OL transmitted through the dimmer panel 227 become incident. In this way, the HMD 200 causes the image light L of the image processed inside and the external light OL to become incident on the eyes of the user in a superimposed manner, and the user can see the external landscape through the dimmer panels 227 and visually recognizes the image based on the image light L superimposed on the external landscape. Thus, the HMD 200 functions as a see-through display device.

The left projection optical system 295 and the left light guiding panel 296 may be collectively referred to as a "left light guiding unit". The right projection optical system 285 and the right light guiding panel 286 may be collectively referred to as a "right light guiding unit". The configurations of the right light guiding unit and the left light guiding unit are not limited to the above example. Any method that can form a virtual image in front of the eyes of the user with the use of image light can be employed. For example, a diffraction grating or semitransparent reflection film may be used.

The image display unit 220 is connected to a control device 210 via a connection unit 240. The connection unit 240 has a main body cord 248 which is connected to the control device 210, a right cord 242, a left cord 244, and a connecting member 246. The right cord 242 and the left cord 244 are two cords branching from the main body cord 248. The right cord 242 is inserted in the casing of the right holding unit 221 from a distal part AP in the extending direction of the right holding unit 221 and is connected to the right display drive unit 222. Similarly, the left cord 244 is inserted in the casing of the left holding unit 223 from a distal part AP in the extending direction of the left holding unit 223 and is connected to the left display drive unit 224.

The connecting member 246 is provided at the branching point between the main body cord 248, and the right cord 242 and the left cord 244, and has a jack for connecting an earphone plug 230. A right earphone 232 and a left earphone 234 extend from the earphone plug 230. The microphone 263 is provided near the earphone plug 230. A single cord extends from the earphone plug 230 to the microphone 263, and the cord branches from the microphone 263 and the branching cords connect to the right earphone 232 and the left earphone 234, respectively.

Figure 6:
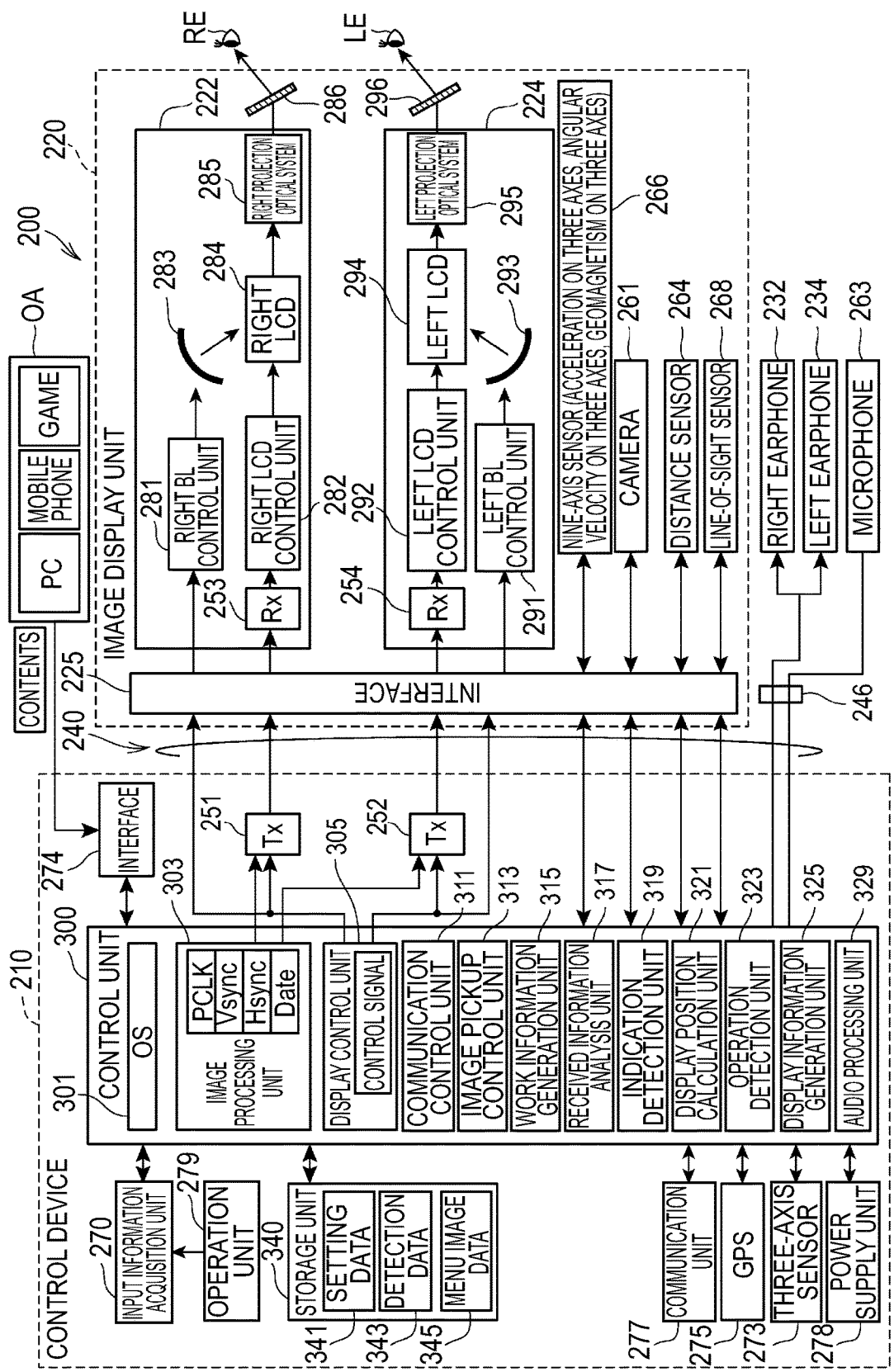
FIG. 6 is a functional block diagram of the head-mounted display device.

The microphone 263 is arranged in such a way that the sound collecting unit of the microphone 263 faces in the direction of the field of view of the user, for example, as shown in FIG. 4. The microphone 263 collects a sound and outputs the sound signal to an audio processing unit 329 (FIG. 6). The microphone 263 may be a monaural microphone or stereo microphone, for example, and may be a directional microphone or non-directional microphone.

It suffices that the right cord 242, the left cord 244, and the main body cord 248 are capable of transmitting digital data. These cords can be formed by metal cables or optical fibers, for example. The right cord 242 and the left cord 244 may be gathered in a single cord.

The image display unit 220 and the control device 210 transmit various signals to each other via the connection unit 240. The end opposite to the connecting member 246, of the main body cord 248, and the control device 210, are provided with connectors (not illustrated) which fit with each other. By having the connector of the main body cord 248 and the connector of the control device 210 fitted with each other or detached from each other, the control device 210 and the image display unit 220 can be connected or disconnected.

The control device 210 controls the HMD 200. The control device 210 has various switches including an enter key 211, a lighting unit 212, a display switching key 213, a luminance switching key 215, a direction key 216, a menu key 217, and a power switch 218. The control device 210 also has a trackpad 214 which the user operates with fingers.

The enter key 211 detects a press operation and outputs a signal which finalizes the contents of an operation made on the control device 210. The lighting unit 212 has a light source such as LED (light emitting diode) and reports the operating state (for example, power ON/OFF) of the HMD 200 via the lighting state of the light source. The display switching key 213 outputs a signal which designates a switching of the image display mode, for example, in response to a press operation.

The trackpad 214 has an operation surface where a touch operation is detected, and outputs an operation signal in response to an operation on the operation surface. The detection method on the operation surface is not limited, and an electrostatic method, a pressure detection method, an optical method or the like can be employed. The luminance switching key 215 outputs a signal which designates an increase/decrease in the luminance of the image display unit 220 in response to a press operation. The direction key 216 outputs an operation signal in response to a press operation on keys corresponding to up, down, left and right directions. The power switch 218 is a switch for turning on/off the power of the HMD 200.

FIG. 6 is a functional block diagram of the HMD 200.

As shown in FIG. 6, the HMD 200 has an interface 274 for connecting various external devices OA which serve as contents supply sources. As the interface 274, for example, an interface for wire connection such as USB interface, micro-USB interface or memory card interface can be used. The interface 274 may also be a wireless communication interface. The external device OA is an image supply device which supplies an image to the HMD 200. A personal computer (PC), mobile phone terminal, portable game machine or the like may be used.

The control device 210 has a control unit 300, an input information acquisition unit 270, a storage unit 340, a transmitting unit (Tx) 251, and a transmitting unit (Tx) 252.

The input information acquisition unit 270 is connected to an operation unit 279 including the trackpad 214, the direction key 216, the power switch 218 and the like. The input information acquisition unit 270 detects the contents of an operation in the operation unit 279 on the basis of a signal inputted from the operation unit 279, and outputs operation data indicating the contents of the operation to the control unit 300. The control device 210 also has a power supply unit 278 and supplies electricity to each part of the control device 210 and the image display unit 220.

The storage unit 340 is a non-volatile and stores various computer programs executed by the control unit 300 and data associated with these programs. The storage unit 340 also stores setting data 341, detection data 343, and menu image data 345. The storage unit 340 may also store data of still images and dynamic images to be displayed on the image display unit 220.

The storage unit 340 stores the setting data 341. The setting data 341 includes various setting values used by the control unit 300. The setting values included in the setting data 341 may be values inputted in advance by operations on the operation unit 279, or may be received and stored from the external device OA or other devices (not illustrated) via a communication unit 277 or the interface 274.

The detection data 343 is data used to detect an image of an object to be worked on, from image data. The object to be worked on is an object of work carried out by the support recipient wearing the HMD 200 and can be considered to be sutured in the field of view of the support recipient at the time of work. The detection data 343 includes, for example, data used for processing to extract an image of the object to be worked on, from image data, and more specifically, includes data of a feature quantity of an image of the object to be worked on. The feature quantity may be the feature quantity of color or the feature quantity of shape, and may include a plurality of feature quantities corresponding to the number of colors and resolution of the image data of the processing target. In the display system 1, if the object to be work on which the support recipient wearing the HMD 200 is to work on is known in advance, the detection data 343 for this object to be work on is stored in the storage unit 340.

The menu image data 345 is image data for displaying a menu image on the image display unit 220 under the control of an image processing unit 303 and a display control unit 305. The menu image is, for example, a menu bar where operation icons are arranged in lines, or a dial menu where icons are arranged in a circular frame, or the like.

A three-axis sensor 273, a GPS 275, and the communication unit 277 are connected to the control unit 300. The three-axis sensor 273 is a three-axis acceleration sensor. The control unit 300 acquires a detection value of the three-axis sensor 273. With the three-axis sensor 273, the control unit 300 can detect the movement of the control device 210 and can detect an operation of swinging the control device 210 or the like, for example. The three-axis sensor 273 may be replaced by a nine-axis sensor. In this case, the control unit 300 acquires detection values of a three-axis acceleration sensor, a three-axis angular velocity sensor, and a three-axis geomagnetic sensor, and can detect the attitude, direction and movement of the control device 210, for example.

The GPS 275 has an antenna (not illustrated), receives GPS (Global Positioning System) signals, and calculates the current position of the control device 210. The GPS 275 outputs the current position and current time calculated on the basis of the GPS signals, to the control unit 300. The GPS 275 may also have the function of acquiring the current time based on information included in the GPS signals and correcting the time measured by the control unit 300.

The communication unit 277 carries out wireless data communication in conformity with standards such as wireless LAN (including WiFi), Miracast, or Bluetooth.

If the external device OA is wirelessly connected to the communication unit 277, the control unit 300 acquires contents data from the communication unit 277 and causes the image display unit 220 to display an image. Meanwhile, if the external device OA is wired to the interface 274, the control unit 300 acquires contents data from the interface 274 and causes the image display unit 220 to display an image. The communication unit 277 and the interface 274 function as a data acquisition unit DA which acquires contents data from the external device OA.

The control unit 300 has a CPU (not illustrated) which executes programs, a RAM (not illustrated) which temporarily stores programs and data executed by the CPU, and a ROM (not illustrated) which stores a basic control program and data executed by the CPU, in a non-volatile manner. The control unit 300 reads out and executes computer programs stored in the storage unit 340 and thus functions as an operating system (OS) 301, the image processing unit 303, and the display control unit 305. The control unit 300 also functions as a communication control unit 311, an image pickup control unit 313, a work information generation unit 315, a received information analysis unit 317, an indication detection unit 319, a display position calculation unit 321, an operation detection unit 323, a display information generation unit 325, and an audio processing unit 329.

The image processing unit 303 acquires an image signal included in contents. The image processing unit 303 separates synchronizing signals such as vertical synchronizing signal VSync and horizontal synchronizing signal HSync from the acquired image signal. The image processing unit 303 also generates a clock signal PCLK, using a PLL (phase locked loop) circuit or the like (not illustrated), according to the periods of the separated vertical synchronizing signal VSync and horizontal synchronizing signal HSync. The image processing unit 303 converts the analog image signal from which the synchronizing signals are separated, into a digital image signal, using an A/D converter circuit or the like (not illustrated). The image processing unit 303 stores the converted digital image signal into the RAM of the control unit 300, frame by frame, as image data of a target image (Data in the illustration). This image data is RGB data, for example.

The image processing unit 303 may perform resolution conversion processing to convert the resolution of the image data to a resolution suitable for the right display drive unit 222 and the left display drive unit 224, according to need.

The image processing unit 303 may also execute image adjustment processing to adjust the luminance and saturation of the image data, and 2D/3D conversion processing to create 2D image data from 3D image data or generate 3D image data from 2D image data, and the like.

The image processing unit 303 transmits each of the clock signal PCLK, the vertical synchronizing signal VSync, the horizontal synchronizing signal HSync, and the image data Data stored in the RAM, via the transmitting units 251, 252. The transmitting units 251, 252 function as transceivers and execute serial transmission between the control device 210 and the image display unit 220. The image data Data transmitted via the transmitting unit 251 is called "image data for right eye". The image data Data transmitted via the transmitting unit 252 is called "image data for left eye".

The display control unit 305 generates a control signal for controlling the right display drive unit 222 and the left display drive unit 224, and with this control signal, controls the generation and emission of image light by each of the right display drive unit 222 and the left display drive unit 224. Specifically, the display control unit 305 controls the drive ON/OFF of the right LCD 284 by a right LCD control unit 282 and the drive ON/OFF of the right backlight 283 by a right backlight control unit 281. The display control unit 305 also controls the drive ON/OFF of the left LCD 294 by a left LCD control unit 292 and the drive ON/OFF of the left backlight 293 by a left backlight control unit 291.

The communication control unit 311 controls the communication unit 277 and thus controls communication with the projector 100A. The communication control unit 311 performs processing to transmit data including transmission information generated by the work information generation unit 315 to the projector 100A. The communication control unit 311 also receives data transmitted from the projector 100A and outputs the received data to the received information analysis unit 317.

The image pickup control unit 313 controls the camera 261 to execute image pickup and acquires pickup image data.

The work information generation unit 315 acquires data to be transmitted to the projector 100A and generates work information based on the acquired data. The work information generation unit 315 acquires the pickup image data of the camera 261. The work information generation unit 315 may also acquire the detection values of at least one or some of a distance sensor 264, a nine-axis sensor 266, and a line-of-sight sensor 268. In this case, the work information generation unit 315 generates work information including the pickup image data of the camera 261 and the detection values of the sensor(s). The sensor from which the work information generation unit 315 acquires a detection value is set in advance. However, the projector 100A may transmit a setting command to the HMD 200 and thus designate the detection value to be acquired. The work information generation unit 315 may also generate work information including image data generated from the pickup image data, instead of the pickup image data of the camera 261 itself.

The received information analysis unit 317 analyzes the data received by the communication control unit 311. In the embodiment, the received information analysis unit 317 extracts image data of the indicator, image data of contents, audio data, and other data included in the instruction information received by the communication control unit 311. The received information analysis unit 317 also extracts data indicating the position and movement of the indicator from the instruction information received by the communication control unit 311.

The indication detection unit 319 detects data indicating that an operation with the indicator is to be carried out, from the data extracted by the received information analysis unit 317. The support provider UA operates the projector 100A, carries out a position indication operation with the indicator, and thus can control the HMD 200 by this position indication operation. In this case, the HMD 200 detects data about the position indication operation included in the instruction information transmitted from the projector 100A, as an operation on the GUI. The instruction information transmitted from the projector 100A includes data designating whether the operation by the support provider UA is to be detected as an operation on the GUI or not. The indication detection unit 319 detects this data.

The display position calculation unit 321 calculates the position where an image is to be displayed on the basis of the image data extracted by the received information analysis unit 317. The image data extracted by the received information analysis unit 317 is image data of the indicator, image data of contents, and other image data. On the basis of these data, the display position calculation unit 321 calculates the display position of the image of the indicator, the display position of the image data of contents, and the display position of other images. The display position calculation unit 321 may also calculate the display size of each image. In the case where the indication detection unit 319 detects data indicating that the operation by the support provider is regarded as an operation on the GUI, the display position calculation unit 321 calculates the display position of a menu image for carrying out GUI operations.

The operation detection unit 323 detects an operation in the case of detecting the data indicating the position and movement of the indicator extracted by the received information analysis unit 317, as an operation on the GUI. The operation detection unit 323 detects the operation on the GUI on the basis of the display position of an icon or the like in the menu image and the display position of the image of the indicator calculated by the display position calculation unit 321.

The display information generation unit 325 generates display information of a screen to be displayed by the image display unit 220. The display information generation unit 325 arranges an image based on the image data extracted by the received information analysis unit 317, at the display position calculated by the display position calculation unit 321, and thus generates display information corresponding to one screen. The display information generated by the display information generation unit 325 is transmitted to the image display unit 220 by an operation of the display control unit 305, and the image display unit 220 displays the display information.

The audio processing unit 329 acquires an audio signal included in the contents, amplifies the acquired audio signal, and outputs the amplified audio signal to the right earphone 232 and the left earphone 234. The audio processing unit 329 also acquires a sound collected by the microphone 263 and converts the sound into digital audio data. The audio processing unit 329 may also perform preset processing on the digital audio data.

The image display unit 220 has the camera 261 and the distance sensor 264, as described above. The image display unit 220 has an interface 225, the right display drive unit 222, the left display drive unit 224, the right light guiding panel 286 as the right optical image display unit 226, the left light guiding panel 296 as the left optical image display unit 228, the nine-axis sensor 266, and the line-of-sight sensor 268.

The nine-axis sensor 266 is a motion sensor which detects acceleration (three axes), angular velocity (three axes), and geomagnetism (three axes). When the image display unit 220 is mounted on the head of the user, the control unit 300 can detect the movement of the head of the user on the basis of the detection values of the nine-axis sensor 266. For example, the control unit 300 can estimate the magnitude of a tilt of the image display unit 220 and the direction of the tilt, on the basis of the detection values of the nine-axis sensor 266.

The interface 225 has a connector to which the right cord 242 and the left cord 244 are connected. The interface 225 outputs the clock signal PCLK, the vertical synchronizing signal VSync, the horizontal synchronizing signal HSync, and the image data Data transmitted from the transmitting unit 251, 252 to a corresponding receiving unit (Rx) 253, 254. The interface 225 also outputs the control signal transmitted from the display control unit 305 to the corresponding receiving unit 253, 254, the right backlight control unit 281 or the left backlight control unit 291.

The interface 225 is also an interface for connecting the camera 261, the distance sensor 264, the nine-axis sensor 266, and the line-of-sight sensor 268. The pickup image data of the camera 261, the result of detection by the distance sensor 264, the result of detection of acceleration (three axes), angular velocity (three axes) and geomagnetism (three axes) by the nine-axis sensor 266, and the result of detection by the line-of-sight sensor 268 are sent to the control unit 300 via the interface 225.

The right display drive unit 222 has the right backlight 283, the right LCD 284 and the right projection optical system 285 described above. The right display drive unit 222 also has the receiving unit 253, the right backlight (BL) control unit 281 for controlling the right backlight (BL) 283, and the right LCD control unit 282 for driving the right LCD 284.

The receiving unit 253 operates as a receiver corresponding to the transmitting unit 251 and executes serial transmission between the control device 210 and the image display unit 220. The right backlight control unit 281 drives the right backlight 283 on the basis of an inputted control signal. The right LCD control unit 282 drives the right LCD 284 on the basis of the clock signal PCLK, the vertical synchronizing signal VSync, the horizontal synchronizing signal HSync, and the image data for right eye Data inputted via the receiving unit 253.

The left display drive unit 224 has a configuration similar to the right display drive unit 222. The left display drive unit 224 has the left backlight 293, the left LCD 294 and the left projection optical system 295 described above. The left display drive unit 224 also has the receiving unit 254, the left backlight control unit 291 for driving the left backlight 293, and the left LCD control unit 292 for driving the left LCD 294.

The receiving unit 254 operates as a receiver corresponding to the transmitting unit 252 and executes serial transmission between the control device 210 and the image display unit 220. The left backlight control unit 291 drives the left backlight 293 on the basis of an inputted control signal. The left LCD control unit 292 drives the left LCD 294 on the basis of the clock signal PCLK, the vertical synchronizing signal VSync, the horizontal synchronizing signal HSync, and the image data for left eye Data inputted via the receiving unit 254.

The right backlight control unit 281, the right LCD control unit 282, the right backlight 283, and the right LCD 284 may also be collectively referred to as a right "image light generation unit". Similarly, the left backlight control unit 291, the left LCD control unit 292, the left backlight 293, and the left LCD 294 may also be collectively referred to as a left "image light generation unit".

In the display system 1 configured in this way, the HMD 200 is equivalent to a display device and a first display device, and the projector 100A is equivalent to a second display device. The image display unit 220 provided in the HMD 200 is equivalent to a first display unit. The communication unit 277 is equivalent to a first communication unit. The control unit 300 is equivalent to a control unit and a first control unit. The camera 261 is equivalent to an image pickup unit.

The operation detection unit 35 of the projector 100A is equivalent to an operation detection unit. The communication unit 13 is equivalent to a second communication unit. The image pickup unit 15 is equivalent to a second image pickup unit. The control unit 30 is equivalent to a second control unit. The projection unit 20 is equivalent to a second display unit. Also, the storage unit 50 can be regarded as a second storage unit. The display area DA is equivalent to a second display area. The image pickup range PA is equivalent to a detection area.

FIGS. 7A and 7B are flowcharts showing operations in the display system 1. FIG. 7A shows operations of the projector 100A. FIG. 7B shows operations of the HMD 200. FIGS. 7A and 7B show an example in which one projector 100A and one HMD 200 operate.

In the HMD 200, the image pickup control unit 313 controls the camera 261 to execute image pickup and acquire pickup image data (Step S21).

The work information generation unit 315 generates work information including the pickup image data acquired in Step S21, and the communication control unit 311 transmits this data to the projector 100A (Step S22). In Step S22, the work information generation unit 315 may include data about an operation detected by the input information acquisition unit 270, in the work information.

In the projector 100A, the communication control unit 33 receives the work information transmitted from the HMD 200, and the received information processing unit 34 analyzes the received work information (Step S11). The received information processing unit 34 extracts the pickup image data from the received work information, and the projection control unit 32 causes the pickup image to be displayed (Step S12). If the work information received by the communication control unit 33 includes data about an operation, the received information processing unit 34 may generate data for displaying information about the operation superimposed on the pickup image, and the projection control unit 32 may cause this data to be displayed.

In the projector 100A, contents are selected by an operation by the support provider UA (Step S13), and an operation for the support provider UA to give an instruction or the like to the support recipient UB is carried out (Step S14). In Step S13, for example, contents for support including a text and image are selected. In Step S14, for example, an operation to point at a position to which the support recipient UB is to pay attention, in the image received by the communication control unit 33 and currently displayed, is carried out. The operation in Step S14 is an operation on the remote control light receiving unit 18 or the operation panel 19, or an operation in which the support provider UA moves the indicator in front of the projector 100A. This operation is detected by the operation detection unit 35 (Step S15). The operation detection unit 35 generates data of the detected operation.

The operation detection unit 35 generates data which associates the operation position of the detected operation or the trajectory of the operation with the pickup image of the HMD 200 that is currently displayed (Step S16). Thus, data indicating a specified position in the display area DA at the support recipient site B is obtained. The transmission image acquisition unit 37 slices out an image of the indicator from the pickup image picked up by the image pickup unit 15 during the operation in Step S14, or reads out the transmission image data 54 from the storage unit 50, and thus acquires a transmission image (Step S17).

The instruction information generation unit 38 generates and transmits instruction information including the image data of the image of the indicator acquired by the transmission image acquisition unit 37, the data indicating the operation position and the trajectory of the operation, and the data associating the operation position and the trajectory of the operation with the pickup image of the HMD 200 (Step S18).

Here, the instruction information generation unit 38 generates instruction information including data of an image indicating the point of view or line-of-sight direction of the support provider UA or data of necessary coordinates or direction for displaying the image. Specific examples of this data may be, for example, data of an image of the indicator used by the support provider UA, and data indicating the direction and position of the indicator. It is preferable that the indicator in this case has a size and shape from which its direction can be clearly determined.

The control unit 30 determines whether a condition to end the operation is met or not (Step S19). If the end condition is not met (Step S19, NO), the control unit 30 returns to Step S11. If the end condition is met (Step S19, YES), this processing ends. The end condition may be, for example, that ending the operation or shutting down the projector 100A is designated by an operation on the remote control light receiving unit 18 or the operation panel 19, or the like.

In the HMD 200, the communication control unit 311 receives the instruction information transmitted from the projector 100A (Step S23), and the received information analysis unit 317 analyzes the received instruction information and extracts image data (Step S24). Next, the display position calculation unit 321 calculates the position where an image is to be displayed on the basis of each image data (Step S25). Moreover, the display information generation unit 325 generates display information in which an image is arranged at the calculated display position, and the image processing unit 303 and the display control unit 305 cause the image to be displayed (Step S26).

The control unit 300 determines whether a condition to end the operation is met or not (Step S27). If the end condition is not met (Step S27, NO), the control unit 300 returns to Step S22. If the end condition is met (Step S27, YES), this processing ends. The end condition may be, for example, that ending the operation or shutting down the HMD 200 is designated by an operation on the operation unit 279, or the like.

Figure 8A:
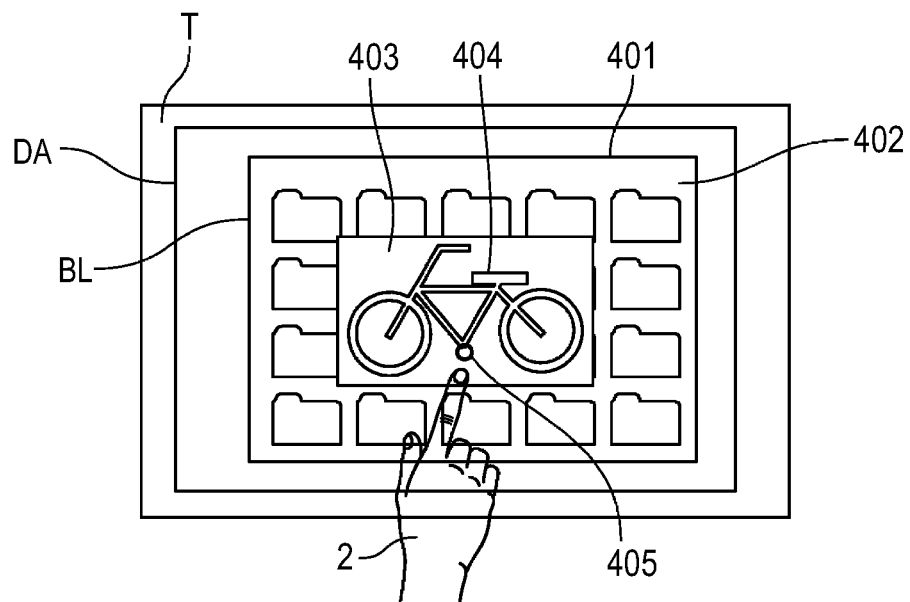
FIGS. 8A to 8C show display examples by the projector.
Figure 8B:
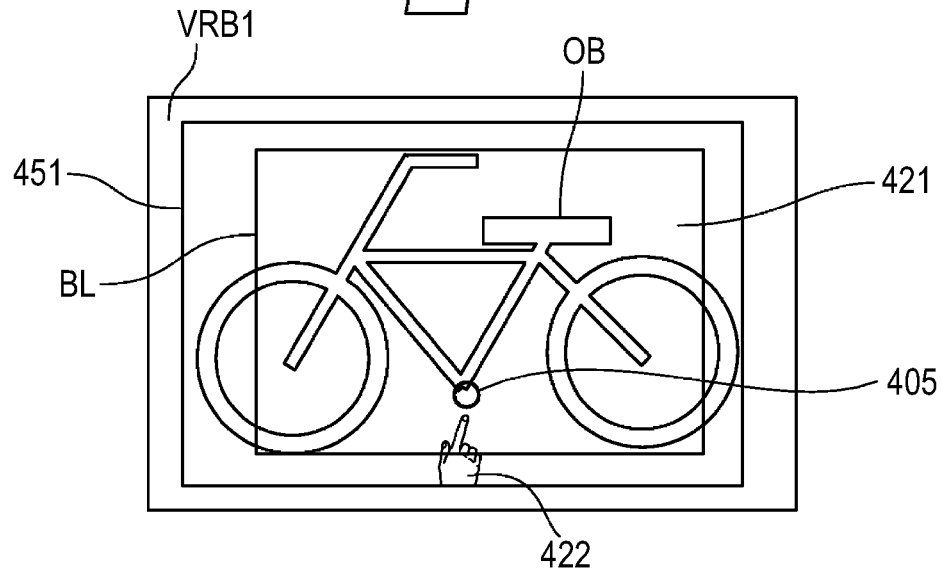
Figure 8C:
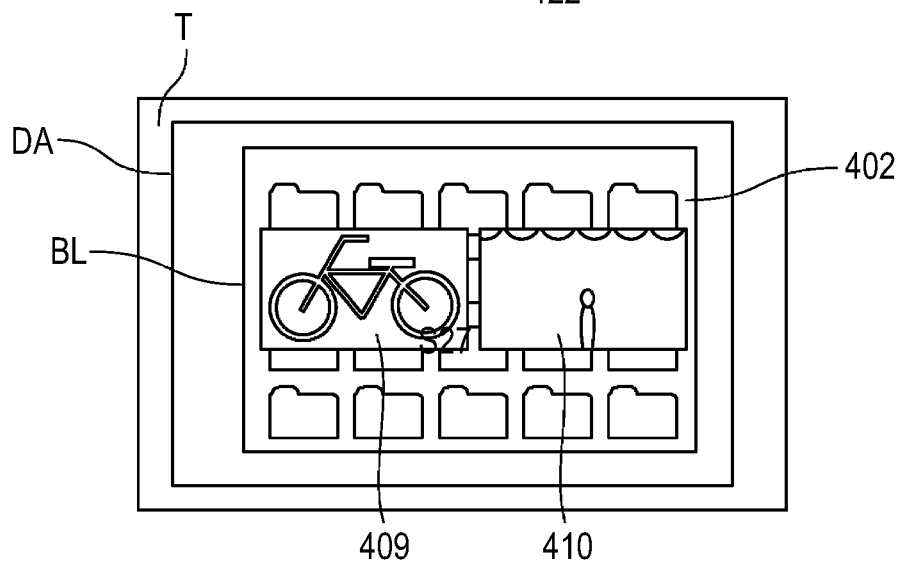

FIGS. 8A to 8C show display examples in the display system 1. FIG. 8A shows a display example by the projector 100A. FIG. 8B shows a display example by the HMD 200. FIG. 8C shows another display example by the projector 100A. Here, FIG. 8B shows an example of the field of view of the right eye of the support recipient UB. The field of view of the left eye is not illustrated because it is the same as or bilaterally symmetrical with each illustration. Also, the display example of FIG. 8B is similar in the HMD 200 worn by the support recipient UC.

Here, of the instruction information (guide information) generated by the instruction information generation unit 38, the information associating the operation with the work information, or the information associating the operation with the pickup image included in the work information is not particularly limited to any specific form. In the above example, this information is described as data associating the operation position and the trajectory of the operation with the pickup image of the HMD 200. However, simply, the operation position or the trajectory of the operation itself may be used as this information. Also, data associating the operation position or the trajectory of the operation with the pickup image of the HMD 200 on the basis of the correspondence by file name, data type, ID, attribute, position or the like, may be employed. Any information that enables the correspondence to be recognized as a result may be used.

As shown in FIG. 8A, the projector 100A displays an image in the display area DA on the worktop T. In the example of FIG. 8A, a support provider screen 402 is displayed in the display area DA. The support provider screen 402 is a screen displayed by the functions of the OS 31 and the functions of an application program operating on the OS 31. In the example of FIG. 8A, the support provider screen 402 is a screen relating to an operation on files and folders.

When work information is received from the HMD 200, the projector 100A displays a pickup image of the HMD 200, as shown in FIG. 8A (Step S12 in FIG. 7A). In the display area DA, the support provider screen 402 including the pickup image is displayed. The support provider screen 402 includes a pickup image 403 picked up by the HMD 200 in Step S21. The pickup image 403 includes an image 404 of an object to be worked on OB. That is, with the display shown in FIG. 8A, the support provider UA can learn that the object to be worked on OB is present in the field of view (field of vision) of the support recipient UB at the support recipient site B.

The pickup image 403 is displayed, superimposed on the screen displayed by the functions of the OS 31 or the functions of an application program operating on the OS 31. When work information is received from the HMD 200, the projection control unit 32 can cause the pickup image 403 to be displayed, superimposed on a screen that is displayed before the work information is received from the HMD 200.

In the display area DA, an image pickup boundary line BL is displayed as well. The inside of the image pickup boundary line BL is the image pickup range PA to be picked up by the projector 100A. Therefore, the support provider UA carries out an operation in such a way that the indicator is located in the image pickup range PA.

In the example of FIG. 8A, an indicator 2 is a hand of the support provider UA. The support provider UA carries out an operation in which, for example, the image 404 of the object to be worked on OB displayed in the display area DA is pointed at with the indicator 2. In the projector 100A, the operation detection unit 35 detects an indication position 405 indicated by the indicator 2, and the relative positions between the indication position 405 and the pickup image currently displayed in the display area DA are calculated. In the projector 100A, the instruction information generation unit 38 generates instruction information including data about the indication position 405 of the indicator 2 and data about the direction of the indicator 2.

As described above, the instruction information generated by the instruction information generation unit 38 includes data of an image indicating the point of view or line-of-sight direction of the support provider UA, or data of necessary coordinates or direction for displaying the image. When the operation in FIG. 8A is carried out, the instruction information generation unit 38 generates instruction information which clarifies the position indicated by the indicator 2 and the direction of the indicator 2.

In the field of view VBR1 of the support recipient shown in FIG. 8B, an area corresponding to the half mirror 286A (FIG. 5) is a display area 451, and an image drawn on the right LCD 284 (FIG. 5) is displayed in the display area 451. Since the half mirror 286A transmits the external landscape, the object to be work on OB present in the field of view of the support recipient is visually recognized through the display area 451. Also, an indication image 421 is displayed in the display area 451. The indication image 421 includes a mark indicating the indication position 405 pointed at by the support provider with the indicator 2, and an indicator image 422. The indicator image 422 is an image displayed in the same direction as in the case where the support provider UA points at the indication position 405 with the indicator 2. In the example of FIG. 8B, the pickup image picked up by the projector 100A with the image pickup unit 15 is used. The mark indicating the indication position 405 and the indicator image 422 are displayed in such a way as to be superimposed on the object to be work on OB. The indicator image 422 may also be an image displayed on the basis of image data included in the instruction information received by the HMD 200 from the projector 100A in Step S23 of FIG. 7B. In this case, the position of the indication position 405 and the direction of the indicator are designated by the data included in the instruction information, and the HMD 200 may display the indicator image 422 on the basis of this data.

As shown in FIG. 2, the projector 100A is fixed to the worktop T and projects an image in the display area DA. However, the position of the support provider UA is not limited to the position opposite the projector 100A as shown in FIG. 2. The support provider UA can carry out work, extending his/her hands or the like from arbitrary directions to the worktop T. Also, the support recipient UB can carry out work on the object to be work on OB while looking at the image displayed by the HMD 200, in a hands-free state where the support recipient UB can freely use both his/her hands and without having any limitation to his/her position.

Therefore, the direction in which the support provider UA sees the display area DA, and the direction in which the support recipient UB visually recognizes the image on the HMD 200 do not necessarily coincide with each other. Thus, in the display system 1, in the case of displaying on the HMD 200 an image or the like about an operation or indication carried out by the support provider UA, it is preferable that the image is displayed in such a way as to reflect the position and point of view or line-of-sight direction of the support provider UA at the time of carrying out the operation or indication. In the example of FIG. 8B, if not only the image or symbol (mark) indicating the indication position 405 is displayed but also the support recipient UB can grasp the direction of the body of the support provider UA at the time of pointing at the indication position 405, a more accurate instruction or guidance can be given. Therefore, the projector 100A transmits instruction information including data for displaying an image indicating the point of view or line-of-sight direction of the support provider UA carrying out an operation (for example, the indicator image 422 in FIG. 8B). The HMD 200 displays an image indicating the point of view or line-of-sight direction of the support provider UA carrying out the operation, on the basis of the instruction information. In the example of FIG. 8B, the indicator image 422 in which the position and direction can be grasped is displayed at the position corresponding to the indication position 405 and in the direction corresponding to the operation of the support provider UA.

Thus, in the display system 1, since the projector 100A displays the support provider screen 402 including a pickup image of the HMD 200, the support provider UA can give an instruction or the like on the work while viewing the work environment of the support recipient UB. Also, instruction information including data indicating the indication position indicated by the support provider UA with the indicator 2 and the point of view or line-of-sight direction of the support provider UA at the time of carrying out the indication is transmitted to the HMD 200. Therefore, the support recipient UB can view, via the HMD 200, the position and contents of the indication or operation by the support provider UA and how it is carried out, and can learn the point of view or line-of-sight direction of the support provider UA in this case.

Moreover, the HMD 200 displays the indication image 421 including the mark indicating the indication position 405 and the indicator image 422, at a position corresponding to the position of the object to be work on OB, which is an object in the real space. The display position of the mark or the indicator image 422 included in the indication image 421 is a position decided according to the position of the object to be work on OB specified by the display position calculation unit 321. Therefore, displaying information in a superimposed manner on the object to be work on OB or at the position corresponding to the object to be work on OB can achieve a kind of AR (augmented reality) display effect. Here, the image data for displaying the indicator image 422 may be stored in the storage unit 340 of the HMD 200, and data designating an image stored in the HMD 200 may be included in the instruction information transmitted from the projector 100A to the HMD 200.

The HMD 200 may also display, in the display area 451, an image pickup boundary line BL indicating the boundary of the range that can be picked up by the camera 261, as shown in FIG. 8B. For example, if the image pickup range of the camera 261 is narrower than the field of view VBR1 of the external landscape (real space) that can be visually recognized through the HMD 200, the image pickup boundary line BL may be displayed in order to inform the support recipient UB of the image pickup range of the camera 261. In this case, being aware of the image pickup range of the camera 261, the support recipient UB can carry out work, for example, from a point of view such that the object to be work on OB falls within the image pickup range. Therefore, there is an advantage that the object to be work on OB and the hands or the like of the support recipient UB are securely included in the pickup image included in the work information transmitted from the HMD 200 to the projector 100A. Meanwhile, if the image pickup range of the camera 261 of the HMD 200 includes the field of view VBR1 of the support recipient UB, the support recipient UB can carry out work in such a way that the object to be work on OB and his/her hands are visible in the field of view VBR1 and therefore the image pickup boundary line BL need not be displayed. In other words, the image pickup boundary line BL is not essential, and if at least a part of the field of view VBR1 is not included in the image pickup range due to the specifications or the like of the image pickup range (angle of view) of the camera 261, the image pickup boundary line BL may be displayed.

In some cases, pickup image data of the camera 261 may be optically processed by the camera 261 or mat be processed by the control unit 300 so as to utilize the zooming function, and work information to be transmitted to the projector 100A may be generated on the basis of the zoomed pickup image data. In such cases, the range included in the pickup image data, that is, the image pickup range becomes narrower as the zoom magnification becomes higher. Therefore, if the image pickup range does not include the entire of the field of view VBR1, the image pickup boundary line BL may be displayed. That is, the image pickup boundary line BL may be displayed on the basis of the relative state between the image pickup range and the field of view VBR1 in the case where the image pickup range changes due to the zooming function to the pickup image of the camera 261.

As shown in FIG. 1, the display system 1 can be used with a plurality of HMDs 200 connected to the communication network 4. In this case, the projector 100A can receive and display work information from the plurality of HMDs 200. A display example in this case is shown in FIG. 8C.

FIG. 8C shows an example in which the projector 100A displays images based on the work information received from two HMDs 200. In the example of FIG. 8C, two display areas 409, 410 for displaying pickup images are arranged in the display area DA. In the display area 409, an image based on the work information transmitted from one HMD 200 is displayed. In the display area 410, an image based on the work information transmitted from the other HMD 200 is displayed. When an indication with the indicator 2 is carried out to the images displayed in the display areas 409, 410, the projector 100A generates and transmits instruction information to the HMD 200 which has transmitted the work information corresponding to the indicated position.

In the case where the display system 1 includes a plurality of HMDs 200, instruction information transmitted from the projector 100A to one HMD 200 may be transmitted to the other HMD(s) 200 as well. That is, instruction information of the same contents may be transmitted to the plurality of HMDs 200. In this case, when the projector 100A generates instruction information corresponding to the work information transmitted from one HMD 200 to the projector 100A in Step S22 of FIG. 7B, this instruction information is transmitted to the other HMDs 200 as well. In this example, the contents of instruction information transmitted to one support recipient UB can be learned by the other support recipients (for example, support recipient UC).

As described above, the display system 1 according to the first embodiment to which the invention is applied has the HMD 200 and the projector 100A. The HMD 200 has the image display unit 220 displaying an image, the camera 261, and the communication unit 277 executing communication with the projector 100A. The HMD 200, under the control of the control unit 300, causes the communication unit 277 to receive instruction information from the projector 100A and causes the image display unit 220 to display an image based on the instruction information. The projector 100A has the projection unit 20 displaying an image in the display area DA, the communication unit 13 executing communication with the HMD 200, and the operation detection unit 35 detecting an operation. The projector 100A, under the control of the control unit 30, generates instruction information including information indicating an operation detected by the operation detection unit 35 and causes the communication unit 13 to transmit the instruction information. The HMD 200, under the control of the control unit 300, displays an image corresponding to the operation detected by the operation detection unit 35 of the projector 100A on the basis of the instruction information received from the projector 100A. Moreover, the HMD 200 causes the image display unit 220 to display an image indicating the point of view or line-of-sight direction of the support provider UA carrying out the operation.

The display system 1 and the HMD 200 thus configured and the execution of the information display method using the display system 1 have the following advantageous effects. That is, since the HMD 200 displays an image about an operation carried out in the projector 100A, the support provider UA can provide information to the support recipient UB by operating the projector 100A. Also, since the image or information displayed by the HMD 200 can give guidance on the direction of the operation or the like carried out by the support provider UA with the projector 100A, the support recipient UB does not misunderstand the direction of the image or information. Thus, information can be properly provided from the support provider UA to the support recipient UB.

The control unit 30 of the projector 100A generates instruction information including information indicating an operation detected by the operation detection unit 35 with reference to the point of view of line-of-sight direction of the support provider UA carrying out the operation. Thus, since the information with reference to the point of view of line-of-sight direction of the support provider UA is transmitted to the HMD 200 with respect to the operation in the projector 100A, the support recipient UB can be given guidance on the point of view or line-of-sight direction of the support provider UA.

The image display unit 220 of the HMD 200 displays an image in the display area 451 including the object arrangement area where the object to be work on OB is arranged, in the field of view VBR1 of the support recipient UB. The control unit 300 displays an image at the position corresponding to the object to be work on OB arranged in the field of view VBR1. Thus, an image can be displayed at the position corresponding to the object to be work on OB and guidance on the proper direction of this image can be given. Therefore, information about the object to be work on OB can be provided effectively.

The camera 261 of the HMD 200 picks up an image over an image pickup range including at least a part of the object arrangement area where the object to be work on OB is arranged. The control unit 300 causes the display position calculation unit 321 to specify the display position of the image corresponding to the position of the object to be work on OB on the basis of the pickup image of the camera 261. Thus, an appropriate position can be decided as the display position of the image corresponding to the object to be work on OB.

The control unit 300 may cause the image display unit 220 to display the image pickup boundary line BL, which is an image indicating the image pickup range of the camera 261 in the display area 451 or in the field of view VBR1. In this case, since the support recipient UB can recognize the image pickup range in the area where the support recipient UB visually recognizes the display image of the HMD 200, the image pickup function of the camera 261 can be utilized effectively.

The control unit 300 generates work information based on the pickup image of the camera 261 and causes the communication unit 277 to transmit the work information to the projector 100A. The control unit 30 of the projector 100A causes the communication unit 13 to receive the work information from the HMD 200 and cause the projection unit 20 to display an image based on the work information. Moreover, the control unit 30 generates instruction information including information indicating an operation detected by the operation detection unit 35 during the display of the image based on the work information. Thus, using the pickup image, information about the work or the like carried out by the support recipient UB wearing the HMD 200 can be transmitted to the support provider UA using the projector 100A. Therefore, the support recipient UB can be supported with his/her work or the like, using a greater volume of information.

The projector 100A also has the image pickup unit 15 picking up and image over a range including at least a part of the image pickup range PA, which is the detection area where the operation detection unit 35 detects an operation. The control unit 30 generates information indicating the operation detected by the operation detection unit 35, on the basis of the pickup image of the image pickup unit 15, and generates instruction information including this generated information. Thus, the pickup image or the like of a operation carried out within the image pickup range of the projector 100A can be displayed by the HMD 200. Therefore, the support provider UA can provide more detailed information about the work or the like to the support recipient UB.

The control unit 30 may generate instruction information including an image of an indicator corresponding to an operation detected by the operation detection unit 35. In this case, since the HMD 200 can display an image of the indicator with which the operation is carried out in the projector 100A, the contents and direction of the operation in the projector 100A can be displayed by the HMD 200 more intuitively and intelligibly.

The control unit 300 may cause the image display unit 220 to display an image for guidance on an operation to the support recipient UB wearing the HMD 200, on the basis of the instruction information received from the projector 100A. In this case, the support recipient UB can be properly guided on the operation.

Specific application examples of the display system 1 will be described.

The display system 1 can be used, for example, in order for the support provider UA to support the support recipient UB with his/her work of operating an apparatus, by providing information about the operation of the apparatus from a distant location such as explaining the operation of the apparatus and giving guidance. Specifically, the display system 1 can be applied to the case where, using a personal computer as an object to be work on, setup and operations on an application program are carried out. The display system 1 can also be applied, for example, to the case where operations on or maintenance of the machine is carries out to machines such as machine tools, industrial machinery or various home electronics. That is, the display system 1 can be used for the support provider UA to support a low-skilled support recipient UB in the case where the support recipient UB carrying out maintenance of various machines visits the installation site of a target machine to be worked on and carries out the maintenance in response to a request from the user.

In this example, as the target object to be work on OB, machines such as machine tools, industrial machinery or various home electronics, and a personal computer or the like can be placed on the worktop T. Also, the position where these apparatuses and personal computer or the like are placed can be regarded as the worktop T. In this case, the support recipient UB wearing the HMD 200 can carry out work in a hands-free state at the site where the target machines such as machine tools, industrial machinery and various home electronics, and a personal computer or the like are placed.

In such a case, the support recipient UB present at the support recipient site B, which is a distant location, and the support provider UA present at the support site A such as a service center or the like, can share information. The support provider UA at the support site A can change the indication and display by causing the HMD 200 to display an AR image. Then, the support provider UA can provide support by causing the HMD 200 to show an operation of the hands and fingers of the support provider UA at the support site A, as a virtual image. In this case, it is effective that the same apparatus as the object to be work on at the support recipient site B is placed in front of the support provider UA at the support site A and that the support provider UA explains while actually operating the apparatus. The support provider UA can give an instruction or teaching by performing a position indication operation on a specific part of the actual object at the site and therefore can give efficient support with a simple operation.

As another application example, image data and text of a business card may be included in the instruction information transmitted from the projector 100A. Thus, the business card can be shown to the support recipient UB. In this case, image data of an image simulating an arm of the support provider UA is included in the instruction information, and thus the arm presenting the business card is displayed by the HMD 200, enabling a virtual exchange of business cards.

This exchange of business cards may be carried out between the support provider UA at the support site A and the support recipient UB at the support recipient site B, and subsequently the operation described in the embodiment may be executed.

Moreover, if the projector 100A transmits instruction information including data of contents to the HMD 200, contents including a text and image can be displayed on the image display unit 220 of the HMD 200. In this case, it is preferable that the display position of the text and image of the contents is a position not obstructing the visibility of the object to be work on OB, in accordance with the actual position of the object to be work on OB located in the field of view VBR1.

Also, as data of contents, audio data may be included in the instruction information and transmitted from the projector 100A to the HMD 200. The audio data of contents may be data stored in advance in the storage unit 50, or may be audio data of a voice of the support provider UA collected by the audio input/output unit 14. In this case, the HMD 200 outputs a sound from the audio input/output unit 14 on the basis of the audio data included in the instruction information.

Moreover, by using an image of an avatar playing the role of the support provider UA or an image of the face, upper body or whole body of the support provider UA himself/ herself as an image of the indicator, it is possible to realize a service targeted at consumers instead of workers. In this case, the support provider UA is a staff member of a call center, a home tutor, a teaching staff member of a cram school, or the like. The applications of this system include guidance or training on installation and operation of software on electronic apparatuses, language education, guidance for qualifying examinations, training courses for public qualifications such as driver's license, sports coaching, and the like. Also, for example, in courses for foreign language conversations, pronunciation can be taught visually. In this case, the student uses the HMD 200. In this case, the teacher uses the projector 100A and the student can visually recognize the shape of the teacher's mouth on the HMD 200. In this case, by looking at a mirror in the real space, the student can see an image of the student's mouth reflected in the mirror and an image of the teacher's mouth displayed by the image display unit 220, in a superimposed manner or in comparison with each other. Also, on the HMD 200, an image of the teacher's mouth may be AR-displayed in such a way as to be superimposed on an image of the student's mouth reflected in the mirror.

In the case of guidance for learning or sports coaching, the guidance/coaching side uses the projector 100A at the support site A, and the recipient side uses the HMD 200. The support site A, including such cases, can be called a "management site" where the person who gives guidance or carries out management is present. The projector 100A can be called a management device. The support recipient site B, C can be called an "execution site" where the person who receives guidance or teaching and executes learning or the person who executes work is present. The HMD 200 can be called an execution-side device.

In this configuration, the display area DA where the projector 100A projects an image is set to a large enough area for a person to move around, for example, and using a floor surface as the display area DA is more effective. In this case, for example, the projector 100A may be installed above the floor surface. Preferably, the projector 100A may be installed above the support provider UA and configured to project an image downward and pick up an image from below. Specifically, the projector 100A may be suspended from the ceiling.

The work information transmitted from the HMD 200 to the projector 100A can be called guide target information or execution-side information. The instruction information can be called guide information, guidance information or management information.

As a specific example of guidance, it is conceivable that the person who gives guidance on study subjects such as mathematics, English, Japanese, social studies, and the proper order of strokes in writing characters, uses the projector 100A, and that the person who receives guidance receives teaching and guidance based on the contents displayed on the HMD 200. The application for the purpose of giving guidance on a method for operating an apparatus such as personal computer is similar to this.

In the projector 100A and the HMD 200, specified information may be highlighted by pop-up, blinking, displaying in a fluorescent color, or the like. Also, the display color or display luminance of the displayed image may be changed in such a way to increase the visibility of the object to be work on OB on the worktop T. In this case, techniques such as reducing the luminance of the image light projected from the projection unit 20, or reducing the color tone or saturation of the image light, can be employed. In this case, the visibility of the display image is reduced relatively to the external landscape, thus having an effect that the characters and images included in this display image appear auxiliary. Also, when the HMD 200 causes the image display unit 220 to display an image, the display color and display luminance of the displayed image may be changed in such a way as to increase the visibility of the object to be work on OB in the real space. In this case, techniques such as reducing the luminance of the image light that becomes incident on the right eye RE and the left eye LE from the right optical image display unit 226 and the left optical image display unit 228, or reducing the color tone or saturation of the image light, can be employed. In this case, the visibility of the display image is reduced relatively to the real space, thus having an effect that the characters and images included in this display image appear auxiliary.

In the display system 1, the contents or the like of the work of the support recipient UB using the HMD 200 can be seen with the projector 100A in a distant location, and the support recipient UB can see the contents of a position indication operation carried out by the support provider UA in the image pickup range PA of the projector 100A. The HMD 200 performs AR display of the contents of the position indication operation, for example, as the indicator image 422. That is, in the HMD 200, the indicator image 422 is displayed in such a way as to be superimposed on the object to be work on OB, and the AR display effect can be expected on the basis of the positions of the indicator image 422 and the object to be work on OB.

The HMD 200 may display a stereoscopic image when displaying the indicator image 422 or the like, in order to increase the AR display effect. In this case, the control unit 300 decides the direction and magnitude of the parallax between an image for the left eye and an image for the right eye, according to the type of the object to be work on OB and the contents of the work. The display information generation unit 325 of the control unit 300 generates an image having the parallax on the basis of the instruction information, and the display control unit 305 causes the image to be displayed. The control unit 300 may also cause the distance sensor 264 to detect the distance to the object to be work on OB. In this case, the control unit 300 may calculate the direction and magnitude of the parallax between the images of the indicator to be AR-displayed, on the basis of the detected distance to the object to be work on OB. For example, the parallax may be provided on the basis of a preset distance condition. In this case, an image is stereoscopically displayed to the support recipient UB. Also, the projector 100A may display a stereoscopic image so as to enable the support provider UA to visually recognize the image in a stereoscopic manner.

In the display system 1, the control unit 300 displays the indicator image 422 corresponding to the operation position of an operation detected in the projector 100A, on the basis of the instruction information received from the projector 100A, as illustrated in FIG. 8B. Therefore, the position and contents of the operation detected by the projector 100A can be displayed more intelligibly on the HMD 200.

In the display system 1, the control unit 300 displays a mark indicating the indication position 405 of an operation detected in the projector 100A, and the indicator image 422, on the basis of the instruction information received from the projector 100A, as illustrated in FIG. 8B. Therefore, the position and contents of the operation detected by the projector 100A can be displayed more intelligibly on the HMD 200.

In the display system 1, at the support recipient site C, the work operation of the support recipient UB at the support recipient site B can be seen as an AR image from a distant location. Thus, the contents of work support such as work procedures can be shared.

If the display by the projector 100A and the pickup image by the HMD 200, or images based on the work information of two or more HMDs 200 are displayed in two or more display areas by the projector 100A, the support provider UA can visually recognize many more circumstances. Here, as shown in FIG. 8C, in the case of displaying images corresponding to two or more HMDs 200 in two or more display areas, it is conceivable that confusion between the individual display areas is prevented by changing the shape or color of a pointer or the like in each display area.

Moreover, the scope of application of the display system 1 is not limited at all. As a matter of course, the display system 1 can be applied to other purposes as well.

The indicator image is not limited to the arm, hand and finger of the support provider UA, the indicator stick or the like, and may also be a tool, apparatus or the like involved in the work carried out by the support recipient UB. That is, the support provider UA may use the tool or apparatus used by the support recipient UB, as the indicator. In this case, the projector 100A used by the support provider UA may transmit a pickup image formed by picking up an image of the indicator to the HMD 200 as the indicator image. Also, the projector 100A may select an image of a tool or apparatus of the same type as the indicator or associated in advance with the indicator, from transmission image data, on the basis of a pickup image formed by picking up an image of the indicator, and may transmit the selected image as the indicator image. Also, the support provider UA may operate the projector 100A to select an image of a tool, apparatus or the like involved in the work carried out by the support recipient UB, as the indicator image, and transmit this image to the HMD 200 as the indicator image. For example, in the case where the support recipient UB carries out work using a tool, an image of a screwdriver, pliers, an adjustable spanner, a test terminal of a continuity tester, a kitchen knife, or other special tools can be employed as the indicator image. Also, in the case where the support provider UA provides sports coaching to the support recipient UB via the display system 1, an image of a tennis racket, golf club or the like can be employed as the indicator image.

In this way, since the image of the indicator displayed by the HMD 200 on the basis of the guide information is an image of the tool or apparatus involved in the work carried out using the HMD 200, the person using the HMD 200 can be guided on his/her work more intelligibly.

The control unit 30 acquires the image of the tool or apparatus involved in the work carried out using the HMD 200, as the image of the indicator corresponding to the operation detected by the operation detection unit 35, then generates guide information including the acquired image of the indicator, and transmits the guide information to the HMD 200. In this case, the support recipient UB wearing the HMD 200 can be guided more intelligibly on the work carried out by the support recipient UB, utilizing the image corresponding to the position and contents of the operation detected by the projector 100A.

Second Embodiment

Figure 10:
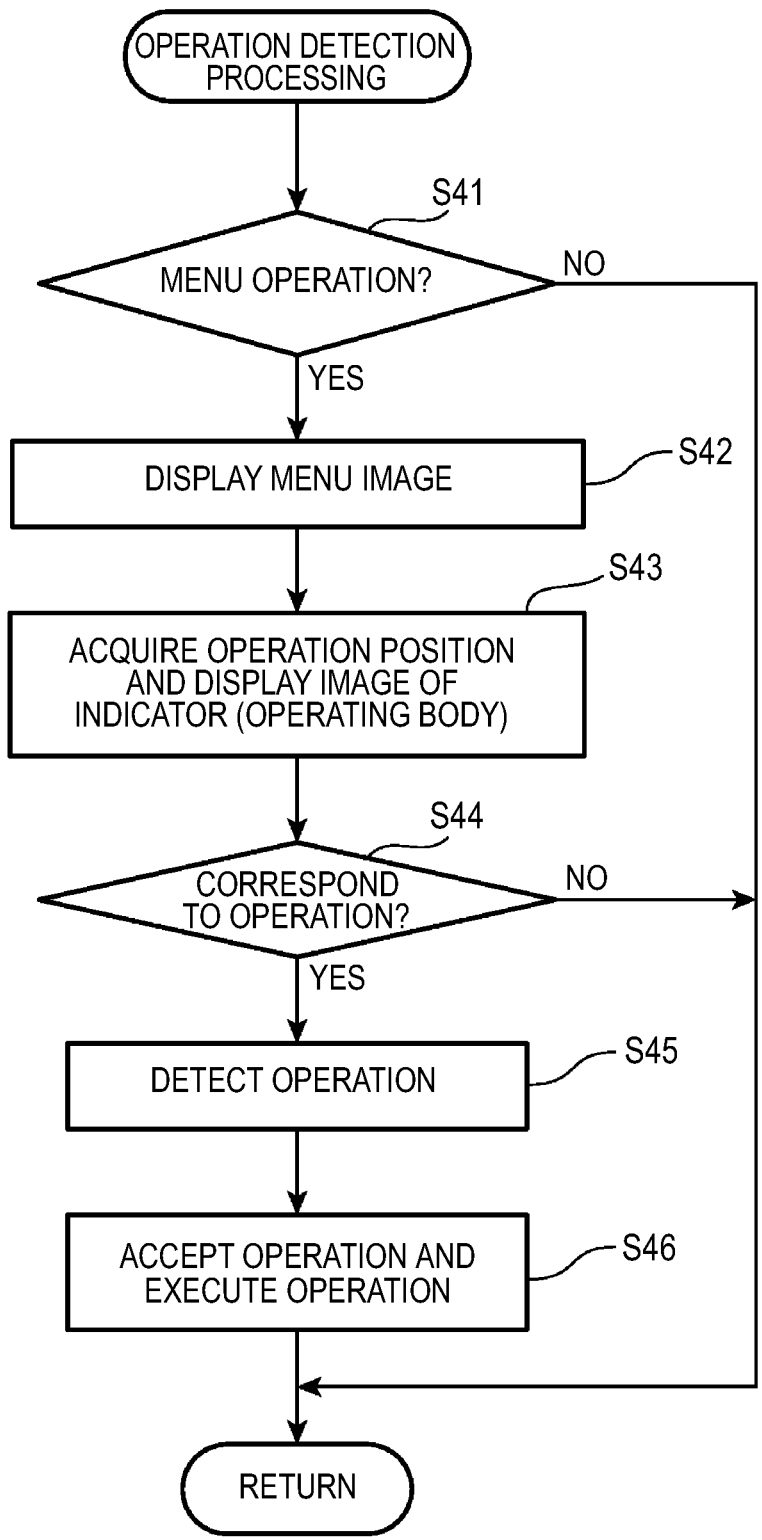
FIG. 10 is a flowchart showing operations in the display system according to the second embodiment.
Figure 11A:
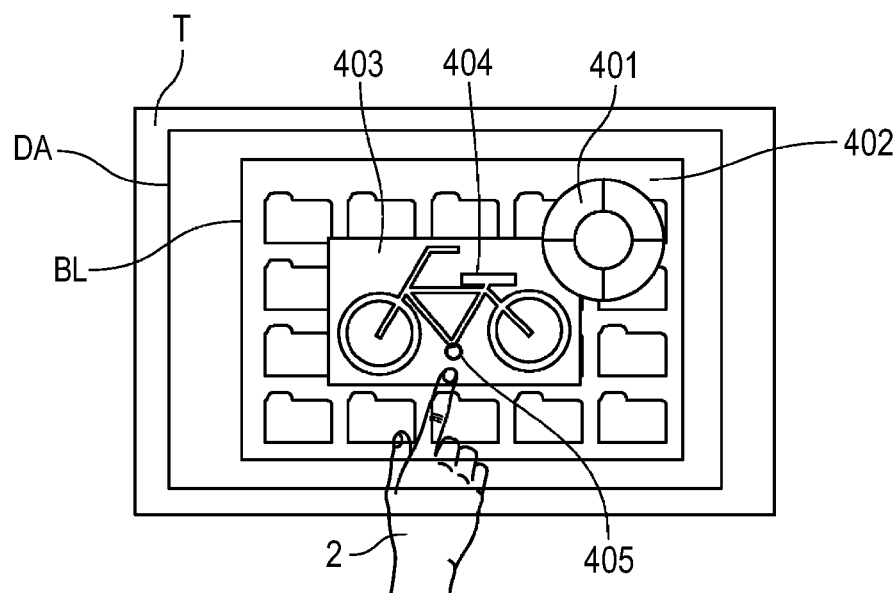
FIGS. 11A to 11C show display examples by the projector according to the second embodiment.
Figure 11B:
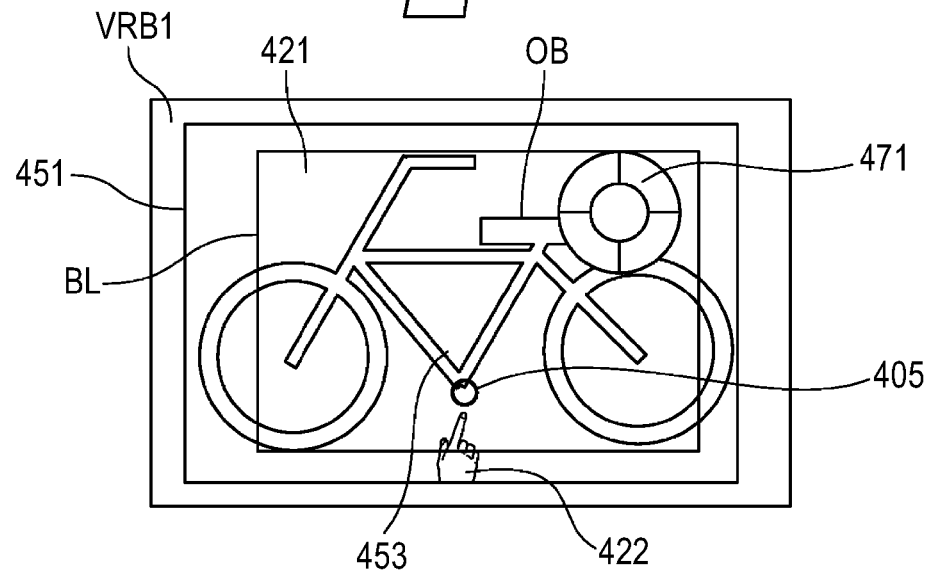
Figure 11C:
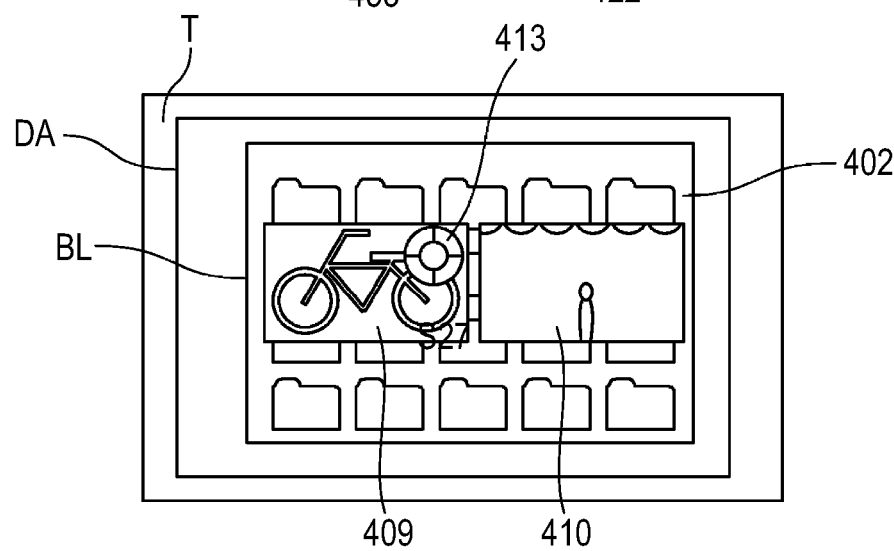

FIGS. 9A and 9B and FIG. 10 are flowcharts showing operations in a display system 1 according to a second embodiment. FIG. 9A shows operations of a projector 100A. FIG. 9B shows operations of an HMD 200. FIGS. 11A to 11C show display examples by the projector 100A and the HMD 200 in the second embodiment.

Since the display system 1 according to the second embodiment is configured similarly to the display system 1 described in the first embodiment, the illustration and description of the configuration of each part of the display system 1 will not be given further. In the flowcharts of FIGS. 9A and 9B, the same operations as described in the first embodiment (FIGS. 7A and 7B) are denoted by the same step numbers.

The second embodiment is similar to the first embodiment in that work information including a pickup image picked up by the camera 261 of the HMD 200 is transmitted to the projector 100A and displayed by the projector 100A. In the second embodiment, operations of the HMD 200 can be controlled by a position indication operation carried out in the projector 100A.

In the operations of the projector 100A shown in FIG. 9A, Steps S11 to S17 are the same as described in the first embodiment.

After the transmission image acquisition unit 37 acquires the transmission image in Step S17, whether or not to carry out a menu operation on the HMD 200 is designated by an operation on the remote control light receiving unit 18 or the operation panel 19 (Step S31). Then, the instruction information generation unit 38 generates instruction information including data designating whether or not to carry out a menu operation, and transmits the instruction information to the HMD 200 (Step S32). The instruction information generated in Step S32 includes image data of the image of the indicator acquired by the transmission image acquisition unit 37, data indicating the operation position or the trajectory of the operation, and data associating the operation position or the trajectory of the operation with the pickup image of the HMD 200.

In the operations of the HMD 200 shown in FIG. 9B, Steps S21 to S26 and Step S27 are the same as described in the first embodiment.

In the HMD 200, in Step S26, the communication unit 277 receives the instruction information transmitted from the projector 100A, and the display information generation unit 325 generates display information based on this instruction information. The image processing unit 303 and the display control unit 305 causes the display information to be displayed. After that, the HMD 200 executes operation detection processing (Step S35).

FIG. 10 is a flowchart showing details of the operation detection processing executed by the HMD 200.

In this operation detection processing, the operation detection unit 323 of the HMD 200 extracts the data designating whether or not to carry out a menu operation, from the instruction information received in Step S24, and determines whether or not to carry out a menu operation, on the basis of this data (Step S41). If it is determined that a menu operation is not to be carried out (Step S41, NO), the processing shifts to Step S27 of FIG. 9B.

If it is determined that a menu operation is to be carried out (Step S41, YES), the operation detection unit 323 decides the display position of a menu image and causes the menu image to be displayed (Step S42). Here, the display position of the menu image may be designated by data included in the instruction information transmitted from the projector 100A, or may be a predetermined position. Also, the operation detection unit 323 may automatically decide the position. Next, the operation detection unit 323 acquires data indicating the operation position from the instruction information (Step S43) and determines whether the acquired operation position is a position corresponding to the menu image or not (Step S44).

Here, if it is determined that the operation position is not a position corresponding to the menu image (Step S44, NO), the control unit 300 shifts to Step S27.

It the operation position is a position corresponding to the menu image (Step S44), the operation detection unit 323 detects an operation on the menu image (Step S45). In this Step S45, the operation detection unit 323 specifies an operation image corresponding to the operation position, of operation images such as a plurality of icons arranged on the menu image. The control unit 300 executes the operation corresponding to the operation image specified by the operation detection unit 323 (Step S46) and shifts to Step S27 after this operation.

FIG. 11A shows a display example by the projector 100A. FIG. 11B shows a display example by the HMD 200, in which the field of view VBR1 of the support recipient wearing the HMD 200 is shown. FIG. 11C shows another display example by the projector 100A.

In the display example by the projector 100A shown in FIG. 11A, the pickup image 403 of the HMD 200 is displayed in the display area DA. If the execution of a menu operation is designated by an operation on the remote control light receiving unit 18 or the operation panel 19, the projector 100A displays a menu image 411 in the display area DA.

The menu image 411 is not an image to carry out an operation on the projector 100A but is an image displayed in order to carry out an operation on the HMD 200. The menu image 411 includes a plurality of button-like icons (operation images), for example. Each icon is associated with an operation to be executed by the HMD 200. Operations of this type may include, for example, enlarging/reducing the display, starting/ending drawing, designation of a graphic pattern to be drawn, designation of a drawing color, and the like. The in-operation display control unit 36 causes the menu image 411 to be displayed on the basis of the menu image data 53.

When an operation with the indicator 2 is carried out on the menu image 411, the operation detection unit 35 detects the operation and specifies the operation position. The operation detection unit 35 also acquires the positions of the menu image 411 at the time of the operation and an operating part such as an icon included in the menu image 411. In the case where operation detection unit 35 detects the operation in the state where the instruction information generation unit 38 causes the menu image 411 to be displayed, the instruction information generation unit 38 includes data indicating a menu operation in the instruction information. The instruction information generation unit 38 also generates instruction information including the operation position of the operation detected by the operation detection unit 35 and the position of the menu image 411 or the like acquired by the operation detection unit 35.

Thus, the instruction information including the operation position of the operation carried out by the support provider UA with the projector 100A, the position of the menu image 411 or the like at the time of the operation, and the data designating the menu operation, is transmitted from the projector 100A to the HMD 200. The display position calculation unit 321 of the HMD 200 causes a menu image 471 to be displayed as shown in FIG. 11B, in accordance with the position of the menu image 411 or the like. It is preferable that the arrangement of the operating part such as an icon provided in the menu image 471 is the same as or similar to the menu image 411 in the projector 100A. Therefore, the instruction information generated and transmitted from the projector 100A may include data designating the type and configuration of the menu image 411. The display position calculation unit 321 causes the indicator image 422 to be displayed on the basis of the instruction information. If the display position of the indicator image 422 overlaps with the display position of the operating part such as an icon in the menu image 471, the indication detection unit 319 detects the operation on the operating part. The type and display form of the indicator image 422 can be similar those in the first embodiment.

Therefore, when the support provider UA carries out a position indication operation with the indicator 2 on the projector 100A, the HMD 200 detects an operation in response to this position indication operation and the HMD 200 can execute the operation corresponding to this. Therefore, the support provider UA can remotely control the HMD 200.

Also, in the case where the display system 1 includes a plurality of HMDs 200, the projector 100A may receive work information from the plurality of HMDs 200 and carry out display based on the work information received from the plurality of HMDs 200.

FIG. 11C shows an example in which the projector 100A displays a pickup image based on work information received from two HMDs 200. A menu image 413 is displayed in the display area on the side to be target of the operation based on the menu image (in this case, the display area 409), of the display areas 409, 410 arranged display area DA. As an operation using the indicator 2 is carried out in accordance with the position of the menu image 413, instruction information including the operation position and the position of the menu image 413 or the like is transmitted to the HMD 200 corresponding to the display area 409. Also, during the operation on the display area 409, the display based on the work information from the other HMD 200 is continued in the display area DA.

In the case where the display system according to this embodiment includes a plurality of HMDs 200, the work information transmitted from the projector 100A to one HMD 200 may be transmitted to the other HMD(s) 200. For example, the work information transmitted from the projector 100A to the HMD 200 worn by the support recipient UB at the support recipient site B may be transmitted to the HMD 200 worn by the support recipient UC at the support recipient site C. In this case, the contents displayed in the display area DB, for example, as shown in FIG. 11B by the HMD 200 worn by the support recipient UB, can be displayed by the HMD 200 worn by the support recipient UC.

In this case, the object to be work on OB is not necessarily in the field of view of the support recipient UC. Therefore, the HMD 200 worn by the support recipient UC may display a pickup image of the object to be work on OB picked up by the camera 261 of the HMD 200 worn by the support recipient UB, along with the indicator image and the menu image.

Also, in this case, the HMD 200 worn by the support recipient UC need not be a target of the operation by the projector 100A. That is, it is possible that the HMD 200 worn by the support recipient UB executes an operation based on the instruction information, whereas the HMD 200 worn by the support recipient UC performs display based on the instruction information but is not controlled on the basis of the instruction information. In this case, the HMD 200 worn by the support recipient UC need not execute an operation corresponding to the operation of the indicator 2.

Alternatively, the HMD 200 worn by the support recipient UC may carry out an operation corresponding to the operation of the indicator 2, similarly to the HMD 200 worn by the support recipient UB. In this case, the support provider UA can remotely control the plurality of HMDs 200 to execute operations, using the projector 100A.

The control unit 300 of the HMD 200 detects an operation on the HMD 200 on the basis of information indicating an operation included in the instruction information received by the communication unit 277. More specifically, the control unit 300 causes the image display unit 220 to display the menu image 471, which is an image for GUI operation. The indication detection unit 319 detects the operation on the basis of the display position of the menu image 471 and the operation position included in the instruction information received by the communication unit 277. Therefore, as the projector 100A carries out a position indication operation, a GUI operation on the HMD 200 is carried out and the HMD 200 can thus be controlled.

Third Embodiment

FIGS. 12A and 12B are flowcharts showing operations in a display system 1 according to a third embodiment. FIG. 12A shows operations of a projector 100A. FIG. 12B shows operations of an HMD 200.

Since the display system 1 according to the third embodiment is configured similarly to the display system 1 described in the first embodiment, the illustration and description of the configuration of each part of the display system 1 will not be given further. In the flowcharts of FIGS. 12A and 12B, the same operations as described in the first embodiment (FIGS. 7A and 7B) are denoted by the same step numbers.

The third embodiment is similar to the first embodiment in that work information including the pickup image picked up by the camera 261 of the HMD 200 is transmitted to the projector 100A and displayed by the projector 100A. In the third embodiment, the pickup image picked up by the HMD 200 is edited by a position instruction operation of the projector 100A, and the HMD 200 receives and displays the edited pickup image.

In the operations of the projector 100A shown in FIG. 12A, Steps S11 to S15 are the same as described in the first embodiment. In the display system 1 according to the third embodiment, after the operation corresponding to the contents is carried out in Step S14 and the operation detection unit 35 detects this operation, a further operation on the currently displayed pickup image can be carried out (Step S51).

The operation detection unit 35 detects the operation on the pickup image (Step S52) and associates the operations detected in Steps S15 and S52 with the pickup image (Step S53). Specifically, the operation detection unit 35 generates data indicating the operation position detected in Step S15 as a relative position to the pickup image. The operation detection unit 35 also generates data of the pickup image edited by the operation detected in Step S52.

Subsequently, the transmission image acquisition unit 37 acquires a transmission image (Step S54). The instruction information generation unit 38 generates and transmits instruction information including image data of the image of the indicator acquired by the transmission image acquisition unit 37 and the data generated by the operation detection unit 35 (Step S55). The processing in which the transmission image acquisition unit 37 acquires the transmission image is the processing similar to Step S17, for example.

The operations of the HMD 200 shown in FIG. 12B is the same as described in the first embodiment. That is, the HMD 200 receives the instruction information transmitted from the projector 100A (Step S23). The received information analysis unit 317 analyzes the received instruction information and thus extracts image data (Step S24). In this Step S24, the pickup image data of the HMD 200 edited in the projector 100A and the image data of the indicator are extracted. Next, the display position calculation unit 321 calculates the position to display the image (Step S25). The display information generation unit 325 generates display information and the image processing unit 303 and the display control unit 305 causes the display information to be displayed (Step S26).

According to the display system 1 in this third embodiment, in the case where the work information received from the HMD 200 includes a pickup image, the control unit 30 causes the projection unit 20 to display this pickup image, and the pickup image is edited on the basis of the operation detected by the operation detection unit 35 during the display of the pickup image. Then, instruction information including the edited pickup image is generated and transmitted to the HMD 200. The HMD 200 receives the instruction information including the edited pickup image, and causes the image display unit 220 to display the edited pickup image.

Thus, the support provider UA virtually carries out an operation or work corresponding to the object to be work on OB present in the field of view of the support recipient UB and thus can show the operation or work on the object to be work on OB by the support provider UA, to the support recipient UB wearing the HMD 200. Therefore, the support provider UA can provide a greater volume of information to the support recipient UB about the work on the object to be work on OB.

Also, in the third embodiment, an example in which the pickup image picked up by the HMD 200 is edited by the projector 100A is described. Other than this, for example, document data or drawing data may be transmitted from the HMD 200 to the projector 100A, and the document data or drawing data may be edited by the projector 100A. In this case, the edited document data or drawing data is transmitted to the HMD 200, and the HMD 200 carries out display based on the edited document data or drawing data. Thus, with respect to the work of editing of a document or preparing and editing a drawing, the support provider UA can show a model the support recipient UB by performing the editing.

Fourth Embodiment

Figure 13:
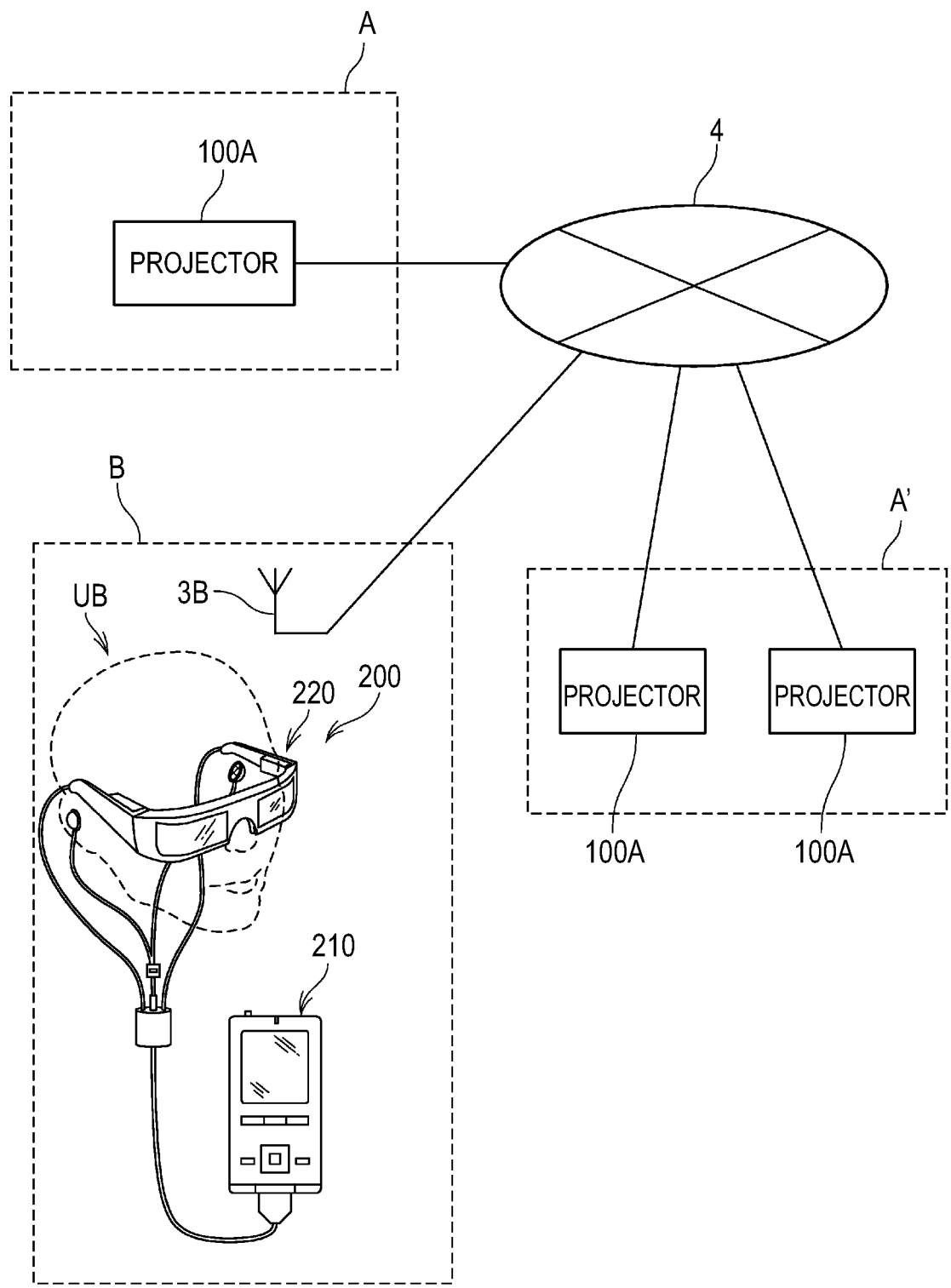
FIG. 13 is a schematic view of the configuration of a display system according to a fourth embodiment.

FIG. 13 shows the configuration of a display system 1A according to a fourth embodiment to which the invention is applied.

In the display system 1A, a projector 100A at a support site A and an HMD 200 at a support recipient site B are connected to a communication network 4. Moreover, the display system 1A has a plurality of projectors 100A used at a support site A'. Similarly to the support site A, the support site A' is equipped with projectors used by the support provider UA or a user in a position similar to the support provider UA, and is configured similarly to the examples described in the first to third embodiments.

In the display system 1A, each of the plurality of projectors 100A at the support site A and the support site A' can communicate with the HMD 200 via the communication network 4.

Specifically, the plurality of projectors 100A may be configured to be able to execute simultaneous communication with the HMD 200. Alternatively, during the communication of a projector 100A with the HMD 200, this projector 100A may occupy the HMD 200, and the plurality of projectors 100A may be configured to be able to communicate with the HMD 200 in order in a time division manner. Also, a server device (not illustrated) for controlling the communication between each projector 100A and the HMD 200 may be connected to the communication network 4.

In the display system 1A, the plurality of projectors 100A execute the operations shown in FIG. 7A, and the HMD 200 executes the operations shown in FIG. 7B to the plurality of projectors 100A.

The HMD 200 causes the image pickup control unit 313 to control the camera 261 to execute image pickup and thus acquired pickup image data (Step S21). The HMD 200 causes the work information generation unit 315 to generate work information and causes the communication control unit 311 to transmit data of the work information to the plurality of projectors 100A (Step S22).

Each of the plurality of projectors 100A causes the communication control unit 33 to receive the work information transmitted from the HMD 200, and causes the received information processing unit 34 to analyze the received work information (Step S11). The received information processing unit 34 extracts the pickup image data from the received work information, and the projection control unit 32 causes the pickup image to be displayed (Step S12). Thus, at the support sites A, A', each projector 100A displays the pickup image of the HMD 200.

In the projector 100A, contents are selected by an operation by the support provider UA (Step S13), and an operation for the support provider UA to give an instruction or the like to the support recipient UB is carried out (Step S14).

As an application example of this embodiment, an example in which a plurality of support providers UA gives instructions or support for the work executed by the support recipient UB wearing the HMD 200 may be employed. For example, it may be the case where the plurality of support providers UA using the projectors 100A and the support recipient UB as participants carry out brainstorming and where the support recipient UB writes down on a whiteboard or pasteboard as a clerk. Each support provider UA communicates contents of ideas to be written down and gives instructions on the position of writing, to the support recipient UB.

In Step S13, for example, contents for support including a text and image are selected. The text included in the contents is a text generated by the control unit 30 via speech recognition of a speech made by the support provider UA. The image included in the contents is an image used to indicate the position of writing an idea and the form of writing. In Step S14, for example, an operation to indicate the position of writing an idea is carried out. The operation in Step S14 is an operation on the remote control light receiving unit 18 or the operation panel 19, or an operation in which the support provider UA moves the indicator in front of the projector 100A. This operation is detected by the operation detection unit 35 (Step S15). The operation detection unit 35 generates data of the detected operation.

The operation detection unit 35 generates data to be associated with the pickup image of the HMD 200 that is a currently displayed image, on the basis of the detected operation (Step S16). The transmission image acquisition unit 37 slices out an image of the indicator from the pickup image picked up by the image pickup unit 15 during the operation in Step S14, or reads out the transmission image data 54 from the storage unit 50, and thus acquires a transmission image (Step S17).

The instruction information generation unit 38 generates and transmits instruction information including the image data acquired by the transmission image acquisition unit 37, the data of the contents, the data indicating the contents of the operation, and the data associating the operation position with the pickup image of the HMD 200 (Step S18).

The control unit 30 determines whether a condition to end the operation is met or not (Step S19). If the end condition is not met (Step S19, NO), the control unit 30 returns to Step S11. If the end condition is met (Step S19, YES), this processing ends. The end condition is as described above.

In the HMD 200, the communication control unit 311 receives the instruction information transmitted from the projector 100A (Step S23), and the received information analysis unit 317 analyzes the received instruction information and extracts image data or text data (Step S24). Next, the display position calculation unit 321 calculates the position where an image or text is to be displayed on the basis of the extracted data (Step S25). Moreover, the display information generation unit 325 generates display information in which an image or text is arranged at the calculated display position, and the image processing unit 303 and the display control unit 305 cause the image or text to be displayed (Step S26).

The control unit 300 determines whether a condition to end the operation is met or not (Step S27). If the end condition is not met (Step S27, NO), the control unit 300 returns to Step S22. In Step S23, the HMD 200 can receive instruction information from the plurality of projectors 100A. Every time instruction information is received, the HMD 200 executes the operations of Steps S23 to S26. Therefore, if the end condition is not met (Step S27, NO), the control unit 300 may return to Step S23 and wait for the reception of other instruction information. If the end condition is met (Step S27, YES), the control unit 300 end this processing.

In this way, in the display system 1A, since the plurality of support providers UA, using the projectors 100A, execute communication with the HMD 200 worn by the support recipient UB, each support provider UA can send information to the support recipient UB.

Thus, operations such as simultaneous work at multiple spots including the support sites A, A' and the support recipient site B are possible. As in the above example of brainstorming, a teleconference connecting multiple spots including the support sites A, A' and the support recipient site B can be realized. In this example, in response to an instruction from each support provider UA, the support recipient UB can proceed with the conference and carry out the work of rearranging and preparing a relation diagram or system diagram.

Fifth Embodiment

Figure 14:
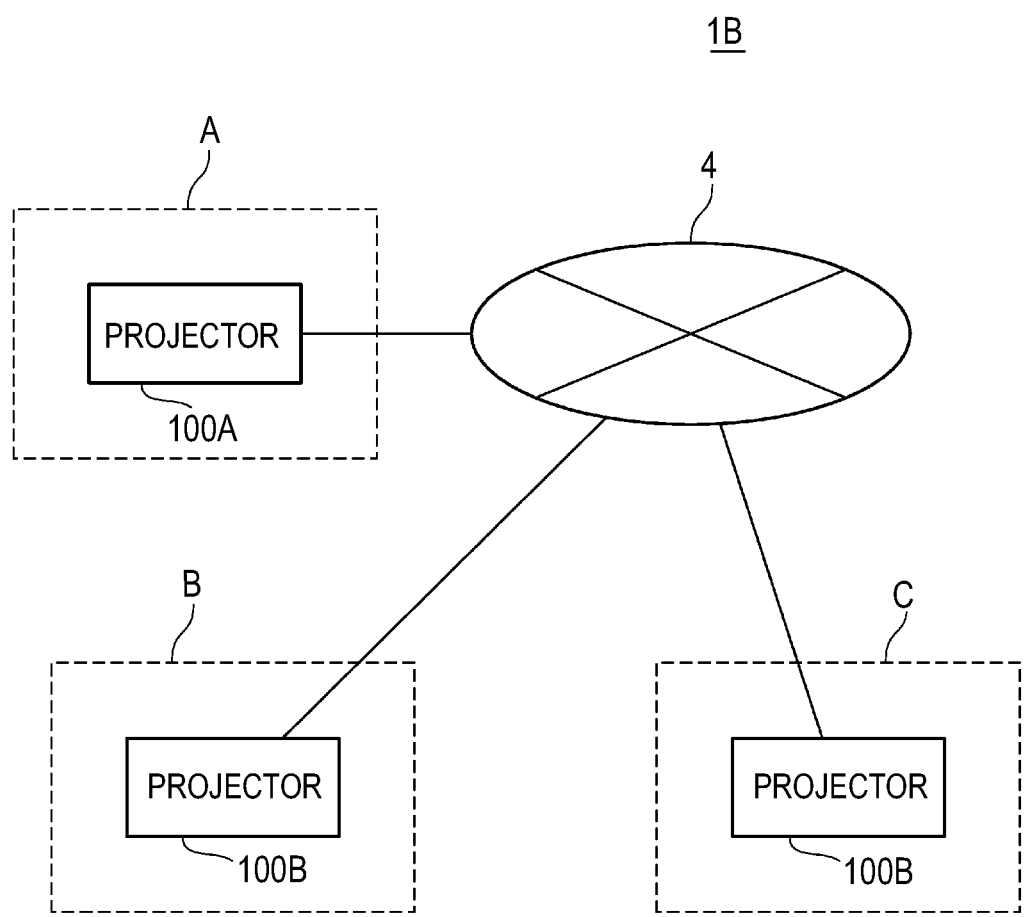
FIG. 14 is a schematic view of the configuration of a display system according to a fifth embodiment.

FIG. 14 shows the schematic configuration of a display system 1B according to a fifth embodiment.

In the display system 1B shown in FIG. 14, a projector is used not only at the support site A but also at the support recipient sites B, C. The projectors installed at the support recipient sites B, C are projectors 100B for the support recipients UB, UC and have the same basic configuration as the projector 100A. Hereinafter, when there is no need to distinguish the projectors 100A and 100B, these projectors are described as projectors 100.

The projector 100B is connected to the communication network 4 and can mutually communicate data with the projector 100A via the communication network 4. The projector 100B may be connected to the communication network 4 via a wireless access point, for example, similarly to the HMD 200.

In the display system 1B, the support recipient UB carrying out work uses the projector 100B, and the support provider UA giving instructions to the support recipient UB or carrying out management uses the projector 100A. By transmitting and receiving information for instructions and management between the support provider UA and the support recipient UB, it is possible for the support provider UA to provide information about procedures and contents of work to the support recipient UB and to support the support recipient UB with the work.

The support provider UA is equivalent to the operator of the projector 100A. The support recipient UB is equivalent to the operator of the projector 100B.

As shown in FIG. 14, the display system 1B may be configured to include a plurality of projectors 100B, including the projector 100B used by the support recipient UC at the support recipient site C. In this case, the support provider UA at the support site A can provide information to the support recipients UB, UC at their respective support recipient sites B, C. As a matter of course, it is also possible that only the support recipient UB at the support recipient site B uses the projector 100B. Below, the description about the projector 100B used by the support recipient UB is similar to the projector 100B used by the support recipient UC.

The installation state of the projector 100B can be the same as the installation state of the projector 100A shown in FIG. 2.

The projector 100B is fixed to a work table and projects (displays) an image onto a worktop T (FIG. 2), which is the top surface of the table. The projector 100B displays an image in a display area on the worktop T. The area where the projector 100B projects (displays) an image is similar to the display area DA of the projector 100A. This area is defined as a display area DB.

At the support recipient site B, too, the worktop T is set to a height such that a person can use as a work space when standing and carrying out work. Preferably, the worktop T is a flat surface, and a pedestal (not illustrated) or the like for work may be installed. An object to be work on OB can be placed on the worktop T. The support recipient UB at the support recipient site B can put his/her hands on the worktop T and work on the object to be work on OB, as shown in FIG. 2. The projector 100B projects image light in such a way as to superimpose the image light on the object to be work placed on OB, and thus can display an image. The support recipient UB can carry out work on the worktop T while viewing the display image by the projector 100B.

The projector 100B has the function of picking up an image of the worktop T. The range of image pickup by the projector 100B includes at least a part of the display area DB. This range is defined as an image pickup range PB. The projector 100B displays an image pickup boundary line BL indicating the image pickup range on the worktop T. The image pickup boundary line BL is a boundary line indicating the outer edge of the image pickup range PB and is displayed in a display color visible to humans. The configurations of the image pickup boundary line BL and the image pickup range PB are similar to the image pickup boundary line BL and the image pickup range PA of FIG. 2.

With the image pickup function of the projector 100B, an image of how the support recipient UB carries out work can be picked up within the image pickup range PB. In the display system 1B, the projector 100B has the function of picking up an image of the situation of the support recipient UB and transmitting work information including the pickup image to the projector 100A. The projector 100A receives the work information and displays an image including the pickup image picked up by the projector 100B.

The support provider UA operates the projector 100A and carries out selection of contents for explanation, an operation to move an indicator (for example, an arm, hand or finger), or the like, as in the first to fourth embodiments. Thus, instruction information (guide information) including data showing the selected contents and the movement of the indicator is transmitted from the projector 100A to the projector 100B. Here, the support provider UA carries out operations while viewing the image showing the work of the support recipient UB displayed by the projector 100A. The projector 100B receives the instruction information transmitted from the projector 100A and displays an image based on the instruction information, on the worktop T. Thus, an image included in the operation or instruction contents by the support provider UA picked up by the projector 100A can be displayed by the projector 100B and thus shown to the support recipient UB, and instructions and advice can be given on the work of the support recipient UB. Meanwhile, the support recipient UB can carry out work while viewing the image of contents and the movement of the indicator.

Figure 15:
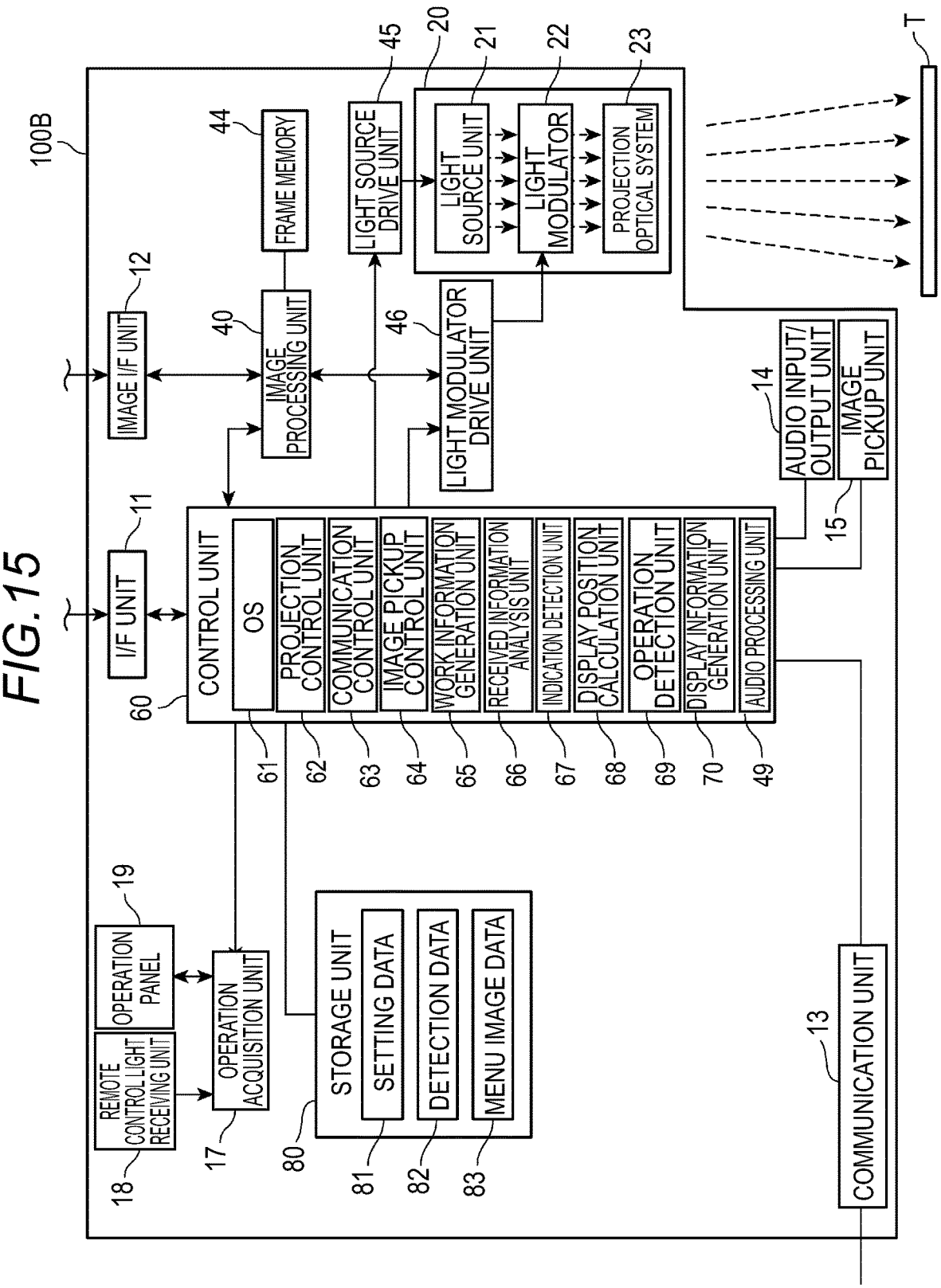
FIG. 15 is a functional block diagram of a projector according to the fifth embodiment.

FIG. 15 is a functional block diagram showing the configuration of the projector 100B.

The configuration of the projector 100B is basically the same as the projector 100A, except the programs executed by a control unit 60, the functions realized by these programs, and the data or the like stored in a storage unit 80. Therefore, the same parts of the configuration as the projector 100A will not be described further in detail. Specifically, the configurations of the interface unit 11, the image interface unit 12, the communication unit 13, the audio input/output unit 14, the image pickup unit 15, the operation acquisition unit 17, the remote control light receiving unit 18, and the operation panel 19 can be the same as in the projector 100A. Also, the configurations of the projection unit 20, the light source unit 21, the light modulator 22, the projection optical system 23, the image processing unit 40, the frame memory 44, the light source drive unit 45, and the audio processing unit 49 can be the same as in the projector 100A.

The control unit 60 has a CPU (not illustrated) which executes programs, a RAM (not illustrated) which temporarily stores programs and data executed by the CPU, and a ROM (not illustrated) which stores a basic control program and data executed by the CPU, in a non-volatile manner. The control unit 60 reads out and executes computer programs stored in the ROM or the storage unit 80 and thus controls each part of the projector 100B.

The control unit 60 executes the programs and thus functions as an operating system (OS) 31, a projection control unit 62, and a communication control unit 63. Also, the control unit 60 executes the programs and thus functions as image pickup control unit 64, a work information generation unit 65, a received information analysis unit 66, an indication detection unit 67, a display position calculation unit 68, an operation detection unit 69, a display information generation unit 70, and an audio processing unit 49.

The storage unit 80 is a non-volatile storage device similar to the storage unit 50 and stores various computer programs and data associated with these programs. The storage unit 80 stores various programs including the operating system executed by the control unit 60 and data processed by the control unit 60, in a non-volatile manner. The storage unit 80 stores setting data 81. The setting data 81 includes various setting values used by the control unit 60. The setting values included in the setting data 81 may be values inputted in advance by operations detected by the operation acquisition unit 17. Alternatively, the setting values may be received and stored from an external device (not illustrated) via the communication unit 13 or the interface unit 11.

The storage unit 80 also stores detection data 82 and menu image data 83.

The detection data 82 is data used for detecting an image of an object to be work on OB from image data. The object to be work on OB is an object which the support recipient UB, using the projector 100B is to work on, and can be considered to be arranged on the worktop T at the time of work.

The detection data 82 includes data used for processing to extract an image of the object to be work on OB from image data, for example, and more specifically, includes data of a feature quantity of the image of the object to be work on OB. The feature quantity may be the feature quantity of color or the feature quantity of shape, and may include a plurality of feature quantities corresponding to the number of colors and resolution of the image data of the processing target. In the display system 1B, if the object to be work on OB which the support recipient UB is to work on is known in advance, the detection data 82 for this object to be work on OB is stored in the storage unit 80.

The menu image data 83 is image data for displaying a menu image by the projection unit 20. For example, the menu image is a menu bar where operation icons are arranged in lines, or a dial menu where icons are arranged in a circular frame, or the like.

The detection data 82 stored in the storage unit 80 may be the same as the detection data 52 stored in the storage unit 50 (FIG. 3) or may be different from the detection data 52. The menu image data 83 may be the same as or different from the menu image data 53 stored in the storage unit 50.

The image processing unit 40 processes the image data under the control of the control unit 60 and outputs an image signal to the light modulator drive unit 46. The processing executed by the image processing unit 40 is discrimination processing between a 3D (stereoscopic) image and a 2D (planar) image, resolution conversion processing, frame rate conversion processing, distortion correction processing, digital zooming processing, color tone correction processing, and luminance correction processing or the like. The image processing unit 40 executes processing designated by the control unit 60, and carries out processing using a parameter inputted from the control unit 60 according to need. Of course, it is also possible to execute a combination of a plurality of kinds of processing from the above.

The projection control unit 62 controls the image processing unit 40, the light source drive unit 45 and the light modulator drive unit 46 according to the operation detected by the operation acquisition unit 17 and the program executed by the control unit 60, and causes the projection unit 20 to project (display) an image. Here, the projection control unit 62 may control the image processing unit 40 to execute the discrimination processing between the 3D (stereoscopic) image and the 2D (planar image) described above, the resolution conversion processing, the frame rate conversion processing, the distortion correction processing, the digital zooming processing, the color correction processing, the luminance correction processing or the like. The projection control unit 62 may also control the light source drive unit 45 to control the amount of light of the light source unit 21, along with the processing by the image processing unit 40.

The communication control unit 63 controls the communication unit 13 to control the communication with the projector 100A. The communication control unit 63 receives instruction information from the projector 100A and outputs the received instruction information to the received information analysis unit 66. The communication control unit 63 also transmits work information generated by the work information generation unit 65 to the projector 100A.

The image pickup control unit 64 controls the image pickup unit 15 to execute image pickup and acquires pickup image data.

The work information generation unit 65 generates work information to be transmitted to the projector 100A. The work information generation unit 65 acquires the pickup image data of the image pickup unit 15. The work information generation unit 65 may also acquire data indicating the contents of an operation detected by the operation acquisition unit 17. In this case, the work information generation unit 65 generates work information including the pickup image data of the image pickup unit 15 and the data of the operation contents. The work information generation unit 65 may also generate work information including image data generated from the pickup image data, instead of the pickup image data of the image pickup unit 15 itself.

The received information analysis unit 66 analyzes the data received by the communication control unit 63. In the embodiment, the received information analysis unit 66 extracts image data of the indicator, image data of contents, audio data, and other data included in the instruction information received from the projector 100A by the communication control unit 63. The received information analysis unit 66 also extracts data indicating the position and movement of the indicator from the instruction information received by the communication control unit 63.

The indication detection unit 67 detects data indicating that an operation with the indicator is to be carried out, from the data extracted by the received information analysis unit 66. For example, the support provider UA operates the projector 100A, carries out a position indication operation with the indicator, and thus can control the projector 100B by this position indication operation. In this case, the projector 100B detects data about the position indication operation included in the instruction information transmitted from the projector 100A, as an operation on the GUI. The instruction information transmitted from the projector 100A includes data designating whether the operation by the support provider UA is to be detected as an operation on the GUI or not. The indication detection unit 67 detects this data.

The display position calculation unit 68 calculates the position where an image is to be displayed on the basis of the image data extracted by the received information analysis unit 66. The image data extracted by the received information analysis unit 66 is image data of the indicator, image data of contents, and other image data. On the basis of these data, the display position calculation unit 68 calculates the display position of the image of the indicator, the display position of the image data of contents, and the display position of other images. The display position calculation unit 68 may also calculate the display size of each image. In the case where the indication detection unit 67 detects data indicating that the operation by the support provider UA is regarded as an operation on the GUI, the display position calculation unit 68 calculates the display position of a menu image for carrying out GUI operations. On the basis of the display position calculated by the display position calculation unit 68, the projection control unit 62 causes the image processing unit 40 to execute processing of the image data and causes the projection unit 20 to display the image.

The operation detection unit 69 detects an operation in the case of detecting the data indicating the position and movement of the indicator extracted by the received information analysis unit 66, as an operation on the GUI. The operation detection unit 69 detects the operation on the GUI on the basis of the display position of an icon or the like in the menu image and the display position of the image of the indicator calculated by the display position calculation unit 68.

The display information generation unit 70 generates display information of a screen to be displayed by the projection unit 20. The display information generation unit 70 arranges an image based on the image data extracted by the received information analysis unit 66, at the display position calculated by the display position calculation unit 68, and thus generates display information corresponding to one screen. The display information generated by the display information generation unit 70 is transmitted to the projection unit 20 under the control of the projection control unit 62, and the projection unit 20 displays the display information.

In the display system 1B thus configured, the projector 100B is equivalent to a first display device, and the projector 100A is equivalent to a second display device.

The communication unit 13 provided in the projector 100B is equivalent to a first communication unit. The image pickup unit 15 is equivalent to a first image pickup unit. The projection unit 20 is equivalent to a first display unit. The display area DB is equivalent to a first display area. The control unit 60 is equivalent to a first control unit. It can also be said that the storage unit 80 is a first storage unit.

The operations of the projectors 100A, 100B in the display system 1B are similar to the operations described with reference to FIGS. 7A and 7B.

That is, the projector 100A in the display system 1B can executes the operations of FIG. 7A. The projector 100B can execute the operations of FIG. 7B.

In the projector 100B, the image pickup control unit 64 controls the image pickup unit 15 to execute image pickup and acquire pickup image data (Step S21).

The work information generation unit 65 generates work information including the pickup image data acquired in Step S21, and the communication control unit 63 transmits this data to the projector 100A (Step S22). In Step S22, the work information generation unit 65 may include data about an operation detected by the operation acquisition unit 17, in the work information.

In the projector 100A, the communication control unit 33 receives the work information transmitted from the projector 100B, and the received information processing unit 34 analyzes the received work information (Step S11). The received information processing unit 34 extracts the pickup image data from the received work information, and the projection control unit 32 causes the pickup image to be displayed (Step S12).

In the projector 100A, contents are selected by an operation by the support provider UA (Step S13), and an operation for the support provider UA to give an instruction or the like to the support recipient UB is carried out (Step S14). The operation in Step S14 is an operation on the remote control light receiving unit 18 or the operation panel 19, or an operation in which the support provider UA moves the indicator in front of the projector 100A. This operation is detected by the operation detection unit 35 (Step S15). The operation detection unit 35 generates data of the detected operation.

The operation detection unit 35 generates data which associates the operation position of the detected operation or the trajectory of the operation with the pickup image of the projector 100B that is currently displayed (Step S16). The transmission image acquisition unit 37 slices out an image of the indicator from the pickup image picked up by the image pickup unit 15 during the operation in Step S14, or reads out the transmission image data 54 from the storage unit 50, and thus acquires a transmission image (Step S17).

The instruction information generation unit 38 generates and transmits instruction information (Step S18). Here, the instruction information includes image data of the indicator acquired by the transmission image acquisition unit 37, data indicating the operation position or the trajectory of the operation, and data associating the operation position or the trajectory of the operation with the pickup image of the projector 100B.

The control unit 30 determines whether a condition to end the operation is met or not (Step S19). If the end condition is not met (Step S19, NO), the control unit 30 returns to Step S11. If the end condition is met (Step S19, YES), this processing ends. The end condition is as described above.

In the projector 100B, the communication control unit 63 receives the instruction information transmitted from the projector 100A (Step S23), and the received information analysis unit 66 analyzes the received instruction information and extracts image data (Step S24). Next, the display position calculation unit 68 calculates the position where an image is to be displayed on the basis of each image data (Step S25). Moreover, the display information generation unit 70 generates display information in which an image is arranged at the calculated display position, and the projection control unit 62 causes the image to be displayed (Step S26).

The control unit 60 determines whether a condition to end the operation is met or not (Step S27). If the end condition is not met (Step S27, NO), the control unit 60 returns to Step S22. If the end condition is met (Step S27, YES), this processing ends. The end condition may be, for example, that ending the operation or shutting down the projector 100B is designated by an operation on the remote control light receiving unit 18 or the operation panel 19, or the like.

Figure 16A:
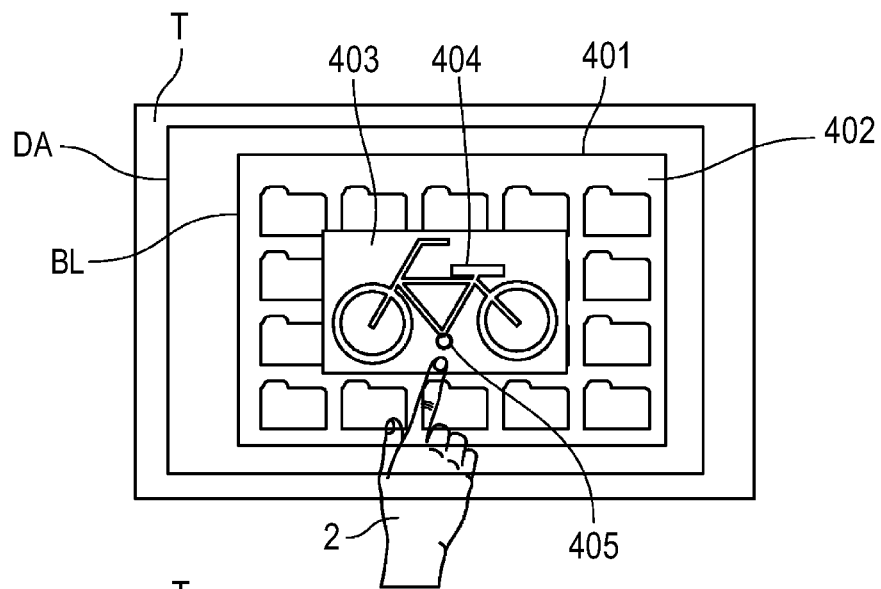
FIGS. 16A to 16C show display examples in the fifth embodiment.
Figure 16B:
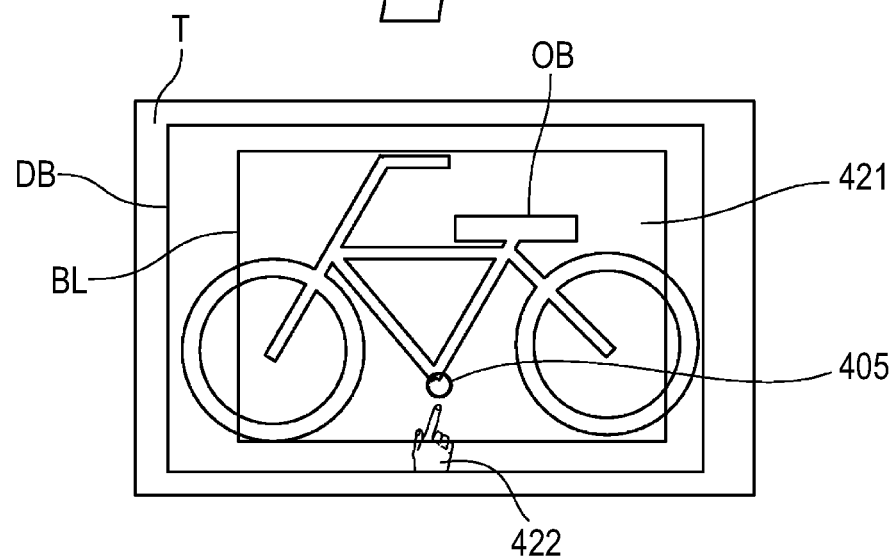
Figure 16C:
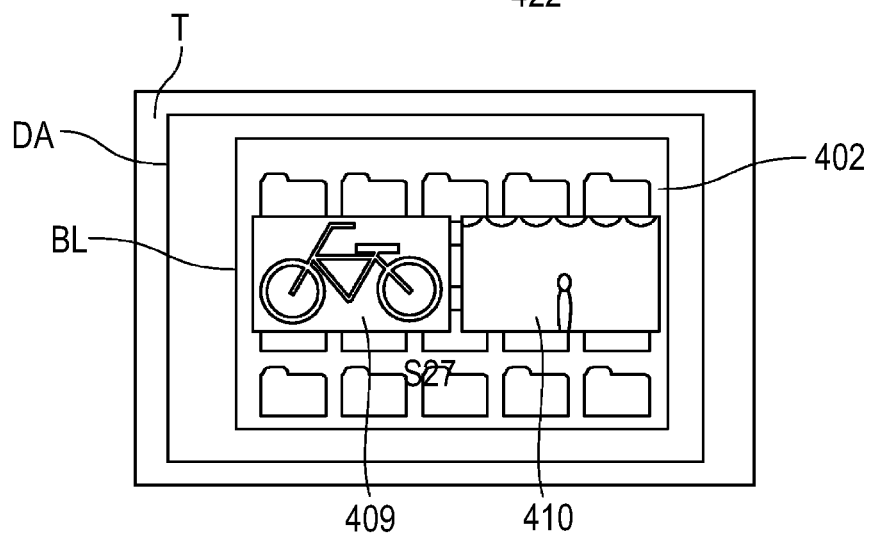

FIGS. 16A to 16C show display examples in the display system 1B. FIG. 16A shows a display example by the projector 100A. FIG. 16B shows a display example by the projector 100B. FIG. 16C shows another display example by the projector 100A.

As described above, of the instruction information generated by the instruction information generation unit 38 of the projector 100A, the information associating the operation with the work information, or the information associating the operation with the pickup image included in the work information is not particularly limited to any specific form. In the above example, this information is described as data associating the operation position and the trajectory of the operation with the pickup image of the projector 100B. However, simply, the operation position or the trajectory of the operation itself may be used as this information. Also, data associating the operation position or the trajectory of the operation with the pickup image of the projector 100B on the basis of the correspondence by file name, data type, ID, attribute, position or the like, may be employed. Any information that enables the correspondence to be recognized as a result may be used.

As shown in FIG. 16A, the projector 100A displays an image in the display area DA on the worktop T. This display state is similar to the state illustrated in FIG. 8A, for example.

Meanwhile, as shown in FIG. 16B, an indication image 421 is displayed in the display area DB on the worktop T at the support recipient site B. An object to be worked on OB, which is an object in the real space, is placed on the worktop T, and a mark indicating the indication position 405 and the indicator image 422 are displayed in such a way as to be superimposed on the object to be work on OB. The indicator image 422 is an image displayed in the same direction as in the case where the support provider UA indicates the indication position 405 with the indicator 2. In the example of FIG. 16B, the pickup image picked up by the image pickup unit 15 of the projector 100A is used. The type and display form of the indicator image 422 can be similar to those in the first embodiment.

The projector 100B is fixed to the worktop T and projects an image in the display area DB. However, the position of the support recipient UB is not limited to the position opposite the projector 100A, 100B as shown in FIG. 2. The support provider UA and the support recipient UB can each carry out work, extending his/her hands or the like from arbitrary directions to the worktop T. Therefore, the support provider UA and the support recipient UB do not necessarily view the display areas DA, DB from the same direction.

Therefore, in the case of displaying on the projector 100B an operation or indication carried out by the support provider UA, it is preferable that the image is displayed in such a way as to reflect the position and point of view or line-of-sight direction of the support provider UA at the time of carrying out the operation or indication by the support provider UA. In the example of FIG. 16B, if not only the image or symbol (mark) indicating the indication position 405 is displayed but also the support recipient UB can grasp the direction of the body of the support provider UA at the time of pointing at the indication position 405, a more accurate instruction or guidance can be given. Therefore, the projector 100A transmits instruction information including data for displaying an image indicating the point of view or line-of-sight direction of the support provider UA carrying out an operation (for example, the indicator image 422 in FIG. 16B). The projector 100B displays an image indicating the point of view or line-of-sight direction of the support provider UA carrying out the operation, on the basis of the instruction information.

Thus, in the display system 1B, since the projector 100A displays the support provider screen 402 including a pickup image of the projector 100B, the support provider UA can give an instruction or the like on the work while viewing the work environment of the support recipient UB. Also, instruction information including data indicating the indication position indicated by the support provider UA with the indicator 2 and the point of view or line-of-sight direction of the support provider UA at the time of carrying out the indication is transmitted to the projector 100B. Therefore, on the projector 100B, the position and contents of the indication or operation by the support provider UA and how it is carried out can be viewed, and the point of view or line-of-sight direction of the support provider UA in this case can be learned.

Moreover, the projector 100B displays the mark indicating the indication position 405 and the indicator image 422, at a position corresponding to the position of the object to be work on OB, which is an object in the real space. This display position is a position decided according to the position of the object to be work on OB specified by the display position calculation unit 68. Therefore, information can be AR-displayed in a superimposed manner on the object to be work on OB or at the position corresponding to the object to be work on OB. Here, the image data for displaying the indicator image 422 may be stored in the storage unit 80 of the projector 100B, and data designating an image stored in the projector 100B may be included in the instruction information transmitted from the projector 100A to the projector 100B.

Also, if the plurality of projectors 100B provided in the display system 1B executes communication with the projector 100A, the projector 100A can receive and display work information from the plurality of projectors 100B. A display example in this case is shown in FIG. 16C.

The display example in FIG. 16C is as described with reference to FIG. 8C in the first embodiment. That is, as shown in FIG. 16C, two display areas 409, 410 are arranged in the display area DA. In the display area 409, an image based on the work information transmitted from one projector 100B is displayed. In the display area 410, an image based on the work information transmitted from the other projector 100B is displayed. When an indication with the indicator 2 is carried out to the images displayed in the display areas 409, 410, the projector 100A generates and transmits instruction information to the projector 100B which has transmitted the work information corresponding to the indicated position.

Also, the instruction information transmitted from the projector 100A to one projector 100B of the plurality of projectors 100B may be transmitted to the other projector 100B as well. In this case, when the projector 100A generates instruction information in accordance with the work information transmitted from one projector 100B by the operations of FIG. 7B, this instruction information is transmitted to the other projector 100B as well. In this example, the contents of the instruction information transmitted to one support recipient UB can be learned by the other support recipient UB.

As described above, the display system 1B according to the fifth embodiment has the projector 100B and the projector 100A. The projector 100B has the projection unit 20 displaying an image in the display area DB, the image pickup unit 15, and the communication unit 13 executing communication with the projector 100A. The projector 100B, under the control of the control unit 60, causes the projection unit 20 to display an image pickup boundary line BL indicating the image pickup range of the image pickup unit 15, causes the communication unit 13 to receive instruction information from the projector 100A, and causes the projection unit 20 to display an image based on the instruction information. The projector 100A has the projection unit 20 displaying an image in the display area DA, the communication unit 13 executing communication with the projector 100B, and the operation detection unit 35 detecting an operation. The projector 100A, under the control of the control unit 30, generates instruction information including information indicating an operation detected by the operation detection unit 35 and causes the communication unit 13 to transmit the instruction information. The projector 100B, under the control of the control unit 60, displays an image corresponding to the operation detected by the operation detection unit 35 of the projector 100A on the basis of the instruction information received from the projector 100A. Moreover, the projector 100B causes the projection unit 20 to display an image indicating the point of view or line-of-sight direction of the support provider UA carrying out the operation.

The display system 1B and the projector 100B thus configured and the execution of the information display method using the display system 1B have the following advantageous effects. That is, since the projector 100B displays an image about an operation carried out in the projector 100A, operating the projector 100A enables the provision of information to the support recipient UB. Also, since guidance can be given on the appropriate direction of the image or information displayed by the projector 100B, the support recipient UB does not misunderstand the direction of the image or information, and information can be properly provided.

The display system 1A has effects similar to those of the display system 1. Meanwhile, the display system 1B has various effects similar to those of the display system 1, except the difference due to the replacement of the HMD 200 with the projector 100B.

As application examples of the display system 1A, various specific examples similar to the application examples of the display system 1 can be given. The same applies to the application example of the display system 1B.

The display system 1B can be used, for example, for the support provider UA to support the support recipient UB with his/her work of operating an apparatus, by providing information about the operation of the apparatus from a distant location such as explaining the operation of the apparatus and giving guidance. As specific examples, setup and operations on an application program on a personal computer as an object to be work on, and operations on or maintenance of machines such as machine tools, industrial machinery or various home electronics may be employed.

In these examples, as the target object to be work on OB, machines such as machine tools, industrial machinery or various home electronics, and a personal computer or the like can be placed on the worktop T. Also, the position where these apparatuses and personal computer or the like are placed can be regarded as the worktop T. In this case, the projector 100B may be arranged in such a way that the display area DB includes the site where the machines such as machine tools, industrial machinery and various home electronics, and a personal computer or the like, as objects to be worked on, are placed. For example, the projector 100B may be installed on a movable pedestal and may thus be moved with the position where the object to be work on is placed. Also, a stay that can fix the projector 100B at an arbitrary position may be used.

In such a case, the support recipient UB present at the support recipient site B, which is a distant location, and the support provider UA present at the support site A such as a service center or the like, can share information. The support provider UA at the support site A can change the indication and display by causing the projector 100B of the support recipient UB to display an AR image. Then, the support provider UA can provide support by causing the projector 100B to show an operation of the hands and fingers of the support provider UA at the support site A, as a virtual image. In this case, it is effective that the same apparatus as the object to be work on at the support recipient site B is placed in front of the support provider UA at the support site A and that the support provider UA explains while actually operating the apparatus. The support provider UA can give an instruction or teaching by performing a position indication operation on a specific part of the actual object at the site and therefore can give efficient support with a simple operation.

As another application example, image data and text of a business card may be included in the instruction information transmitted from the projector 100A. Thus, the business card can be shown to the support recipient UB, enabling a virtual exchange of business cards.

Moreover, if the projector 100A transmits instruction information including data of contents to the projector 100B, contents including a text and image can be displayed by the projection unit 20 of the projector 100B. In this case, it is preferable that the display position of the text and image of the contents is a position not obstructing the visibility of the object to be work on, in accordance with the actual position of the object to be work on located in the display area DB.

Moreover, by using an image of an avatar playing the role of the support provider UA or an image of the face, upper body or whole body of the support provider UA himself/ herself as an image of the indicator, it is possible to realize a service targeted at consumers instead of workers. In this case, the support provider UA is a staff member of a call center, a home tutor, a teaching staff member of a cram school, or the like. The applications of this system include guidance or training on installation and operation of software on electronic apparatuses, language education, guidance for qualifying examinations, training courses for public qualifications such as driver's license, sports coaching, and the like. Also, for example, in courses for foreign language conversations, pronunciation can be taught visually. In this case, it is preferable that the student uses the projector 100B, which projects an image on a screen installed on a wall or the like. In this case, the teacher uses the projector 100A, and the projector 100B displays the shape of the teacher's mouth on the screen. Also, it is more effective if an image of the face of the support recipient UB as a student picked up by the projector 100B can be displayed in a superimposed manner on the screen. For example, in a rear projection configuration in which the projector 100B is arranged on the back of the screen and in which the front side of the screen is a reflection surface, AR display can be performed in such a way that an image of the mouth displayed by the projector 100B and an image of the student's mouth reflected on the reflection surface are superimposed.

In the case of guidance for learning or sports coaching, an example in which the guidance/coaching side uses the projector 100A at the support site A and in which the recipient side uses the projector 100B at the support recipient site B may be given. In this configuration, the display areas DA, DB where the projectors 100A, 100B project an image are set to a large enough area for a person to move around, for example, and using a floor surface as the display areas DA, DB is more effective. In this case, for example, the projectors 100A, 100B may be installed above the floor surface. Preferably, the projectors 100A, 100B may be installed above the support provider UA or the support recipient UB and configured to project an image downward and pick up an image from below. Specifically, the projectors 100A, 100B may be suspended from the ceiling.

The work information transmitted from the projector 100B to the projector 100A can be called guide target information or execution-side information. The instruction information can be called guide information, guidance information or management information.

As a specific example of guidance, it is conceivable that the person who gives guidance on study subjects such as mathematics, English, Japanese, social studies, and the proper order of strokes in writing characters, uses the projector 100A, and that the person who receives guidance receives teaching and guidance based on the contents displayed by the projector 100B. The application for the purpose of giving guidance on a method for operating an apparatus such as personal computer is similar to this.

In the projectors 100A, 100B, specified information may be highlighted by pop-up, blinking, displaying in a fluorescent color, or the like. Also, the display color or display luminance of the displayed image may be changed in such a way to increase the visibility of the object to be work on OB on the worktop T. In this case, techniques such as reducing the luminance of the image light projected from the projection unit 20, or reducing the color tone or saturation of the image light, can be employed. In this case, the visibility of the display image is reduced relatively to the external landscape, thus having an effect that the characters and images included in this display image appear auxiliary.

In the display system 1B, the contents or the like of the work of the support recipient UB using the projector 100B can be seen with the projector 100A in a distant location, and the support recipient UB can see the contents of a position indication operation carried out by the support provider UA in the image pickup range PA of the projector 100A. The projector 100B performs AR display of the contents of the position indication operation, for example, as the indicator image 422. That is, in the projector 100B, the indicator image 422 is displayed in such a way as to be superimposed on the object to be work on OB, and the AR display effect can be expected on the basis of the positions of the indicator image 422 and the object to be work on OB.

The projector 100B may display a stereoscopic image when displaying the indicator image 422 or the like, in order to increase the AR display effect. In this case, the control unit 60 decides the direction and magnitude of the parallax between an image for the left eye and an image for the right eye, according to the type of the object to be work on OB and the contents of the work. The display information generation unit 70 of the control unit 60 generates an image having the parallax on the basis of the instruction information, and the projection control unit 62 causes the image to be displayed. The control unit 60 may also have a distance sensor (not illustrated) to detect the distance to the object to be work on OB. In this case, the control unit 60 may calculate the direction and magnitude of the parallax between the images of the indicator to be AR-displayed, on the basis of the detected distance to the object to be work on OB. For example, the parallax may be provided on the basis of a preset distance condition. In this case, an image is stereoscopically displayed on the worktop T where the support recipient UB carries out work. Also, the projector 100A may display a stereoscopic image so as to enable the support provider UA to visually recognize the image in a stereoscopic manner.

In the display system 1B, at the support recipient site C, the work operation of the support recipient UB at the support recipient site B can be seen as an AR image from a distant location. Thus, the contents of work support such as work procedures can be shared.

If the display by the projector 100A and the pickup image by the projector 100B, or images based on the work information of two or more projectors 100B are displayed in two or more display areas by the projector 100A, the support provider UA can visually recognize many more circumstances. Here, as shown in FIG. 16C, in the case of displaying images corresponding to two or more projectors 100B in two or more display areas, it is conceivable that confusion between the individual display areas is prevented by changing the shape or color of a pointer or the like in each display area. Moreover, the scope of application of the display system 1B is not limited, and as a matter of course, the display system 1B can be applied to other purposes as well.

The invention is not limited to the configurations in the individual embodiments and can be carries out in various configurations without departing from the scope of the invention.

For example, the projectors 100A, 100B are described as having the image pickup unit 15 in the main body having the projection unit 20 so as to pick up an image in the projection direction of the projection unit 20. However, the invention is not limited to this and may be configured to have the image pickup unit 15 picking up an image over a range including at least a part of the display areas DA, DB. For example, the image pickup unit 15 may be an image pickup device formed as a separate unit from the projection unit 20, and the control unit 30 of the projector 100A or the control unit 60 of the projector 100B may be able to acquire pickup image data by this image pickup device. Also, the image pickup unit 15 may be formed in a protruding manner from the main body of the projector 100A, 100B including projection unit 20.

Also, in the embodiments, as the light modulator 22 provided in the projectors 100A, 100B, a configuration using three transmission-type liquid crystal panels corresponding to each of the RGB colors is described as an example. However, the invention is not limited to this and may use reflection-type liquid crystal panels, for example. Also, a combination of a liquid crystal panel and a color wheel may be employed. Moreover, a method using three digital mirror devices (DMDs) for modulating the color light of each of RGB may be employed. Also, a combination of a digital mirror device and a color wheel may be employed. Here, in the case where only one liquid crystal panel or DMD is used as a display unit, a member equivalent to a combining optical system such as cross dichroic prism is not necessary. Also, other than liquid crystal panels and DMDs, any configuration that enables modulations of light emitted from a light source can be employed without any problems.

The display device according to the invention is not limited to an HMD or a projector which projects an image. For example, a liquid crystal monitor or liquid crystal television which displays an image on a liquid crystal display panel, or a monitor device or television receiver which displays an image on a PDP (plasma display panel) may be employed. Also, various other display devices are included in the display device according to the invention, such as a self-light-emitting display device like a monitor device or television receiver which displays an image on an organic EL display panel called OLED (organic light-emitting diode) or OEL (organic electroluminescence).

The HMD 200 is not limited to the configurations in the individual embodiments. For example, instead of the image display unit 220, other forms of image display unit such as an image display unit to be worn like a hat, for example, may be employed. Any image display unit having a display unit for displaying an image corresponding to the left eye of the user and a display unit for displaying an image corresponding to the right eye of the user may be used. Also, the display device according to the invention may be formed as a head-mounted display installed in vehicles such as automobile or aircraft. Also, the display device may be formed as a head-mounted display arranged inside body protection equipment such as helmet, for example. In this case, a part for positioning on the user's body and a part positioned on the part can be regarded as a mounting part.

Moreover, in each of the embodiments, the HMD 200 is described as having the image display unit 220 and the control device 210 separated from each other and connected via the connection unit 240. However, the invention is not limited to this. The control device 210 and the image display unit 220 can be integrally formed and mounted on the head of the user.

It suffices that the HMD 200 is a device such that at least the image display unit 220 for performing display is mounted on the head of the user (support provider, commander), and the mounting state of the control device 210 is not limited. Therefore, a laptop computer, tablet computer or desktop computer may be used as the control device 210. Also, portable electronic apparatuses including game machine, mobile phone, smartphone and portable media player, and other dedicated apparatuses may be used as the control device 210. Moreover, the control device 210 may be formed separately from the image display unit 220, and various signals may be transmitted and received via wireless communication between the control device 210 and the image display unit 220.

The configuration for generating image light in the image display unit 220 may include, for example, an organic EL (organic electroluminescence) display and an organic EL control unit. As another configuration for generating image light, a LCOS (liquid crystal on silicon, LCoS being a trademark registered), digital micro-mirror device or the like can be used.

As the optical system for guiding image light to the user's eyes, a configuration which has an optical member for transmitting external light incident on the device from outside and thus allows the external light to become incident on the user's eyes with image light can be employed. Also, an optical member which is situated in front of the user's eyes and overlaps with a part or the entirety of the field of view of the user may be used. Moreover, a scanning optical system which causes a laser beam to scan as image light may be employed. Also, the optical system is not limited to the form of guiding image light inside the optical member and may simply have the function of refracting and/or reflecting image light and thus guiding the image light toward the user's eyes.

For example, the invention can also be applied to a retinal laser projection-type head-mounted display. That is, a light emitting unit may have a laser light source and an optical system which guides a laser beam to the user's eyes, and the laser beam may be made incident on the user's eyes to scan the retinas, thus forming an image on the retinas and causing the user to visually recognize the image.

Also, the invention can be applied to a display device employing a scanning optical system with a MEMS mirror and using a MEMS display technique. That is, a signal light forming unit, a scanning optical system having a MEMS mirror which causes the light emitted from the signal light forming unit to scan, and an optical member on which a virtual image is formed by the light which is made to scan by the scanning optical system, may be provided as a light emitting unit. In this configuration, the light emitted from the signal light forming unit is reflected by the MEMS mirror, becomes incident on the optical member, is guided through the optical member, and reaches a virtual image forming surface. As the MEMS mirror causes the light to scan, a virtual image is formed on the virtual image forming surface. As the user's eyes capture this virtual image, the image is recognized. The optical components in this case may be components for guiding light through a plurality of reflections or may utilize half mirror surfaces, for example, like the right light guiding panel 286 and the left light guiding panel 296 in the embodiments.

Moreover, the optical elements in the invention are not limited to the right light guiding panel 286 with the half mirror 286A and the left light guiding panel 296 with the half mirror 296A, and may be any optical components that cause image light to become incident on the user's eyes. Specifically, a diffraction grating, prism, or holographic display unit may be used.

Now, an example in which the display device according to the invention is formed by a display device that is different from the projectors 100A, 100B and the HMD 200 will be described as a sixth embodiment.

Sixth Embodiment

A display system according to a sixth embodiment has a configuration in which a tablet computer 600 is used instead of at least one of the projector 100A and the HMD 200 in the display systems 1, 1A and the projector 100B in the display system 1B. In this sixth embodiment, a configuration in which the tablet computer 600 is used instead of the projector 100B equivalent to the first display device in the display system 1B according to the fifth embodiment will be described.

Figure 17:
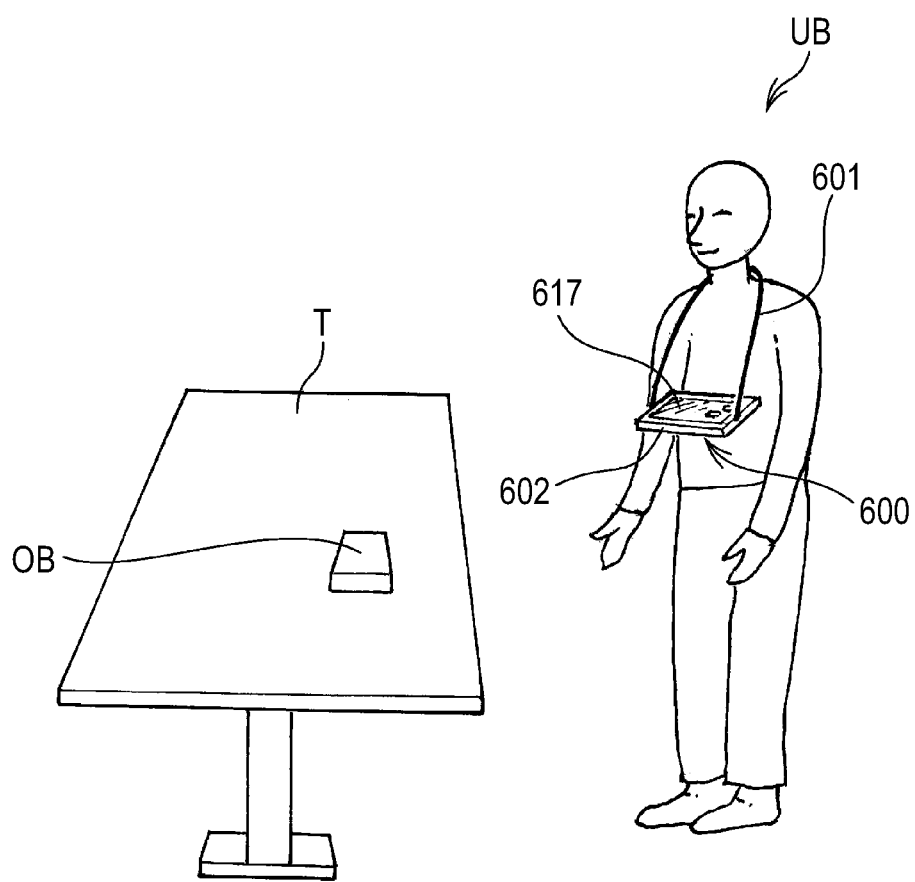
FIG. 17 shows an example of configuration and state of use of a tablet computer according to a sixth embodiment.

FIG. 17 shows an example of the configuration of the tablet computer 600 and the state of its use.

As shown in FIG. 17, the tablet computer 600 has a thin plate-like casing 602. A display panel 617 is arranged on the front side of the casing 602.

The tablet computer 600 is held on and preferably fixed to the body of the support recipient UB with an attachment jig 601.

In the example of the configuration shown in FIG. 17, the support recipient UB, in the state of wearing the tablet computer 600 with the attachment jig 601, can visually recognize an object to be worked on OB placed on the worktop T from the above. The support recipient UB can work on the object to be worked on OB while viewing a screen displayed on the display panel 617.

Figure 18:
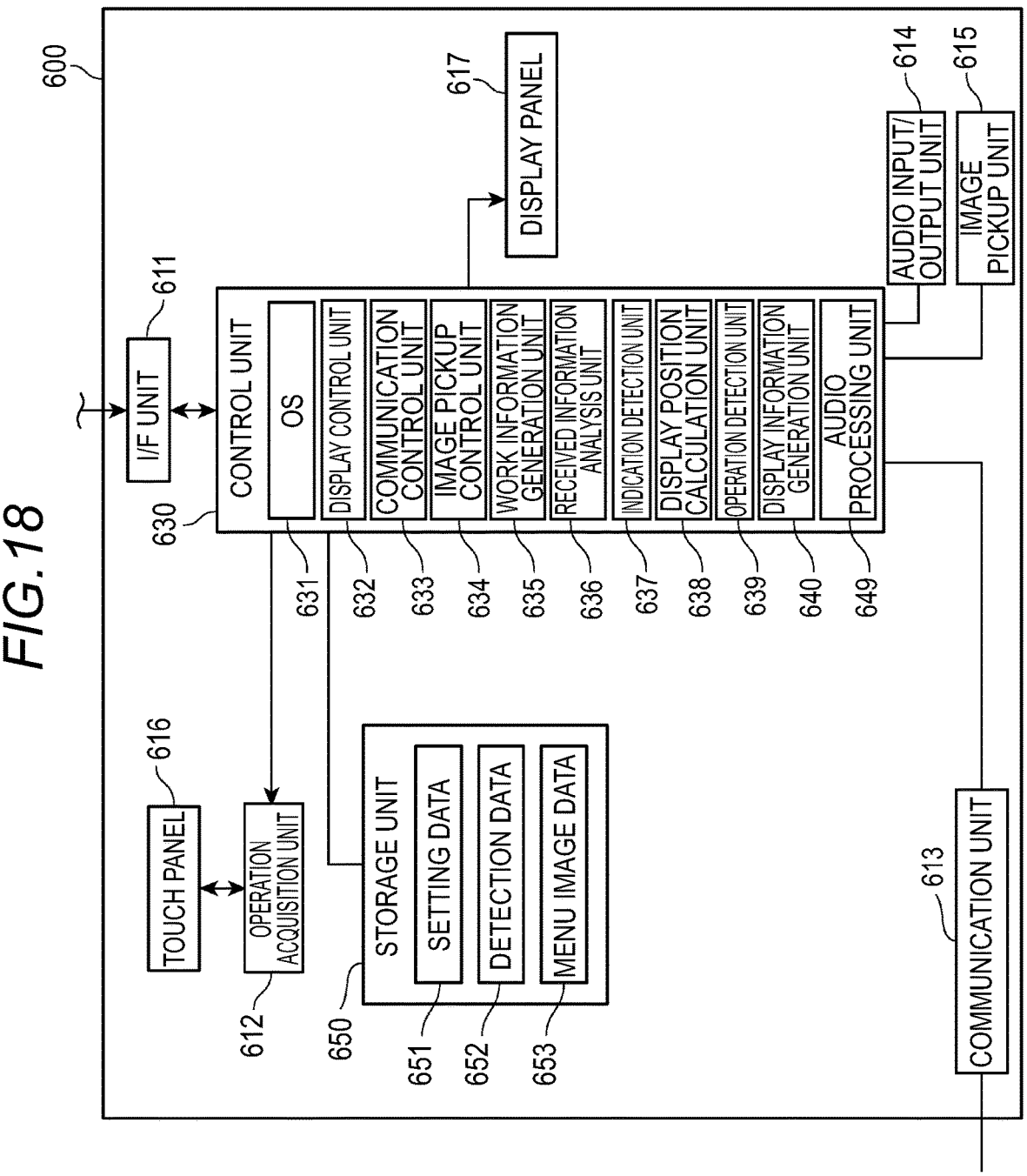
FIG. 18 is a functional block diagram of the tablet computer.

FIG. 18 is a functional block diagram of the tablet computer 600.

The tablet computer 600 has an interface (I/F) unit 611 wired or wirelessly connected to an external device. An external image supply device (not illustrated) such as PC, video playback device or DVD playback device can be connected to the interface unit 611.

The tablet computer 600 has the display panel 617 functioning as a second display unit. The display panel 617 is formed by a liquid crystal display panel, for example, and displays an image under the control of a control unit 630.

An operation acquisition unit 612 detects a touch operation on a touch panel 616 arranged on top of the display panel 617, and outputs operation data indicating the operation position to the control unit 630.

An image pickup unit 615 has an image pickup optical system, an image pickup element such as CCD or CMOS, and an interface circuit or the like. The image pickup unit 615 executes image pickup and outputs pickup image data to the control unit 630.

A communication unit 613 corresponds to the communication unit 13. The communication unit 613 carries out wireless data communication in conformity with standards such as wireless LAN (including WiFi), Miracast or Bluetooth, and is connected to the communication network 4. The tablet computer 600 carries out communication by the communication unit 613 via the communication network 4 and transmits and receives data to and from the projector 100A, for example. The tablet computer 600 may also be connected to an external device by the communication unit 613 and acquire contents data or the like from the external device.

An audio input/output unit 614 is connected to the control unit 630. The audio input/output unit 614 has a microphone (not illustrated) for collecting a sound, and a speaker (not illustrated) for outputting a sound. The audio input/output unit 614 drives the speaker on the basis of an audio signal inputted from the control unit 630 and thus outputs a sound, and also outputs an audio signal of a sound collected by the microphone to the control unit 630. The audio input/output unit 614 may also have an A/D converter and a D/A converter (not illustrated) for conversion between analog audio signals and digital audio data. In this case, the audio input/output unit 614 outputs a sound based on digital audio data inputted from the control unit 630 and outputs digital audio data of a sound collected by the microphone to the control unit 630.

A storage unit 650 stores various programs including the operating system executed by the control unit 630 and data processed by the control unit 630, in a non-volatile manner. The storage unit 650 stores setting data 651. The setting data 651 is equivalent to the setting data 81 (FIG. 15) and includes various setting values used by the control unit 630. The setting values included in the setting data 651 may be values inputted in advance by operations detected by the operation acquisition unit 612. Alternatively, the setting values may be received from an external device (not illustrated) via a communication unit 613 or the interface unit 611.

The storage unit 650 also stores detection data 652 menu image data 653.

The detection data 652 is equivalent to the detection data 82 (FIG. 15). The detection data 652 is data used for detecting an image of an object to be work on OB from image data. The object to be work on OB is an object which the support recipient UB using the tablet computer 600 is to work on, and can be considered to be arranged on the worktop T at the time of work.

The detection data 652 includes data used for processing to extract an image of the object to be work on OB from image data, for example, and more specifically, includes data of a feature quantity of the image of the object to be work on OB. The feature quantity may be the feature quantity of color or the feature quantity of shape, and may include a plurality of feature quantities corresponding to the number of colors and resolution of the image data of the processing target. In the display system including the tablet computer 600, if the object to be work on OB which the support recipient UB is to work on is known in advance, the detection data 652 for this object to be work on OB is stored in the storage unit 650.

The menu image data 653 is equivalent to the menu image data 83 (FIG. 15) and is image data for displaying a menu image on the display panel 617. For example, the menu image is a menu bar where operation icons are arranged in lines, or a dial menu where icons are arranged in a circular frame, or the like.

The control unit 630 has a CPU (not illustrated) which executes programs, a RAM (not illustrated) which temporarily stores programs and data executed by the CPU, and a ROM (not illustrated) which stores a basic control program and data executed by the CPU, in a non-volatile manner. The control unit 630 reads out and executes computer programs stored in the ROM or the storage unit 650 and thus controls each part of the tablet computer 600.

The control unit 630 executes the programs and thus functions as an operating system (OS) 631, a display control unit 632, and a communication control unit 633. The control unit 630 also functions as an image pickup control unit 634, a work information generation unit 635, a received information analysis unit 636, an indication detection unit 637, a display position calculation unit 638, an operation detection unit 639, a display information generation unit 640, and an audio processing unit 649.

The display control unit 632 causes the display panel 617 to display an image according to the program executed by the control unit 630.

The communication control unit 633 is a functional unit equivalent to the communication control unit 63 (FIG. 15) and controls the communication unit 613 to control the communication with the projector 100A. The communication control unit 633 receives instruction information from the projector 100A and outputs the received instruction information to the received information analysis unit 636. The communication control unit 633 also transmits work information generated by the work information generation unit 635 to the projector 100A.

The image pickup control unit 634 is a functional unit equivalent to the image pickup control unit 64 (FIG. 15) and controls the image pickup unit 615 to execute image pickup and acquires pickup image data.

The work information generation unit 635 is a functional unit equivalent to the work information generation unit 65 (FIG. 15) and generates work information to be transmitted to the projector 100A. The work information generation unit 635 acquires the pickup image data of the image pickup unit 615. The work information generation unit 635 may also acquire data indicating the contents of an operation detected by the operation acquisition unit 612. In this case, the work information generation unit 635 generates work information including the pickup image data of the image pickup unit 615 and the data of the operation contents. The work information generation unit 635 may also generate work information including image data generated from the pickup image data, instead of the pickup image data of the image pickup unit 615 itself.

The received information analysis unit 636 is a functional unit equivalent to the received information analysis unit 66 (FIG. 15) and analyzes the data received by the communication control unit 633. In the embodiment, the received information analysis unit 636 extracts image data of the indicator, image data of contents, audio data, and other data included in the instruction information received from the projector 100A by the communication control unit 633. The received information analysis unit 636 also extracts data indicating the position and movement of the indicator from the instruction information received by the communication control unit 633.

The indication detection unit 637 is a functional unit equivalent to the indication detection unit 67 (FIG. 15) and detects data indicating that an operation with the indicator is to be carried out, from the data extracted by the received information analysis unit 636. For example, the support provider UA operates the projector 100A, carries out a position indication operation with the indicator, and thus can control the projector 100A by this position indication operation. In this case, the tablet computer 600 detects data about the position indication operation included in the instruction information transmitted from the projector 100A, as an operation on the GUI. The instruction information transmitted from the projector 100A includes data designating whether the operation by the support provider UA is to be detected as an operation on the GUI or not. The indication detection unit 637 detects this data.

The display position calculation unit 638 is a functional unit equivalent to the display position calculation unit 68 (FIG. 15) and calculates the position where an image is to be displayed on the basis of the image data extracted by the received information analysis unit 636. The image data extracted by the received information analysis unit 636 is image data of the indicator, image data of contents, and other image data. On the basis of these data, the display position calculation unit 638 calculates the display position of the image of the indicator, the display position of the image data of contents, and the display position of other images. The display position calculation unit 638 may also calculate the display size of each image. In the case where the indication detection unit 637 detects data indicating that the operation by the support provider UA is regarded as an operation on the GUI, the display position calculation unit 638 calculates the display position of a menu image for carrying out GUI operations. On the basis of the display position calculated by the display position calculation unit 638, the display control unit 632 causes the display panel 617 to display the image.

The operation detection unit 639 is a functional unit equivalent to the operation detection unit 69 (FIG. 15) and detects an operation in the case of detecting the data indicating the position and movement of the indicator extracted by the received information analysis unit 636, as an operation on the GUI. The operation detection unit 639 detects the operation on the GUI on the basis of the display position of an icon or the like in the menu image and the display position of the image of the indicator calculated by the display position calculation unit 638.

The display information generation unit 640 generates display information of a screen to be displayed by the display panel 617. The display information generation unit 640 arranges an image based on the image data extracted by the received information analysis unit 636, at the display position calculated by the display position calculation unit 638, and thus generates display information corresponding to one screen. The display information generated by the display information generation unit 640 is displayed by the display panel 617 under the control of the display control unit 632.

The audio processing unit 649 acquires an audio signal included in the contents, amplifies the acquired audio signal, and outputs the amplified audio signal to the audio input/output unit 614. The audio processing unit 649 also acquires a sound collected by the microphone (not illustrated) of the audio input/output unit 614 and converts the sound into digital audio data. The audio processing unit 649 may perform preset processing on the digital audio data.

Figure 19A:
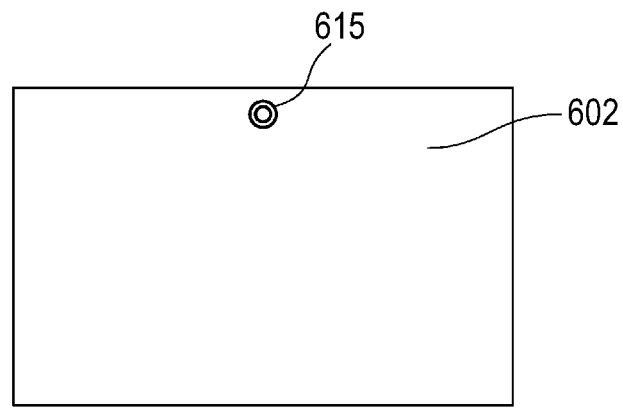
FIGS. 19A and 19B show the configurations of the front and back sides of the tablet computer.
Figure 19B:
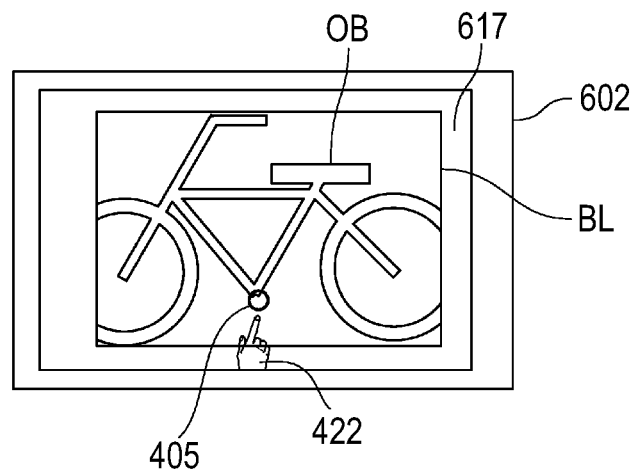

FIGS. 19A and 19B show the configurations of the front and back sides of the tablet computer 600. FIG. 19A shows the appearance on the back side of the tablet computer 600. FIG. 19B shows the appearance and display example of the front side of the tablet computer 600.

As shown in FIG. 19A, the image pickup lens of the image pickup unit 615 is exposed on the back side of the casing 602 of the tablet computer 600. That is, the image pickup range of the image pickup unit 615 is the back side of the casing 602. In the wearing state of FIG. 17, the area below the casing 602 is the image pickup range.

The tablet computer 600 thus configured can execute functions similar to those of the HMDs 200 described in the first to fourth embodiments or the projector 100B described in the fifth embodiment.

As shown in FIG. 19B, the control unit 630 of the tablet computer 600 causes the display panel 617 to display a pickup image picked up by the image pickup unit 615. The control unit 630 causes the edge of the pickup image to be clearly displayed as an image pickup boundary line BL indicating the image pickup range of the image pickup unit 615. The control unit 630 also causes the display panel to display an image indicating an indication position 405 and an indicator image 422 indicating the indicator 2 of the support provider UA to the indication position 405, on the basis of the instruction information received from the projector 100A. The type and display form of the indicator image 422 can be similar to those in the first embodiment.

The control unit 630 causes the display panel 617 to display a pickup image including the object to be worked on OB picked up by the image pickup unit 615.

The display positions of the indication position 405 and the indicator image 422 are calculated by the display position calculate unit 638 of the control unit 630. The display position calculation unit 638 detects an image of the object to be worked on OB from the pickup image of the image pickup unit 615, and defines a position corresponding to the image of the object to be worked on OB, as the display position.

Here, since the tablet computer 600 is held on the body of the support recipient UB with the attachment jig 601 as shown in FIG. 17, the relative position of the object to be worked on OB in the image pickup range of the image pickup unit 615 does not move unless the support recipient UB moves. Therefore, the indication position 405 and the indicator image 422 can be displayed at appropriate positions.

In the case where the tablet computer 600 thus configured is used instead of the projector 100B, effects similar to those of the first to third embodiments can be achieved.

Also, the projector 100A can be used instead of the tablet computer 600. In this case, too, effects similar to those of the first to third embodiments can be achieved.

Seventh Embodiment

Figure 20:
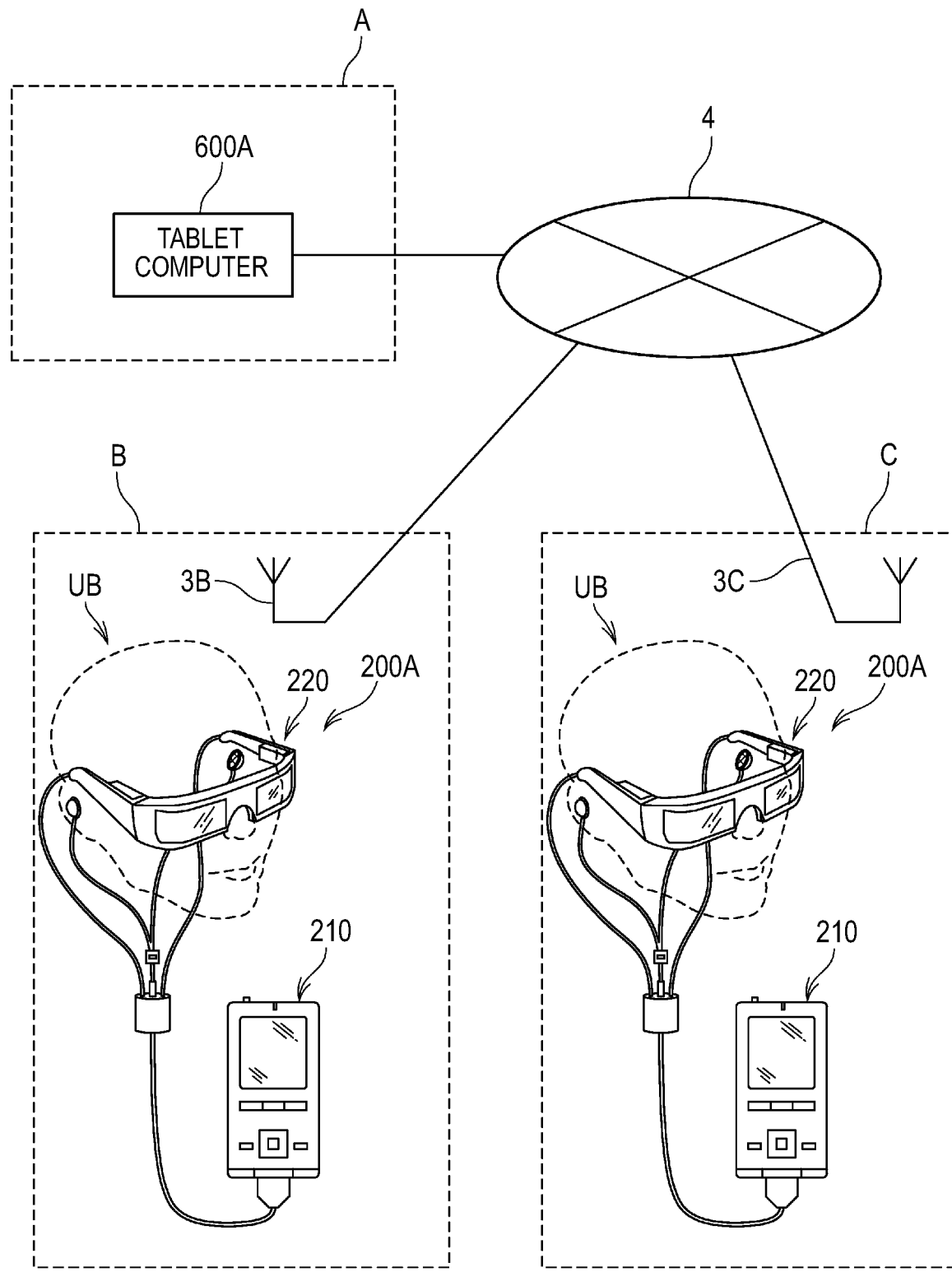
FIG. 20 shows the configuration of a display system according to a seventh embodiment.

FIG. 20 shows the configuration of a display system 1C according to a seventh embodiment. The display system 1C according to the seventh embodiment uses an HMD 200A as a display device (first display device) according to the invention, as in the first to fifth embodiments. As an example, each of the support recipients UB, UC at the work sites B and C uses an HMD 200A. The display system 1C also uses a tablet computer 600A (second display device) as the display device used by the support provider UA at the support site A. The display system 1C includes one or a plurality of tablet computers 600A and one or a plurality of HMDs 200A. The numbers of the tablet computers 600A and the HMDs 200A are arbitrary, and the display system 1C is not limited to the configuration shown in FIG. 20. The seventh embodiment is a configuration example using the tablet computer 600A in the first to fifth embodiments. Operations similar to those in the display systems 1, 1A, 1B described in the first to fifth embodiments are executed, and similar effects can be achieved.

While this embodiment uses the tablet computer 600A as an example, the display device (second display device) used by the support provider UA is not limited to the tablet computer 600A. For example, a general-purpose apparatus having a display screen capable of displaying an image and a camera, such as personal computer or smartphone, can be used as the second display device.

In the seventh embodiment, the same components as in the display systems 1, 1A, 1B described in the first to fifth embodiments are denoted by the same reference numbers and are not be described further in detail.

Figure 21:
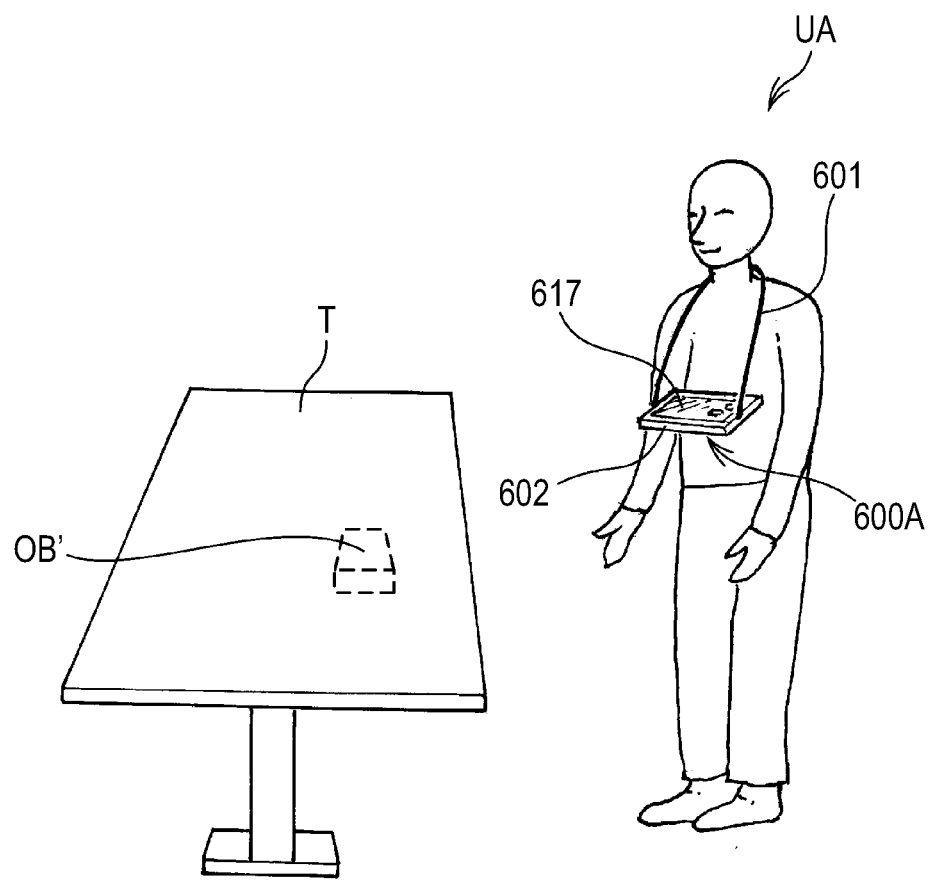
FIG. 21 shows the appearance of a tablet computer according to the seventh embodiment.

The tablet computer 600A has a thin plate-like casing 602. A display panel 617 (second display unit) is arranged on the front side of the casing 602. The tablet computer 600A is held on and preferably fixed to the body of the support provider UA with an attachment jig 601. As shown in FIG. 21, the support provider UA, in the state of wearing the tablet computer 600A with the attachment jig 601, can visually recognize an image on the display panel 617.

On the back of the casing 602, an image pickup unit 615 (FIG. 19A) is installed, as in the tablet computer 600. An image picked up by the image pickup unit 615 can be displayed on the display panel 617. The image picked up by the image pickup unit 615 and an image received from the HMD 200A can be AR-displayed in a superimposed manner. For example, when the tablet computer 600A receives a pickup image of an object to be worked on OB placed on the worktop T from the HMD 200A worn by the support recipient UB, AR display can be effectively used. In this case, the tablet computer 600A displays a pickup image of a worktop T' picked up by the image pickup unit 615 and the image of the object to be worked on OB in a superimposed manner on the display panel 617, and thus can AR-display a virtual object to be worked on OB', which does not exist on the worktop T'. The support provider UA can work on the object to be worked on OB while viewing the screen displayed on the display panel 617.

Figure 22:
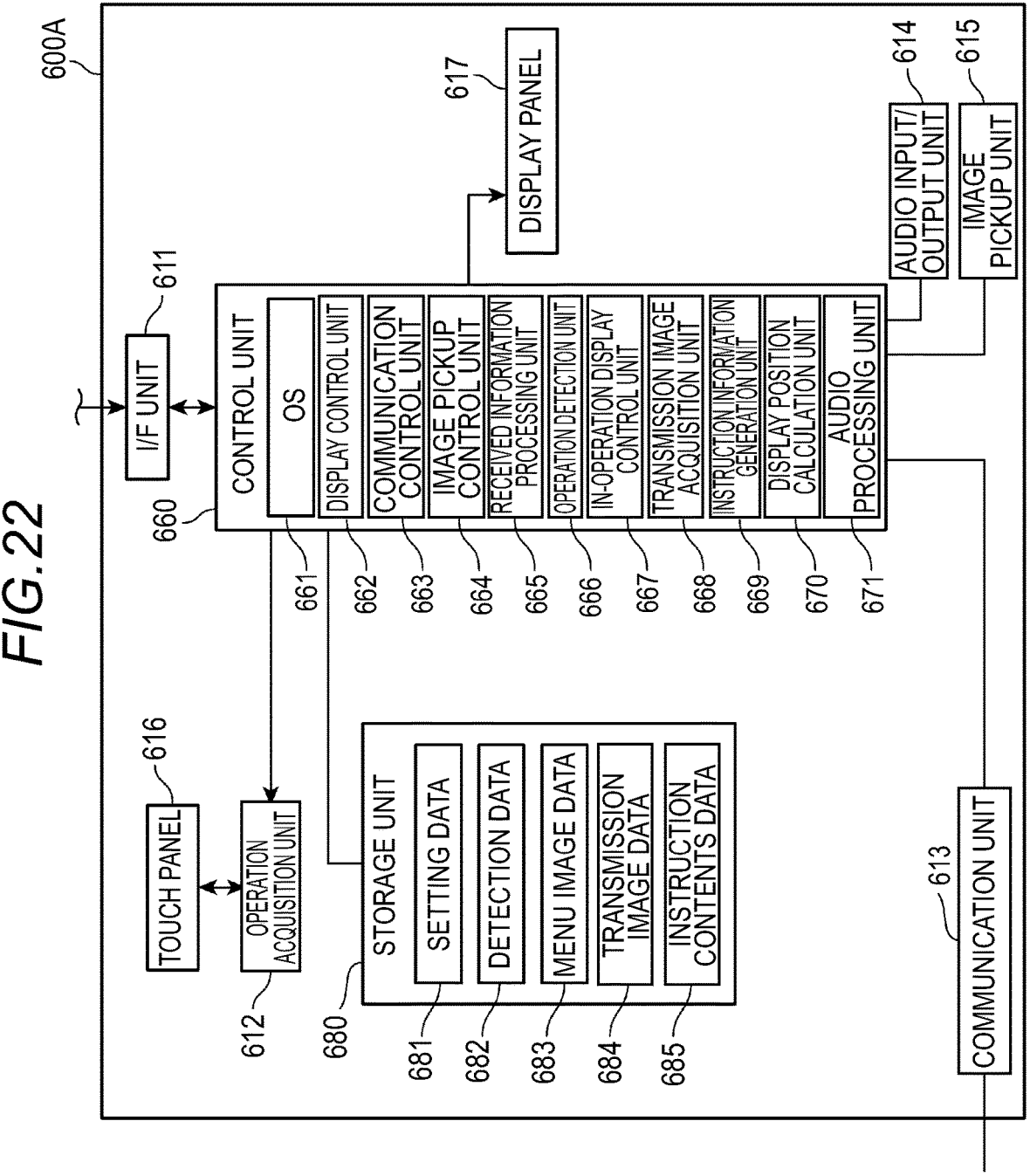
FIG. 22 is a functional block diagram of the tablet computer.

FIG. 22 is a functional block diagram of the tablet computer 600A. The tablet computer 600A has a hardware configuration similar to the tablet computer 600 (FIG. 17) described in the sixth embodiment.

That is, the tablet computer 600A is configured similarly to the tablet computer 600 (FIG. 18). The tablet computer 600A has an interface unit 611, an operation acquisition unit 612, a communication unit 613 (second communication unit), an audio input/output unit 614, the image pickup unit 615, a touch panel 616, and the display panel 617. The configurations of these parts are similar to the components of the tablet computer 600 and therefore are not described further in detail.

The tablet computer 600A has a control unit 660 (second control unit) and a storage unit 680. The control unit 660, similarly to the control unit 630, is connected to the interface unit 611, the operation acquisition unit 612, the communication unit 613, the audio input/output unit 614, the image pickup unit 615, and the display panel 617. The control unit 660 is also connected to the storage unit 680.

The storage unit 680 stores various programs including an operating system 661 executed by the control unit 660 and data processed by the control unit 660, in a non-volatile manner. The storage unit 680 stores setting data 681. The setting data 681 is equivalent to the setting data 51 (FIG. 3) and includes various setting values used by the control unit 660. The setting values included in the setting data 681 may be values inputted in advance by operations detected by the operation acquisition unit 612. Alternatively, the setting values may be received from an external device (not illustrated) via a communication unit 613 or the interface unit 611 and stored.

The storage unit 680 also stores detection data 682, menu image data 683, transmission image data 684, and instruction contents data 685.

The detection data 682 is equivalent to the detection data 52 (FIG. 3) and is data used for detecting an image of an object to be work on OB from image data. The object to be work on OB is an object which the support recipient UB, UC using the HMD 200A is to work on, and can be considered to be arranged at a position visible to the support recipient UB, UC, that is, within the field of view of the support recipient UB, UC. The detection data 682 includes data used for processing to extract an image of the object to be work on OB from image data, for example, and more specifically, includes data of a feature quantity of the image of the object to be work on OB. The feature quantity may be the feature quantity of color or the feature quantity of shape, and may include a plurality of feature quantities corresponding to the number of colors and resolution of the image data of the processing target. In the display system 1C, if the object to be work on OB which the support recipient UB is to work on is known in advance, the detection data 682 for this object to be work on OB is stored in the storage unit 680.

The menu image data 683 is equivalent to the menu image data 53 (FIG. 3) and is image data for displaying a menu image on the display panel 617. For example, the menu image is a menu bar where operation icons are arranged in lines, or a dial menu where icons are arranged in a circular frame, or the like.

The transmission image data 684 is equivalent to the transmission image data 54 (FIG. 3) and is image data used for instruction information transmitted from the tablet computer 600A to the HMD 200A. For example, the transmission image data 684 is image data of an image of an indicator such as an arm, hand, finger or indicator stick.

The instruction contents data 685 is equivalent to the instruction contents data 55 (FIG. 3) and is data of contents transmitted from the tablet computer 600A to the HMD 200A. The instruction contents data 685 can include text data, still image data, dynamic image data, and audio data or the like, for example.

The control unit 660 has a CPU (not illustrated) which executes programs, a RAM (not illustrated) which temporarily stores programs and data executed by the CPU, and a ROM (not illustrated) which stores a basic control program and data executed by the CPU, in a non-volatile manner. The control unit 660 reads out and executes computer programs stored in the ROM or the storage unit 680 and thus controls each part of the tablet computer 600A.

The control unit 660 executes the programs and thus functions as an operating system (OS) 661, a display control unit 662, and a communication control unit 663. The control unit 660 also functions as an image pickup control unit 664, a received information processing unit 665, an operation detection unit 666, an in-operation display control unit 667, a transmission image acquisition unit 668, an instruction information generation unit 669, a display position calculation unit 670, and an audio processing unit 671.

The display control unit 662 causes the display panel 617 to display an image according to the program executed by the control unit 660.

The communication control unit 663 is a functional unit equivalent to the communication control unit 33 (FIG. 3) and controls the communication unit 613 to control the communication with the HMD 200A. The communication control unit 663 receives work information (processing information) from the HMD 200A and outputs the received work information to the received information processing unit 665. The communication control unit 663 also transmits instruction information generated by the instruction information generation unit 669, to the HMD 200A.

The image pickup control unit 664 functions similarly to the image pickup control unit 64 (FIG. 15) and controls the image pickup unit 615 to execute image pickup, thus acquiring pickup image data.

The received information processing unit 665 is equivalent to the received information processing unit 34 (FIG. 3). The received information processing unit 665 analyzes the work information received by the communication control unit 663 and extracts image data included in the work information. The received information processing unit 665 uses the detection data 682 stored in the storage unit 680 and detects an image of the object to be work on OB from the image data included in the work information, for example.

The operation detection unit 666 is equivalent to the operation detection unit 35 (FIG. 3) and detects an operation by the support provider UA. The operation detection unit 666 detects an operation on the touch panel 616 on the basis of operation data inputted from the operation acquisition unit 612. The operation detection unit 666, using the image pickup unit 615, also detects an operation by the support provider UA within the image pickup range of the image pickup unit 615. In this case, the operation detection unit 666 detects an image of the indicator used by the support provider UA, from pickup image data from the image pickup unit 615. The indicator (operating body) used by the support provider UA includes an arm, hand or finger of the support provider UA, an indicator stick or the like, for example. The operation detection unit 666 specifies the indication position of the indicator on the basis of the position of the image of the indicator in the pickup image. The operation detection unit 666 has data in which the position in the pickup image from the image pickup unit 615, the position in the image pickup range of the image pickup unit 615 and the position in the display area correspond to each other. This data is set by calibration in advance, for example, and is included in the setting data 681 and thus stored in the storage unit 680. Thus, when the support provider UA carries out work or an operation using the indicator in the image pickup range, the operation detection unit 666 can detect the position of the indicator as coordinates in the image pickup range. The operation detection unit 666 can also convert the position of the indicator into coordinates in the display area DA or relative coordinates in a display image displayed on the display panel 617.

The indicator is not limited to the arm, hand and finger of the support provider UA, the indicator stick or the like, and may also be a tool, apparatus or the like involved in the work carried out by the support recipient UB. That is, the support provider UA may use the tool or apparatus used by the support recipient UB, as the indicator. In this case, the tablet computer 600A may transmit a pickup image formed by picking up an image of the indicator to the HMD 200A as the indicator image. Also, the tablet computer 600A may select an image of a tool or apparatus of the same type as the indicator or associated in advance with the indicator, from the transmission image data 684, on the basis of a pickup image formed by picking up an image of the indicator, and may transmit the selected image as the indicator image. Also, the support provider UA may operate the tablet computer 600A to select an image of a tool, apparatus or the like involved in the work carried out by the support recipient UB, as the indicator image, and transmit this image to the HMD 200A as the indicator image. For example, in the case where the support recipient UB carries out work using a tool, an image of a screwdriver, pliers, an adjustable spanner, a test terminal of a continuity tester, a kitchen knife, or other special tools can be employed as the indicator image. Also, in the case where the support provider UA provides sports coaching to the support recipient UB via the display system 1C, an image of a tennis racket, golf club or the like can be employed as the indicator image.

The operation detection unit 666 may also detect an operation when the indication position of the indicator forms a trajectory that matches a preset pattern. This operation is a so-called gesture operation in which the support provider UA moves the indicator to give different indications depending on the types of movements.

The in-operation display control unit 667 is equivalent to the in-operation display control unit 36 (FIG. 3). The in-operation display control unit 667 controls the display on the display panel 617 during the detection of an operation by the operation detection unit 666. The in-operation display control unit 667 reads out the menu image data 683 and the like from the storage unit 680 and controls the display control unit 662 to display a menu image or the like. Thus, for example, when the support provider UA carries out an operation with the indicator or an operation on the touch panel 616, a character or image which serves as an index or reference of the movement of the indicator, or an image of a menu bar that enables position input, can be displayed on the display panel 617.

With the tablet computer 600A, the support provider UA can carry out an operation using an arm, hand, finger, indicator stick or the like as the indicator. For example, a GUI operation may be carried out using the menu image displayed under the control of the in-operation display control unit 667.

On the tablet computer 600A, the range in which an operation with the indicator such as an arm, hand, finger or indicator stick can be carried out is the range in which the image pickup unit 615 can pick up an image of the indicator, and specifically, the image pickup range of the image pickup unit 615.

The transmission image acquisition unit 668 is equivalent to the transmission image acquisition unit 37 (FIG. 3). The transmission image acquisition unit 668 acquires an image of an indicator included in the instruction information to be transmitted to the HMD 200A. In the case where the image pickup unit 615 picks up an image of the indicator, the transmission image acquisition unit 668 extracts and acquires an image of the indicator from the pickup image picked up by the image pickup unit 615. Meanwhile, in the case where an image of the indicator is to be acquired from the storage unit 680 according to an operation or presetting by the support provider UA, the transmission image acquisition unit 668 acquires the transmission image data 684.

The instruction information generation unit 669 is equivalent to the instruction information generation unit 38 (FIG. 3). The instruction information generation unit 669 generates the instruction information to be transmitted to the HMD 200A. The instruction information is data to be transmitted from the tablet computer 600A to the HMD 200A. For example, the instruction information includes image data and/or audio data of contents, image data of the indicator, audio data of the support provider UA generated by the audio processing unit 671, and data indicating the position or movement of the indicator.

The audio processing unit 671 is equivalent to the audio processing unit 49 (FIG. 3). The audio processing unit 671 acquires an audio signal included in the contents, amplifies the acquired audio signal, and outputs the amplified audio signal to the audio input/output unit 614. The audio processing unit 671 also acquires a sound collected by the microphone (not illustrated) of the audio input/output unit 614 and converts the sound into digital audio data. The audio processing unit 671 may perform preset processing on the digital audio data.

Figure 23:
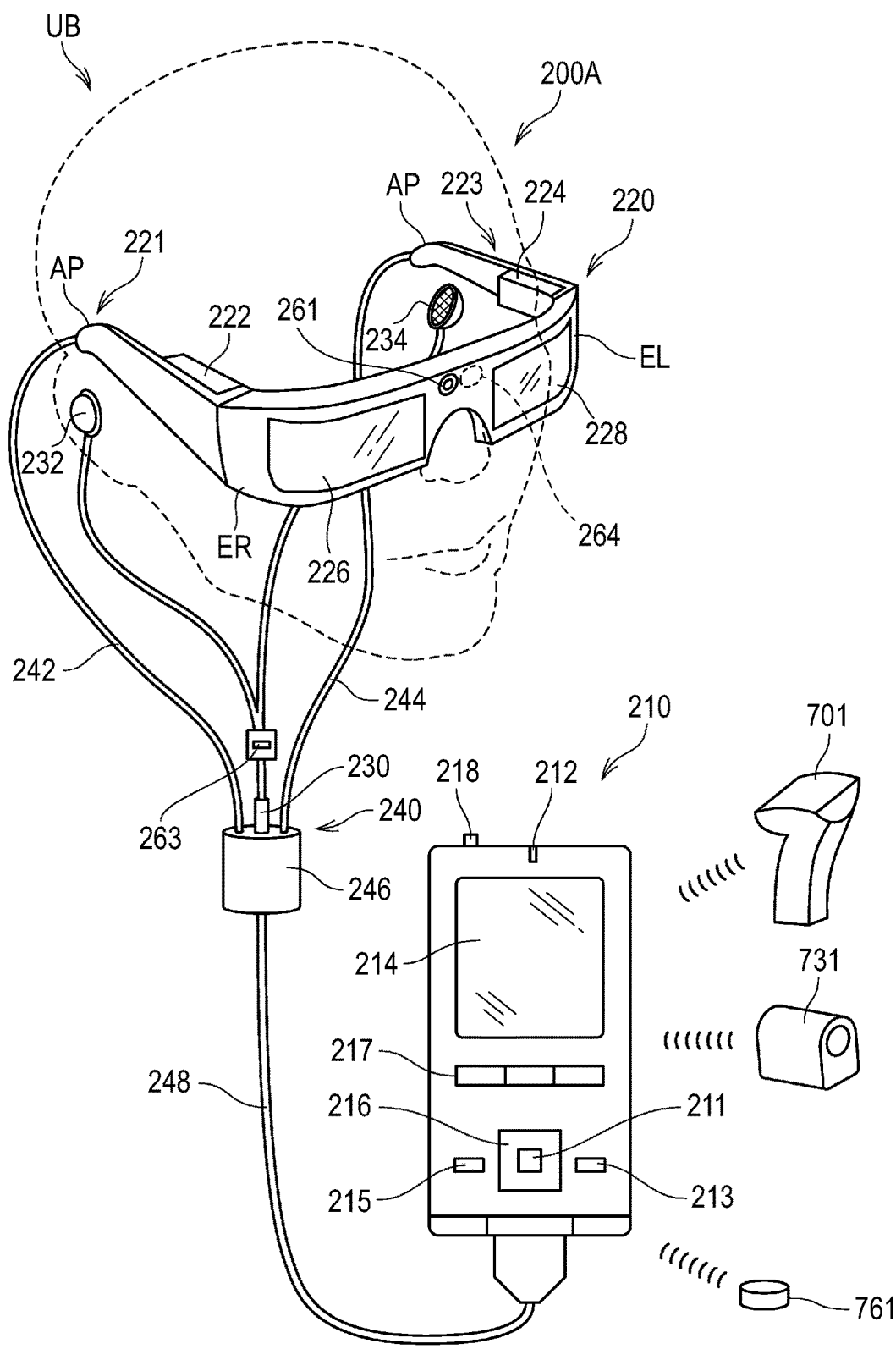
FIG. 23 is an explanatory view showing the external configuration of a head-mounted display device.

FIG. 23 shows the external configuration of the HMD 200A. In the embodiment, it is assumed that the support recipient UB and the support recipient UC use HMDs 200A of the same configuration.

Since the HMD 200A is configured similarly to the HMD 200 (FIG. 4), the same configurations as in the HMD 200 are denoted by the same reference numbers and are not described further in detail.

The HMD 200A operates under the control of the control unit 300 (first control unit) of the control device 210. The HMD 200A has the control device 210 and the image display unit 220 (first display unit) and is connected to a barcode reader 701, an external camera 731, and a motion sensor unit 761. That is, the HMD 200A has a configuration in which the barcode reader 701, the external camera 731, and the motion sensor unit 761 as external information detection units are connected to the HMD 200. The HMD 200A is not limited to the configuration having all of the barcode reader 701, the external camera 731, and the motion sensor unit 761. It suffices that at least one or more of these external information detection units is connected to the control device 210.

The barcode reader 701 (external information detection unit, reading unit) is a reading device which reads information formed as an image such as a barcode, two-dimensional code, or other image codes. The barcode reader 701 reads and decodes an image code and thus generates read data. The barcode reader 701 wirelessly transmits the read data to the control device 210. The barcode reader 701 may not only read coded (encoded) information but also directly read characters, for example.

The external camera 731 (external information detection unit, third image pickup unit) is a camera formed as a separate unit from at least the image display unit 220. The external camera 731 is separated from the image display unit 220 and placed on the body or work site B, C of the support recipient UB, UC, for example.

The motion sensor unit 761 (external information detection unit, motion detection unit) is a unit mounted on the body of the support recipient UB, UC. The motion sensor unit 761 is disc-shaped, for example, as shown in FIG. 23, but may have other shapes.

It is preferable that each of the barcode reader 701, the external camera 731, and the motion sensor unit 761 has a built-in battery, not illustrated, and can be used wirelessly. However, these units may be connected to an external battery or power supply.

Figure 24:
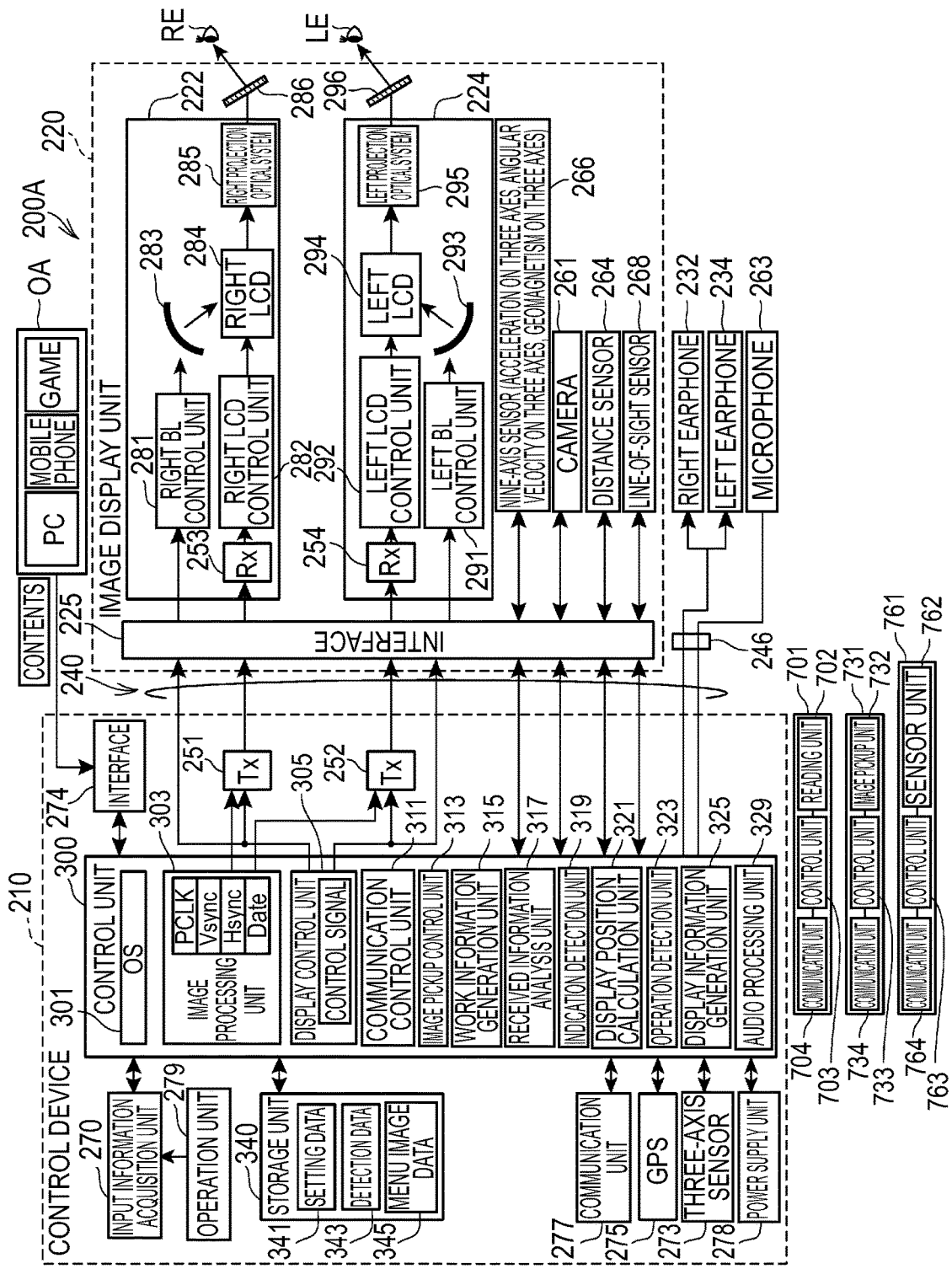
FIG. 24 is a functional block diagram of the head-mounted display device.

FIG. 24 is a functional block diagram of the HMD 200A.

The functional block forming the HMD 200A is similar to that of the HMD 200 (FIG. 6). The communication unit 277 carries out wireless data communication in conformity with standards such as wireless LAN (including WiFi), Miracast, or Bluetooth. Particularly, in this embodiment, it is preferable that the communication unit 277 executes communication with each of the barcode reader 701, the external camera 731, and the motion sensor unit 761 by Bluetooth.

The barcode reader 701 has a reading unit 702, a control unit 703, and a communication unit 704. The reading unit 702 optical reads an image code and generates a read signal. The reading unit 702 outputs the read signal to the control unit 703. The reading method by the reading unit 702 may be, for example, casting a laser beam onto a reading target and detecting the reflected light, or picking up an image of a reading target and detecting an image code from the pickup image, and the like.

The communication unit 704 executes wireless communication with the communication unit 277 by Bluetooth, for example, under the control of the control unit 703.

The control unit 703 controls the reading unit 702 to execute reading and acquires a read signal. The control unit 703 decodes the read signal to generate read data, and causes the communication unit 704 to transmit the read data to the control device 210.

The external camera 731 has an image pickup unit 732, a control unit 733, and a communication unit 734. The image pickup unit 732 executes image pickup by an image pickup element such as CCD or CMOS and outputs pickup image data to the control unit 733. It can be said that he image pickup unit 732 is equivalent to a third image pickup unit.

The communication unit 734 executes wireless communication with the communication unit 277 by Bluetooth, for example, under the control of the control unit 733.

The control unit 733 controls the image pickup unit 732 to execute image pickup and thus acquires pickup image data. The control unit 733 causes the communication unit 734 to transmit the pickup image data to the control device 210.

The motion sensor unit 761 has a sensor unit 762 (motion sensor), a control unit 763, and a communication unit 764. The motion sensor unit 761 has a motion sensor for detecting a motion. The motion sensor is an acceleration sensor, angular velocity sensor or the like, for example. The sensor unit 762 may have a plurality of sensors.

The communication unit 764 executes wireless communication with the communication unit 277 by Bluetooth, for example, under the control of the control unit 763.

The control unit 763 controls the sensor unit 762 to acquire a detection value of the motion sensor provided in the sensor unit 762 in a preset sampling period. The control unit 763 generates detection data indicating the detection value of the sensor unit 762 and causes the communication unit 764 to transmit the detection data to the control device 210.

The motion sensor unit 761 can be mounted on the head, arm, waist, leg or the like of the support recipient UB, using a dedicated harness or clothes.

It suffices that the communication units 704, 734, 764 can execute short-range wireless communication with the communication unit 277. Of course, communication systems other than Bluetooth can be used as well.

The work information generation unit 315 generates work information including the pickup image data of the camera 261. The work information generation unit 315 also can generate work information including at least one of the read data read by the barcode reader 701, the pickup image data picked up by the external camera 731, and the detection data of motion detection detected by the motion sensor unit 761. For example, the work information generation unit 315 can generate work information including the pickup image data of the camera 261 and the pickup image data of the external camera 731. As the tablet computer 600A receives this work information, the tablet computer 600A can process the two pickup image data. The external camera 731 allows a high degree of freedom in the installation position, and the angle of view (image pickup range) of the external camera 731 is not limited by the position or direction of the image display unit 220. Therefore, the external camera 731 can pick up an image of the object to be worked on OB from an arbitrary angle without being limited by the direction of the body or face of the support recipient UB wearing the HMD 200A.

When the tablet computer 600A receives the work information including the read data of the barcode reader 701 from the HMD 200A, the tablet computer 600A can carry out processing based on the read data. For example, the tablet computer 600A can acquire information about the object to be worked on OB used by the support recipient UB, from an external server (not illustrated), and display the acquired information.

The read data of the barcode reader 701 can be used as a work record of the work executed by the support recipient UB wearing the HMD 200A. For example, when the read data of the barcode reader 701 is transmitted to the tablet computer 600A, this read data may be used as a trigger for sharing a point of view. In this case, the tablet computer 600A starts sharing the point of view and starts the operation of displaying an image based on the pickup image data included in the work information transmitted from the HMD 200A, on the entire surface of the display panel 617. Also, in work procedure data (work standard) stored in advance in the tablet computer 600A or the HMD 200A, the state of progress in each work may be recorded on the basis of the read data of the barcode reader 701. Moreover, the pickup image data included in the work information transmitted from the HMD 200A may be saved in the storage unit 680 or a cloud server (not illustrated), using the read data of the barcode reader 701 as a key.

Meanwhile, when the tablet computer 600A receives work information including the detection data of the motion sensor unit 761 from the HMD 200A, the tablet computer 600A can carry out processing related to the motion of the support recipient UB on the basis of the detection data. For example, the tablet computer 600A can display a gauge or image indicating the motion of the support recipient UB on the display panel 617. Also, the motion of the support recipient UB can be used for input operation. For example, if the detection data of the motion sensor unit 761 is data indicating a nodding movement of the support recipient UB, a nod is detected. This processing is equivalent to so-called gesture input. When the motion detected by the motion sensor unit 761 matches a preset gesture, the tablet computer 600A detects an input corresponding to this gesture. The work information generation unit 315 can also include the detection data of the nine-axis sensor 266 and the detection data of the motion sensor unit 761. When the tablet computer 600A receives work information including the detection data of the nine-axis sensor 266 and the detection data of the motion sensor unit 761, the tablet computer 600A can statistically process these detection data. For example, a change in the relative positions of the head of the support recipient UB and the site where the motion sensor unit 761 is mounted on the body of the support recipient UB can be detected on the basis of the difference between the detection data of the nine-axis sensor 266 and the detection data of the motion sensor unit 761. Therefore, detailed analysis of the motion of the support recipient UB can be carried out and more complex gesture input can be realized.

Using gesture input, for example, the instruction contents data 685 transmitted from the tablet computer 600A to the HMD 200A and displayed on the HMD 200A can be switched. If the instruction contents data 685 received by the HMD 200A from the tablet computer 600A includes a plurality of images, an instruction on the display switching among these images and display forward/rewind may be given by gesture input.

Also, for example, input contents may be preset for each type of gesture detected on the basis of the detection data of the nine-axis sensor 266 and the motion sensor unit 761 in the HMD 200A. In this case, a plurality of inputs can be made using a plurality of types of gestures. For example, in the HMD 200A, in the state where either "Yes" or "No" is selected and inputted with respect to the support recipient UB, a forward/backward movement of the head of the support recipient UB may be accepted as an input of "Yes", and a left/right shaking movement of the head may be accepted as an input of "No". In this case, the HMD 200A may be set in such a way that a forward/backward movement of the head of the support recipient UB is accepted as an input of "Yes" and that a left/right shaking gesture of the head is accepted as an input of "No". With such use, hands-free operations on the HMD 200A can be realized.

The control unit 660 can analyze the operation by the support recipient UB on the basis of the detection data of the motion sensor unit 761. In this case, the work information generation unit 315 may generate work information including the detection data of the nine-axis sensor 266 and cause the communication control unit 311 to transmit the work information to the tablet computer 600A. The control unit 660 analyzes the detection data of the motion sensor unit 761, and if possible, analyzes the detection data of the nine-axis sensor 266. Thus, the control unit 660 may associate the motion of the support recipient UB during work with the work contents executed by the support recipient UB, and thus evaluate the work efficiency of the support recipient UB. In this evaluation, the line of movement of the support recipient UB at the work site B may be calculated. Also, data indicating the movement of a standard worker in association with the work contents executed by the support recipient UB may be stored in advance in the storage unit 680 as data for evaluation. The control unit 660 may compare the detection data included in the work information received from the HMD 200A with the data for evaluation and thus evaluate the motion of the support recipient UB. Also, text data, audio data or image data including advice on the motion of the support recipient UB may be transmitted to the HMD 200A in order to improve the work efficiency of the support recipient UB. This advice may also be displayed on the display panel 617.

Figure 25A:
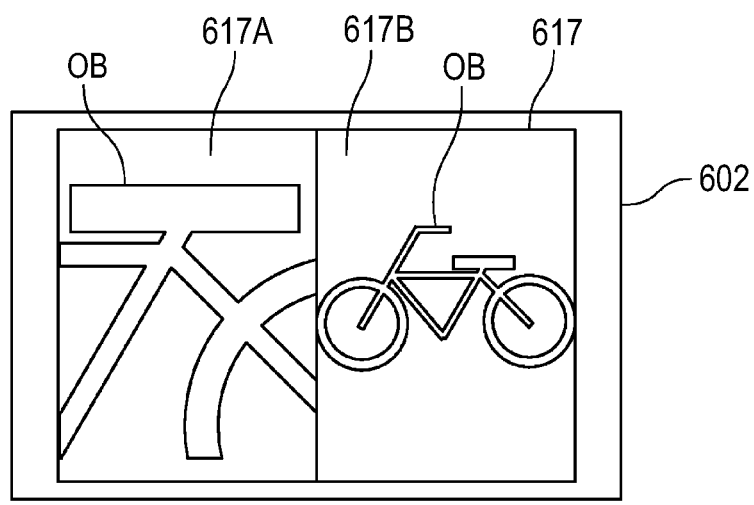
FIGS. 25A and 25B show display examples on the tablet computer.
Figure 25B:
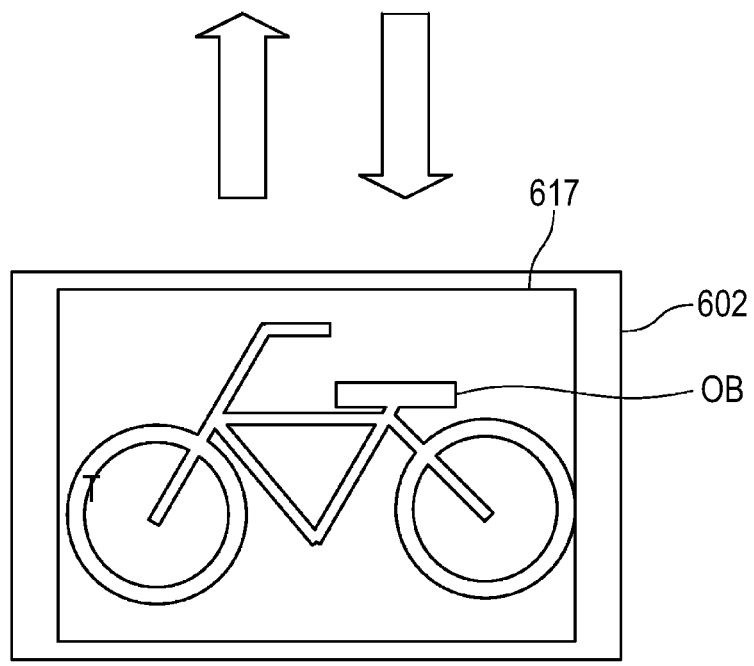

FIGS. 25A and 25B show display examples on the tablet computer 600A. FIG. 25A shows a two-screen display state in which two images are displayed next to each other on the display panel 617. FIG. 25B shows a normal display state in which one image is displayed on the display panel 617.

In the case where the work information received from the HMD 200A includes two pickup image data, the received information processing unit 665 of the tablet computer 600A can extract there two pickup image data. When the received information processing unit 665 extracts the two pickup image data, the display control unit 662 can switch between a normal display state in which one image based on one of the pickup image data is displayed and a two-screen display state in which two images based on the two pickup image data are displayed. The display control unit 662 may automatically select one of the normal display state and the two-screen display state according to the setting data 681, or may select one of these states on the basis of the operation acquired by the operation acquisition unit 612.

In the two-screen display state, as shown in FIG. 25A, display areas 617A, 617B are set on the display panel 617. In the display area 617A, an image based on the pickup image data of the camera 261 is displayed, for example. In the display area 617B, an image based on the pickup image data of the external camera 731 is displayed, for example. Thus, as illustrated in FIG. 25A, an enlarged image of the work site on the object to be worked on OB, picked up by the camera 261, and a bird's-eye-view image picked up by the external camera 731 can be displayed next to each other.

Meanwhile, in the normal display state, for example, as shown in FIG. 25B, an image based on the pickup image data of the external camera 731 is displayed. Thus, a bird's-eye-view image can be displayed regardless of the work contents of the support recipient UB or the direction in which the support recipient UB wearing the HMD 200A is attentively watching.

Here, the instruction information generation unit 669 can include, in instruction information, information indicating the zoom magnification of the camera 261 and/or the external camera 731 on the basis of the operation detected by the operation detection unit 666. This function is effective when the camera 261 and/or the external camera 731 has an optical zooming function or digital zooming function. In this case, the zoom magnification of the pickup image data included in the work information transmitted from the HMD 200A can be adjusted by an operation on the tablet computer 600A. The external camera 731 may automatically adjust the zoom magnification on the basis of a preset condition. Also, the external camera 731 may have a lighting device for image pickup, and this lighting device may emit visible rays or infrared rays. It is preferable that the image pickup unit 732 is configured to be able to perform image pickup with the light emitted from the lighting device. Moreover, the display magnification of the image based on the pickup image data included in the work information received by the tablet computer 600A may be adjusted by an operation on the tablet computer 600A. In the two-screen display state shown in FIG. 25A, for example, the support provider UA can display an enlarged image of details of the object to be worked on OB and a bird's-eye-view image including the entirety of the object to be worked on OB, next to each other, by adjusting the magnifications of the images displayed in the display areas 617A, 617B.

Since the HMD 200A has the external camera 731, the support provider UA can simultaneously see an image around the hands of the support recipient UB during work and a bird's-eye-view image. The external camera 731 may be provided not only on the body of the support recipient UB but also at a position where the external camera 731 picks up an image of the object to be worked on OB from the side opposite to the support recipient UB. In this case, the support provider UA can view an image of the back side of the object to be worked on OB. If the external camera 731 is a wide-angle camera, the support provider UA can view pickup image data picked from a broader range. Also, the display control unit 662 may cause an image based on the pickup image data included in the work information and an image of the instruction contents data 685 to be displayed next to each other in the two-screen display state. The support provider UA can view an image of a work manual and components, an image showing the standard work, and the like, along with an image showing the state of the work of the support recipient UB. In this case, the control unit 660 can also select the instruction contents data 685 on the basis of the read data of the barcode reader 701.

The display state on the display panel 617 is not limited to the example in which the entirety of the display panel 617 is divided into the plurality of display areas 617A, 617B as shown in FIG. 25A. The display control unit 662 may also arrange the display areas 617A, 617B at a peripheral edge of the display panel 617 and cause the pickup image of the image pickup unit 615 to be displayed in a part other than the display areas 617A, 617B. Also, image pickup conditions such as exposure of the camera 261 and the external camera 731 may varied. The positions of the display areas 617A, 617B may be switched as well. With these variations, images can be displayed in such a way that the support provider UA can easily visually recognize the images without largely moving his/her line of sight.

In the tablet computer 600A, the pickup image data included in the work information transmitted from the two HMDs 200A worn by the support recipients UB, UC, respectively, may be displayed next to each other in the two-screen display state.

The HMD 200A may be configured to be able to execute the two-screen display shown in FIG. 25A. In this case, the execution of this may be enabled in the HMD 200A. in this case, the display control unit 305 may automatically adjust the luminance, gamma value, chromaticity and the like of the image displayed on the HMD 200A, according to the contents of the displayed image data or according to the brightness in the environment around the HMD 200A. In this case, an image based on the pickup image data and an image based on the image data transmitted from the tablet computer 600A may be arranged at a peripheral edge of the display area of the image display unit 220, so as not to obstruct the line of sight of the support recipient UB wearing the HMD 200A. Also, according to the work contents, these images may be hidden, or the area where these images are displayed may be hatched or framed.

In this embodiment, the work information generation unit 315 provided in the HMD 200A may include, in work information, the audio data of the support recipient UB generated by the audio processing unit 329, the pickup image data of the camera 261, and the pickup image data of the external camera 731, separately from each other. That is, the work information generation unit 315 generates work information in such a way that the communication control unit 311 can transmit and receive the audio data of the support recipient UB generated by the audio processing unit 329, the pickup image data of the camera 261, and the pickup image data of the external camera 731 separately from each other. In this case, the work information generation unit 315 generates a plurality of pieces of work information.

In this configuration, the communication control unit 311 can adjust the volume of data transmitted to the tablet computer 600A, in response to the communication state between the communication unit 277 and the tablet computer 600A. The communication state between the communication unit 277 and the tablet computer 600A refers to whether a sufficient communication band (communication speed) can be secured or not, for example. If the communication band is sufficient, the communication control unit 311 transmits all of the audio data of the support recipient UB generated by the audio processing unit 329, the pickup image data of the camera 261, and the pickup image data of the external camera 731. Meanwhile, if the communication band is insufficient, the audio data of the support recipient UB generated by the audio processing unit 329 is transmitted, and one of the pickup image data of the camera 261 and the pickup image data of the external camera 731 is transmitted, while the transmission of the other pickup image data is restrained. If the communication band is much more insufficient, the communication control unit 311 preferentially transmits the work information including the audio data generated by the audio processing unit 329. The transmission of the work information including the pickup image data is retrained.

The method in which the communication control unit 311 retrains the transmission of the work information including the pickup image data may be, for example, restraining the frequency of transmission of the pickup image data and thus reducing the number of frames per second. Also, the number of pixels (resolution) forming a frame of the pickup image data may be reduced in transmitting the pickup image data. Moreover, the work information generation unit 315 may include, in the work information, the pickup image data of the camera 261 and the pickup image data of the external camera 731 as images with different resolutions according to predetermined settings. For example, the pickup image data of the camera 261 may be a high-resolution image and the pickup image data of the external camera 731 may be a low-resolution image. Moreover, the pickup image data of the camera 261 may be dynamic image data of 30 frames per second, for example, and the pickup image data of the external camera 731 may be still image data updated every few seconds. That is, the work information including the pickup image data of the external camera 731 may be generated by the work information generation unit 315 and transmitted by the communication control unit 311, every few seconds.

Furthermore, the received information processing unit 665 may store each of the plurality of pickup image data included in the work information, into the storage unit 680 as a work record. In this case, a record of more detailed work contents can be saved.

Figure 26A:
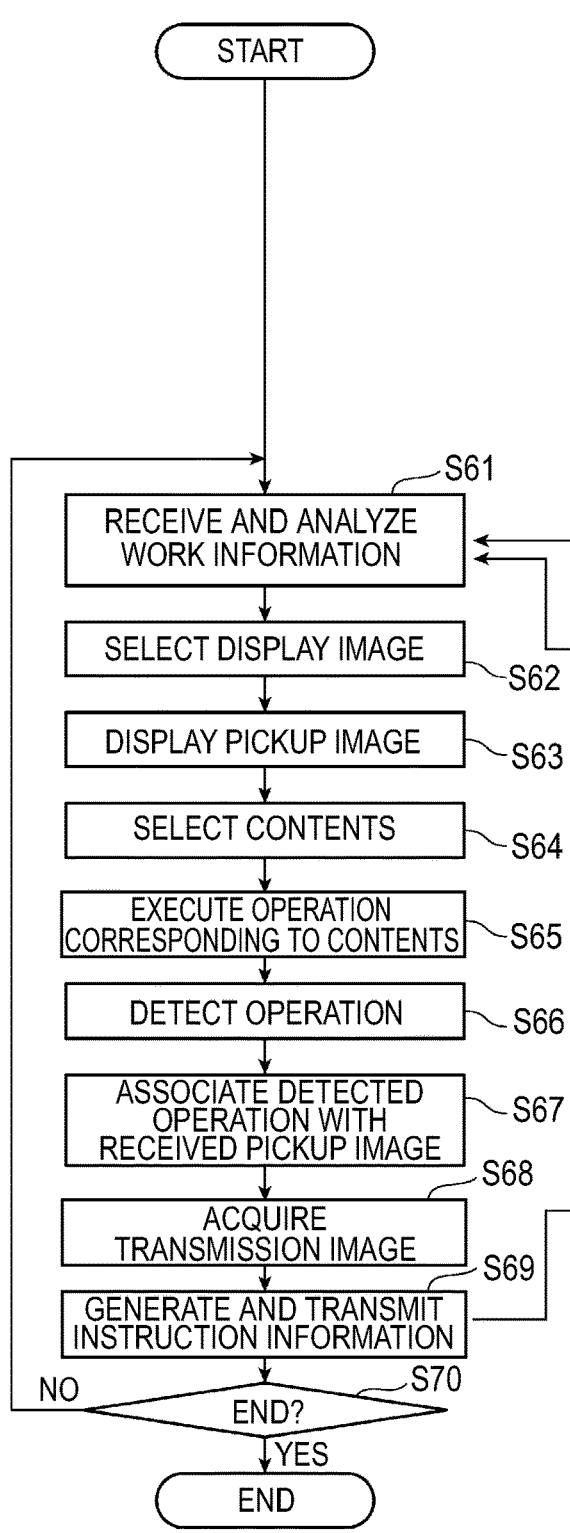
FIGS. 26A and 26B are flowchart showing operations in the display system.
Figure 26B:
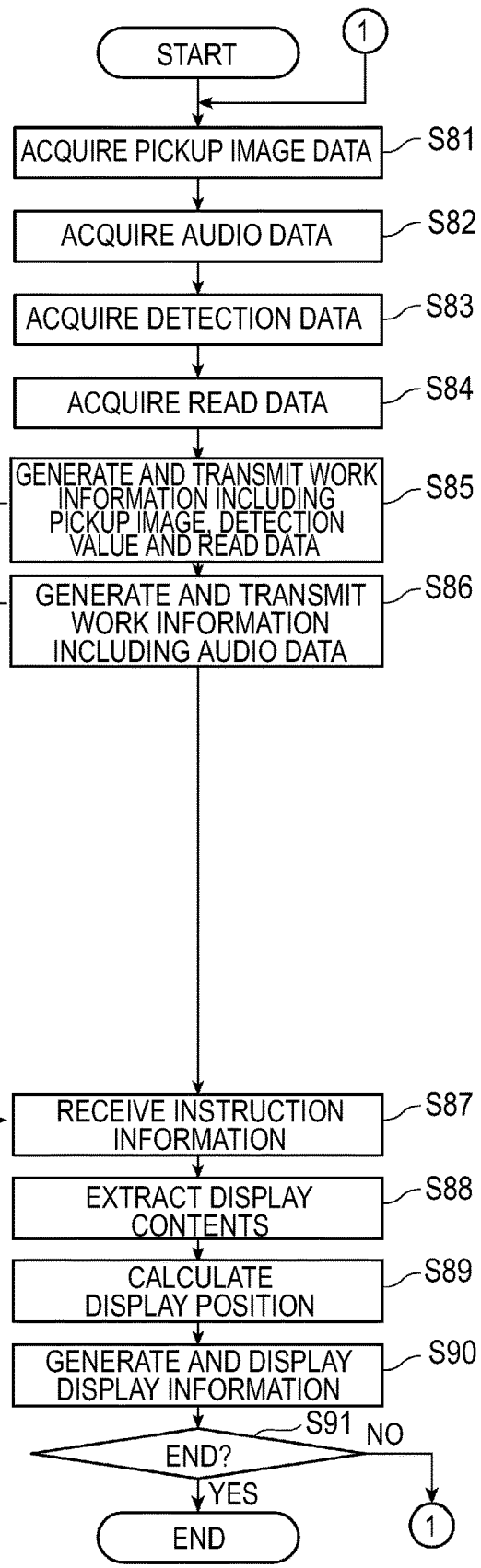

FIGS. 26A and 26B are flowcharts showing operations in the display system 1C. FIG. 26A shows operations of the tablet computer 600A. FIG. 26B shows operations of the HMD 200A. FIGS. 26A and 26B show an example in which one tablet computer 600A and one HMD 200A operate.

In the HMD 200A, the image pickup control unit 313 controls the camera 261 to execute image pickup and generate pickup image data. Also, the operation detection unit 323 receives pickup image data transmitted from the external camera 731. The work information generation unit 315 acquires the pickup image data of the camera 261 and the pickup image data of the external camera 731 (Step S81). Here, if the external camera 731 is not connected to the control device 210, the work information generation unit 315 acquires only the pickup image data of the camera 261 in Step S81.

In the HMD 200A, the audio processing unit 329 acquires a sound collected by the microphone 263 in a preset sampling period and generates audio data. The work information generation unit 315 acquires the audio data generated by the audio processing unit 329 (Step S82).

The operation detection unit 323 receives detection data transmitted from the motion sensor unit 761 via the communication unit 277. The work information generation unit 315 acquires the detection data received by the operation detection unit 323 (Step S83). Here, if the motion sensor unit 761 is not connected to the control device 210, the work information generation unit 315 skips the operation of Step S83.

If the barcode reader 701 is connected to the control device 210, the operation detection unit 323 receives read data read by the barcode reader 701, via the communication unit 277. If the operation detection unit 323 receives the read data, the work information generation unit 315 acquires this read data (Step S84). Here, if the barcode reader 701 is not connected to the control device 210 or if the operation detection unit 323 does not receive the read data, the work information generation unit 315 skips Step S84.

The work information generation unit 315 generates work information, and the communication control unit 311 transmits this work information to the tablet computer 600A (Step S85). The work information generated by the work information generation unit 315 in Step S85 includes the pickup image data acquired in Step S81, the detection data acquired in Step S83, and the read data acquired in Step S84.

The work information generation unit 315 also generate work information including the audio data acquired in Step S82, and the communication control unit 311 transmits this work information to the tablet computer 600A (Step S86).

The work information generated by the work information generation unit 315 in Step S85 and Step S86 may be changed, as described above, according to the communication state in which the communication control unit 311 communicates with the tablet computer 600A. Thus, even if the communication state is not good, audio data can be transmitted from the HMD 200A to the tablet computer 600A without having the sound interrupted. Similarly, the pickup image data of one of the camera 261 and the external camera 731 can be transmitted without interruption.

The work information generation unit 315 may also include data about an operation detected by the input information acquisition unit 270, in the work information generated in Steps S85 and S86.

In the tablet computer 600A, the communication control unit 663 receives the work information transmitted from the HMD 200A, and the received information processing unit 665 analyzes the received work information (Step S61). The received information processing unit 665 extracts the pickup image data from the received work information and selects pickup image data to be displayed, from the extracted pickup image data (Step S62). For example, if the work information includes the pickup image data of the camera 261 and the pickup image data of the external camera 731, the received information processing unit 665 selects pickup image data to be displayed. This selection is also decided according to whether the display control unit 662 displays an image on the display panel 617 in the normal display state or in the two-screen display state.

The display control unit 662 displays pickup image data selected by the received information processing unit 665, on the display panel 617 (Step S63). If the work information includes audio data, the received information processing unit 665 may cause the audio processing unit 671 to output a sound.

In the tablet computer 600A, an operation for the support provider UA to give an instruction or the like to the support recipient UB is carried out (Steps S64 to S66). In Step S64, for example, contents for support including a text and image are selected. In Step S65, for example, an operation to point at a position to which the support recipient UB is to pay attention, in the image received by the communication control unit 663 and currently displayed, is carried out. The operation in Step S65 is an operation on the touch panel 616, or an operation in which the support provider UA moves the indicator within the image pickup range of the image pickup unit 615. This operation is detected by the operation detection unit 666 (Step S66). The operation detection unit 666 generates data of the detected operation.

The operation detection unit 666 generates data which associates the operation position of the detected operation or the trajectory of the operation with the pickup image of the HMD 200A that is currently displayed (Step S67). Thus, data indicating a specified position in the display area DA at the support recipient site B is obtained. The transmission image acquisition unit 668 slices out an image of the indicator from the pickup image picked up by the image pickup unit 615 during the operation in Step S65, or reads out the transmission image data 684 from the storage unit 680, and thus acquires a transmission image (Step S68).

The instruction information generation unit 669 generates and transmits instruction information including the image data of the image of the indicator acquired by the transmission image acquisition unit 668, the data indicating the operation position and the trajectory of the operation, and the data associating the operation position and the trajectory of the operation with the pickup image of the HMD 200A (Step S69).

Here, the instruction information generation unit 669 generates instruction information including data of an image indicating the point of view or line-of-sight direction of the support provider UA or data of necessary coordinates or direction for displaying the image. Specific examples of this data may be, for example, data of an image of the indicator used by the support provider UA, and data indicating the direction and position of the indicator. It is preferable that the indicator in this case has a size and shape from which its direction can be clearly determined.

The control unit 660 determines whether a condition to end the operation is met or not (Step S70). If the end condition is not met (Step S70, NO), the control unit 660 returns to Step S61. If the end condition is met (Step S70, YES), this processing ends. The end condition may be, for example, that ending the operation or shutting down the tablet computer 600A is designated by an operation on the display panel 617 or on a power switch, not illustrated.

In the HMD 200A, the communication control unit 311 receives the instruction information transmitted from the tablet computer 600A (Step S87), and the received information analysis unit 317 analyzes the received instruction information and extracts image data (Step S88). Next, the display position calculation unit 321 calculates the position where an image is to be displayed on the basis of each image data (Step S89). Moreover, the display information generation unit 325 generates display information in which an image is arranged at the calculated display position, and the image processing unit 303 and the display control unit 305 cause the image to be displayed (Step S90).

The control unit 300 determines whether a condition to end the operation is met or not (Step S91). If the end condition is not met (Step S91, NO), the control unit 300 returns to Step S81. If the end condition is met (Step S91, YES), this processing ends. The end condition may be, for example, that ending the operation or shutting down the HMD 200A is designated by an operation on the operation unit 279, or the like.

Thus, in the display system 1C according to the seventh embodiment, the support provider UA can learn more details about how the work is carried out by the support recipients UB, UC at the work sites B, C, utilizing the external camera 731 provided on the HMD 200A. Also, the tablet computer 600A may transmit pickup image data picked up by the image pickup unit 615 to the HMD 200A, and the HMD 200A may causes the image display unit 220 to display the pickup image data. In this case, the two-screen display state may be used, as described above in the image display unit 220. The image display unit 220 may also simultaneously display pickup image data picked up by the image pickup unit 615 of each of a plurality of tablet computers 600A. With these configurations, information about the currently executed work can be shared among a plurality of HMDs 200A and a plurality of tablet computers 600A, and the work can be carried out collaboratively. In this case, a pointer that is common to both of the image displayed by the image display unit 220 and the image displayed on the display panel 617 may be displayed, and an operation to move the pointer may be shared. That is, when an operation to move the pointer is carried out in the HMD 200A, both of the pointer displayed on the HMD 200A and the pointer displayed on the tablet computer 600A are made to move similarly, and vice versa. Thus, work from a shared point of view can be carried out more easily. Also, a configuration in which the support provider UA uses the HMD 200A, whereas the support recipients UB, UC use the tablet computer 600A, may be employed. In this case, the tablet computer 600A may function similarly to the tablet computer 600 (FIG. 17). In this case, the support provider UA and the support recipients UB, UC can carry our work, switching their roles.

As described above, in the display system 1C according to the seventh embodiment to which the invention is applied, the HMD 200A has the external information detection unit for detecting information, which is formed as a separate unit from the image display unit 220. The control unit 300 causes the transmission unit 277 to transmit work information including the information detected by the external information detection unit to the tablet computer 600A. The control unit 660 causes the communication unit 613 to receive the work information from the HMD 200A and displays an image based on the work information, on the display panel 617. Thus, the information detected by the external information detection unit of the HMD 200A can be transmitted from the HMD 200A to the tablet computer 600A. Therefore, the support provider UA using the tablet computer 600A can obtain detailed information about the work contents of the support recipient UB using the HMD 200A and the surrounding circumstances or the like of the HMD 200A. Moreover, since the external information detection unit is formed as a separate unit from the image display unit 220, the external information detection unit has a high degree of freedom in its installation position and can easily acquire diverse information.

The external information detection unit includes at least one of the barcode reader 701 for reading information formed as an image and the motion sensor unit i761 having a motion sensor. Thus, by the external information detection unit formed as a separate unit from the image display unit 220, the HMD 200A can read information formed as an image or detect a motion, and transmits the detected information to the tablet computer 600A. Therefore, more detailed information can be provider to the support provider UA using the tablet computer 600A.

The external information detection unit also includes the external camera 731 formed as a separate unit from the camera 261. The control unit 300 causes the communication unit 277 to transmit work information including a pickup image of the external camera 731 to the tablet computer 600A. The control unit 660 displays, on the display panel 617, the pickup image of the external camera 731 included in the work information received by the communication unit 613 from the HMD 200A. Thus, the HMD 200A can transmit the pickup image picked up by the external camera 731 formed as a separate unit from the image display unit 220, to the tablet computer 600A. Therefore, the support provider UA using the tablet computer 600A can view the pickup image picked up by the HMD 200A from a different position from the image display unit 220.

The control unit 300 also causes the transmission unit 277 to transmit work information including a pickup image of the camera 261 and a pickup image of the external camera 731 to the tablet computer 600A. The control unit 660 displays, on the display panel 617, the pickup image of the camera 261 and the pickup image of the external camera 731 included in the work information received from the HMD 200A by the communication unit 613. Thus, the pickup image of the camera 261 and the pickup image of the external camera 731 can be viewed on the tablet computer 600A.

The control unit 660 displays the pickup image of the camera 261 and the pickup image of the external camera 731 included in the work information received from the HMD 200A by the communication unit 613, next to each other on the display panel 617. Thus, the pickup image of the camera 261 and the pickup image of the external camera 731 can be viewed simultaneously on the tablet computer 600A.

The control unit 300 adjusts the states of the pickup image of the camera 261 and the pickup image of the external camera 731 included in the work information, according to the communication state between the communication unit 277 and the tablet computer 600A. Thus, even when the data volume increases due to the inclusion of a plurality of images in the work information transmitted from the HMD 200A to the tablet computer 600A, the work information can be transmitted properly according to the communication state. Therefore, in a configuration susceptible to the influence of the communication state, the work information can be transmitted properly from the HMD 200A to the tablet computer 600A, and the pickup images can be displayed properly on the tablet computer 600A.

In the embodiments, the external camera 731 wirelessly connected to the control device 210 is employed as an example of the third image pickup unit. However, the invention is not limited to this example. For example, an external camera or the like wired to the control device 210 via a USB cable may be used as the third image pickup unit. Also, a wristwatch-type or handheld camera may be used as the third image pickup unit. The method for connecting the third image pickup unit to the control device 210 is not limited to Bluetooth, and wireless LAN or the like may be used as well.

The tablet computer 600A is not limited to the configuration in which one image pickup unit 615 is provided on the back of the casing 602. Another camera may be provided on the side of the display panel 617. In this case, a camera is provided both on the side of the display panel 617 and on the back of the casing 602. In this configuration, the camera installed on the side of the display panel 617 can be called an in-camera, and the image pickup unit 615 can be called an out-camera. Then, data designating the camera to be used in the tablet computer 600A may be included in the work data transmitted from the HMD 200A to the tablet computer 600A. For example, in a configuration in which the tablet computer 600A transmits guide information including a pickup image to the HMD 200A, information designating the in-camera or out-camera of the tablet computer 600A can be included in the work information transmitted from the HMD 200A. In this case, the support recipient UB can select an image to be displayed on the HMD 200A, from between the image on the side of the support provider UA of the tablet computer 600A and the image on the side of the worktop T'.

At least a part of the functional blocks shown in FIGS. 3, 6, 15, 18, 22 and 24 may be implemented by hardware or may be implemented by collaboration of hardware and software. The configurations of these functional blocks are not limited to the configurations in which independent hardware resources are arranged as shown in FIGS. 3, 6, 15, 18, 22 and 24.

The operations of the control units 30, 60, 300, 630, 660 described in the embodiments can also be implemented as a program. A part or the entirety of the program may be implemented as hardware. For example, each of the processing units provided in the control units 30, 60, 300, 630, 660 may be formed using an ASIC (application specific integrated circuit). Also, a PLD (programmable logic device) such as FPGA (field-programmable gate array) may be programmed to form each of the processing units. Alternatively, each of the processing units may be implemented as a circuit including a plurality of semiconductor devices.

Also, in the case where hardware executes a program to implement the functions, this program may be stored in the ROMs of the control units 30, 60, 300, 630, 660, or the storage units 50, 80, 340, 650, 680, or another storage device. Alternatively, the program may be stored in storage devices or storage media externally connected to the projectors 100A, 100B, the HMDs 200, 200A or the tablet computers 600, 600A. In this case, the program can be taken into the storage units 50, 80, 340, 650, 680 or the like from these storage devices or storage media and thus executed. The program stored in the external devices may be acquired via the communication unit or the interface unit and thus executed.

The entire disclosure of Japanese Patent Application Nos. 2015-187645, filed Sep. 25, 2015 and 2016-148329, filed Jul. 28, 2016 are expressly incorporated by reference herein.

What is claimed is:

1. A display device comprising:
    a display; and
    a processor programmed to:
        communicate with an external display device;
        receive guide information indicating an operation carried out in the external display device, such that the guide information guides a user of the display device to perform an operation similar to the operation carried out in the external display device; and
        display, on the display, on the basis of the guide information an image of an indicator at a position corresponding to an operation position of the operation in the external display device.

2. The display device according to claim 1, wherein the processor is programmed to:
    display an image corresponding to the operation in the external display device.

3. The display device according to claim 1, wherein the processor is programmed to:
    display an image indicating a point of view or a line-of-sight direction of an operator carrying out the operation in the external display device.

4. The display device according to claim 1, wherein:
    the guide information indicates the operation position of the operation in the external display device.

5. The display device according to claim 1, wherein the processor is programmed to:
    determine an object arrangement area on the display where an object to be worked on by the user of the display device is arranged; and
    display the image of the indicator at a position corresponding to a position of the object to be worked on.

6. The display device according to claim 5, comprising:
    a camera that captures an image of an image pickup range including at least a part of the object arrangement area;
    wherein the processor is programmed to specify a display position of an image corresponding to the position of the object to be worked on, on the basis of the captured image.

7. The display device according to claim 5, comprising:
    a camera that captures an image of an image pickup range including at least a part of the object arrangement area;
    wherein the processor is programmed to display an image indicating the image pickup range of the camera.

8. The display device according to claim 1, wherein the processor is programmed to:
    display an image indicating the operation position of the operation carried out in the external display device on the basis of the guide information.

9. The display device according to claim 1, wherein:
    the image of the indicator is an image of a tool or an apparatus involved in work to be performed by the user of the display device.

10. The display device according to claim 1, wherein:
    the processor is programmed to transmit an image of a tool or an apparatus to the external display device; and
    the guide information is generated by the external display device using the transmitted image of the tool or the apparatus.

11. The display device according to claim 1, wherein:
    the processor is programmed to generate guide target information and transmit the guide target information to the external display device; and
    the received guide information indicates an operation carried out by a person using the external display device while the transmitted guide target information is displayed by the external display device.

12. The display device according to claim 1, comprising:
    an external information detector that is formed as a separate device from the display, the external information detector detecting an operation performed by the user of the display device;
    wherein the processor is programmed to transmit the detected operation to the external display device, such that the guide information is generated by the external display device using the transmitted detected operation.

13. The display device according to claim 11, wherein:
    the external information detector includes at least one of a reading device that reads information formed as an image and a motion detector having a motion sensor.

14. The display device according to claim 1, comprising:
    a plurality of cameras;
    wherein the processor is programmed to transmit a plurality of images captured by the plurality of cameras to the external display device.

15. The display device according to claim 1, wherein:
    the image of the indicator is an image of an avatar playing a role of a support provider.

16. The display device according to claim 1, wherein:
    the image of the indicator is at least one of an image of a face, an image of an upper body, and an image of a whole body of a support provider.

17. The display device according to claim 1, wherein:
    the image of the indicator is a shape of a mouth of a support provider.

18. The display device according to claim 1, wherein:
    the image of the indicator is an image of an operating body operated by a person using the external display device.

19. The display device according to claim 18, wherein:
    the operating body is at least one of an arm, a hand, a finger, a stick, and a pointing device.

20. The display device according to claim 1, wherein:
    the image of the indicator provides guidance on a work to be performed by the user of the display device.

21. The display device according to claim 1, wherein:
    the image of the indicator provides guidance on installation of software.

22. The display device according to claim 1, wherein:
the image of the indicator provides guidance on operation of software.

23. The display device according to claim 1, wherein the processor is programmed to:
receive instruction data from the external display device, the instruction data including at least one of text data, still image data, dynamic image data, and audio data; and
present the received instruction data to the user of the display device.

24. The display device according to claim 1, comprising:
a camera that captures an image of the operation performed by the user of the display device;
wherein the processor is programmed to display the image of the indicator with the image captured by the camera in a superimposed manner.

25. The display device according to claim 1, wherein:
the display is a see-through display, such that the image of the indicator is displayed in a superimposed manner over an image of a real space seen through the display.

26. The display device according to claim 1, wherein:
the image of the indicator moves in accordance with a changing operation performed by a person using the external display device.

27. A non-transitory computer readable medium storing a program executed by a computer included in a display device, the program causing the computer to:
communicate with an external display device;
receive guide information indicating an operation carried out in the external display device, such that the guide information guides a user of the display device to perform an operation similar to the operation carried out in the external display device; and
display, on a display, on the basis of the guide information an image of an indicator at a position corresponding to an operation position of the operation in the external display device.

28. A display method for a display device, the method comprising:
communicating with an external display device;
receiving guide information indicating an operation carried out in the external display device, such that the guide information guides a user of the display device to perform an operation similar to the operation carried out in the external display device; and
displaying, on a display, on the basis of the guide information an image of an indicator at a position corresponding to an operation position of the operation in the external display device.

29. A display system comprising:
a first display device including a first processor, the first processor being programmed to:
communicate with a second display device;
receive guide information indicating an operation carried out in the second display device, such that the guide information guides a user of the first display device to perform an operation similar to the operation carried out in the second display device; and
display, on a display, on the basis of the guide information an image of an indicator at a position corresponding to an operation position of the operation in the second display device; and
the second display device including a second processor, the second processor being programmed to:
communicate with the first display device;
generate the guide information indicating the operation carried out in the second display device; and
transmit the guide information to the first display device.

* * * * *